March 6, 1945.  F. P. SAGER ET AL  2,371,070
MAIL TREATING MACHINE
Filed April 29, 1940  32 Sheets-Sheet 1

Inventors
FRANK P. SAGER
ERNEST R. BERGMARK
COMMODORE D. RYAN
HERSCHEL L. ATHERTON Lyon & Lyon  Attorneys Inventors
FRANK P. SAGER
ERNEST R. BERGMARK
COMMODORE D. RYAN
HERSCHEL L. ATHERTON
By
Lyon & Lyon Attorneys March 6, 1945.   F. P. SAGER ET AL   2,371,070
MAIL TREATING MACHINE
Filed April 29, 1940   32 Sheets-Sheet 4

Inventors
FRANK P. SAGER
ERNEST R. BERGMARK
COMMODORE D. RYAN
HERSCHEL L. ATHERTON
By Lyon & Lyon
Attorneys

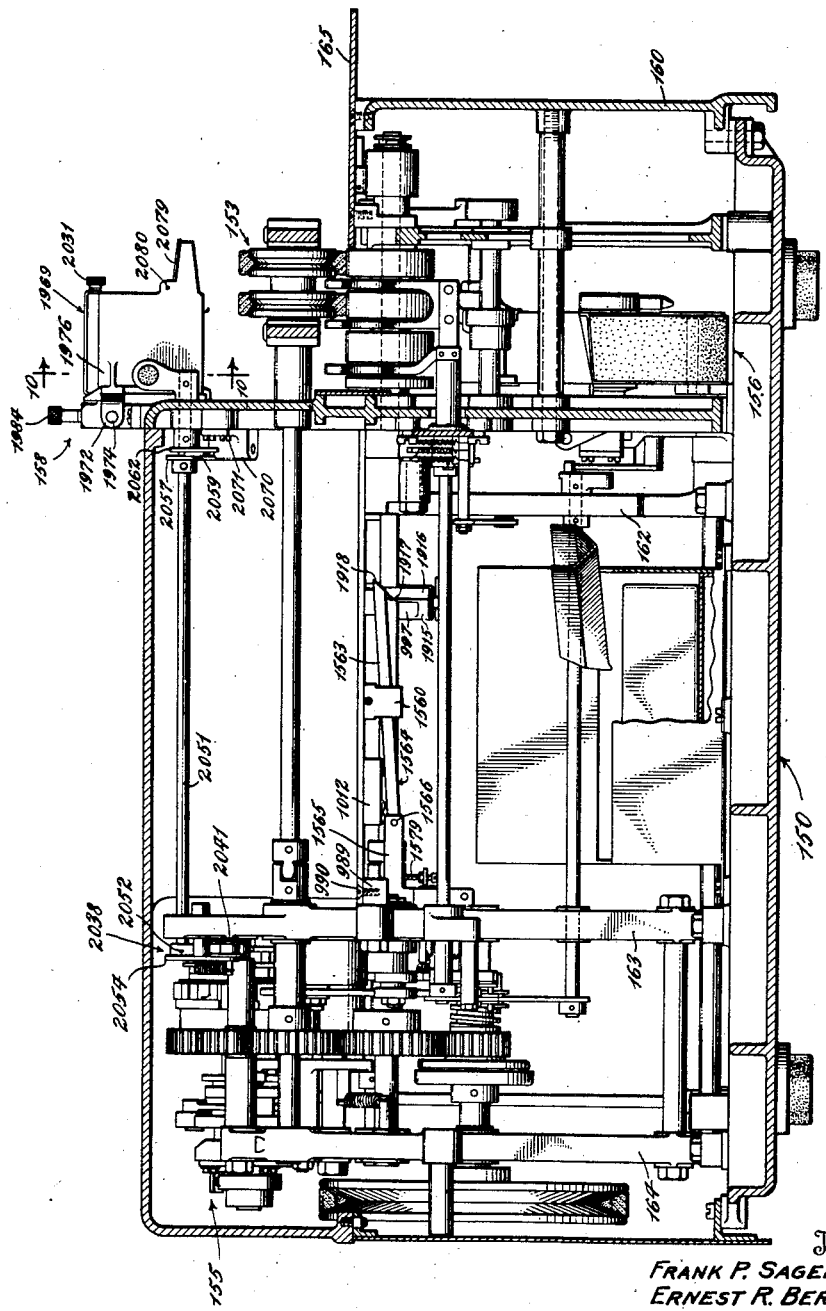

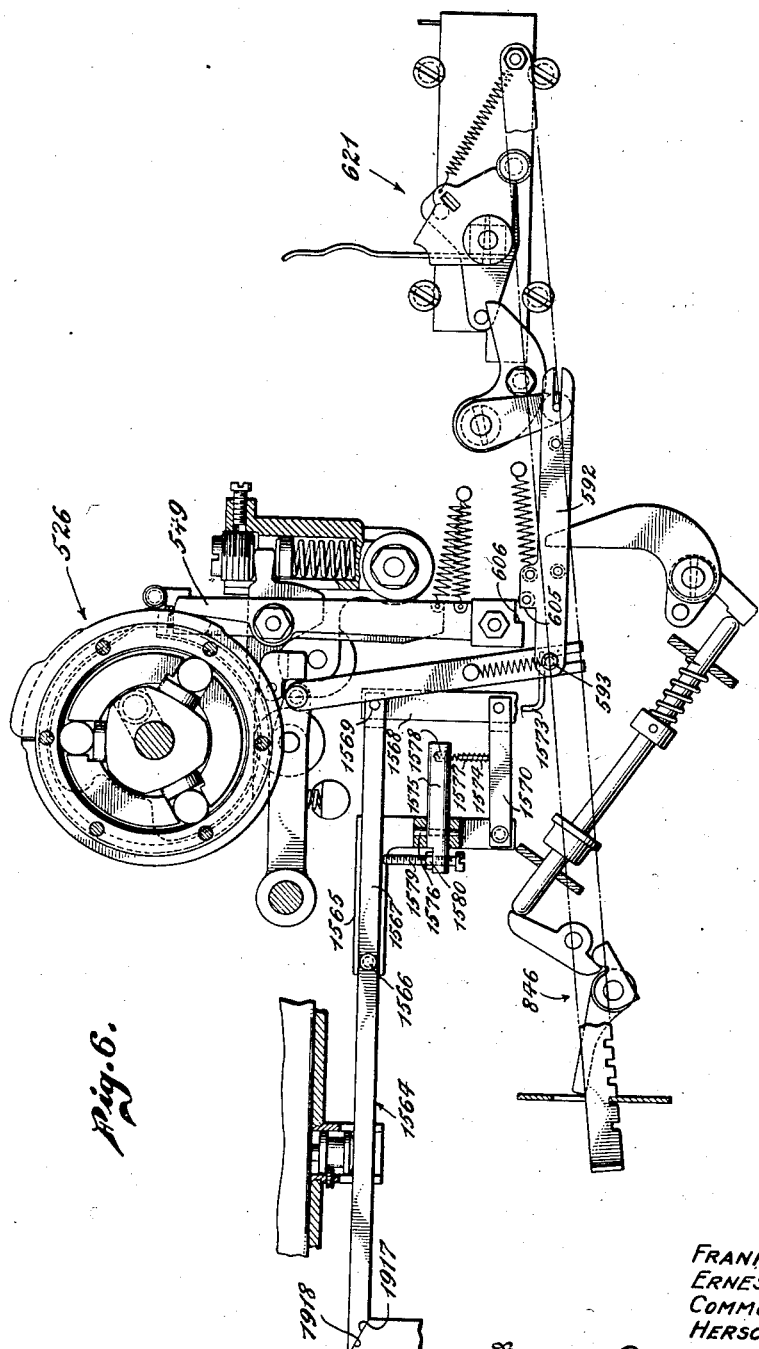

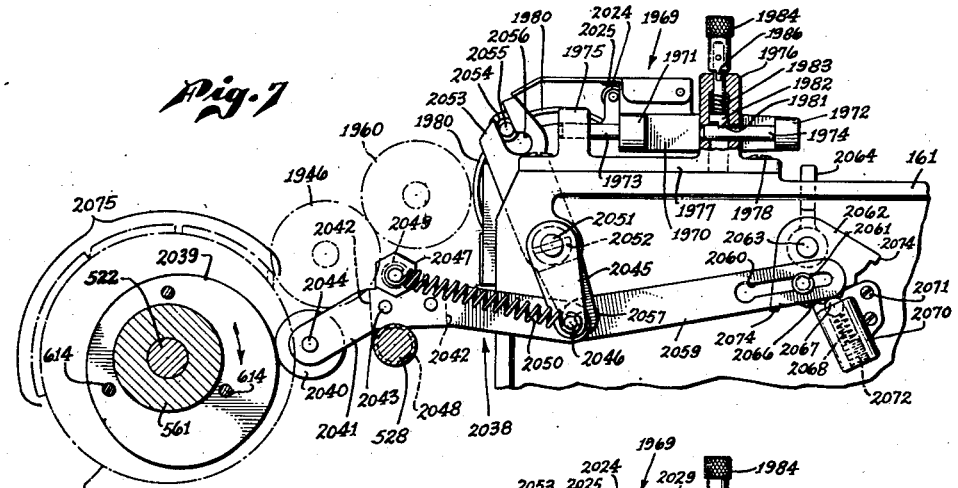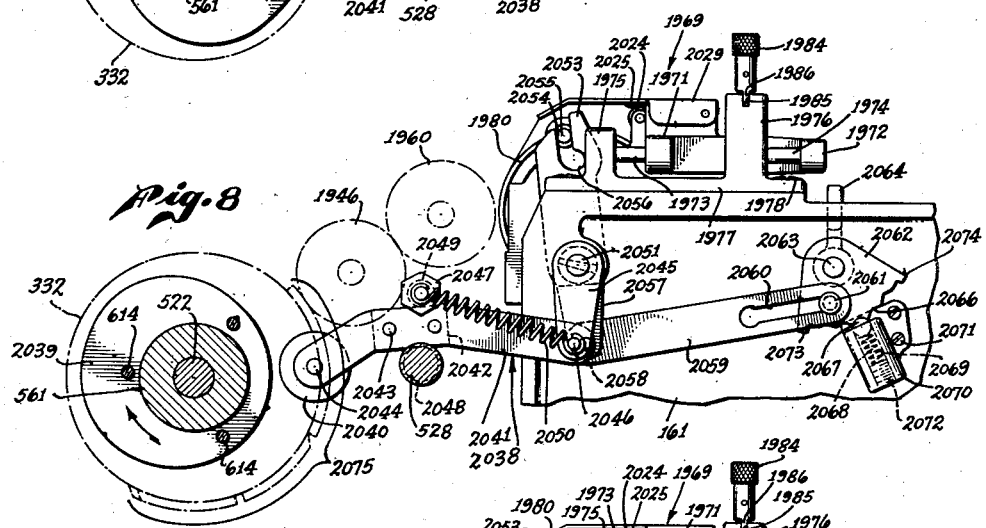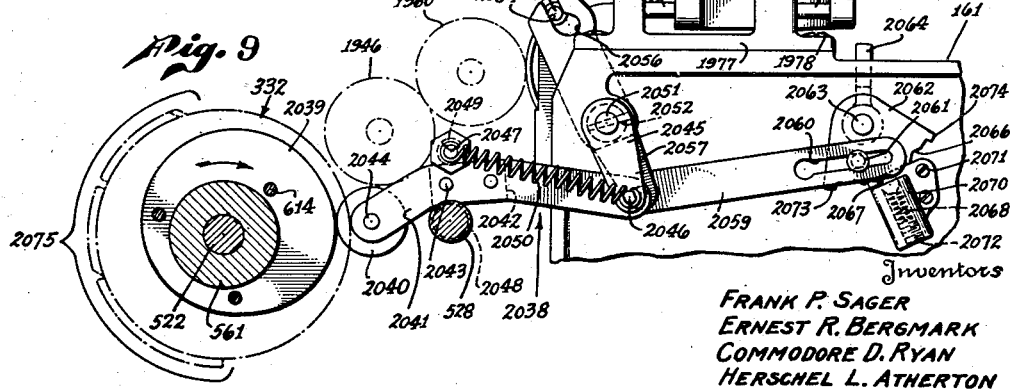

Inventors
FRANK P. SAGER
ERNEST R. BERGMARK
COMMODORE D. RYAN
HERSCHEL L. ATHERTON
By Lyon Lyon
Attorneys

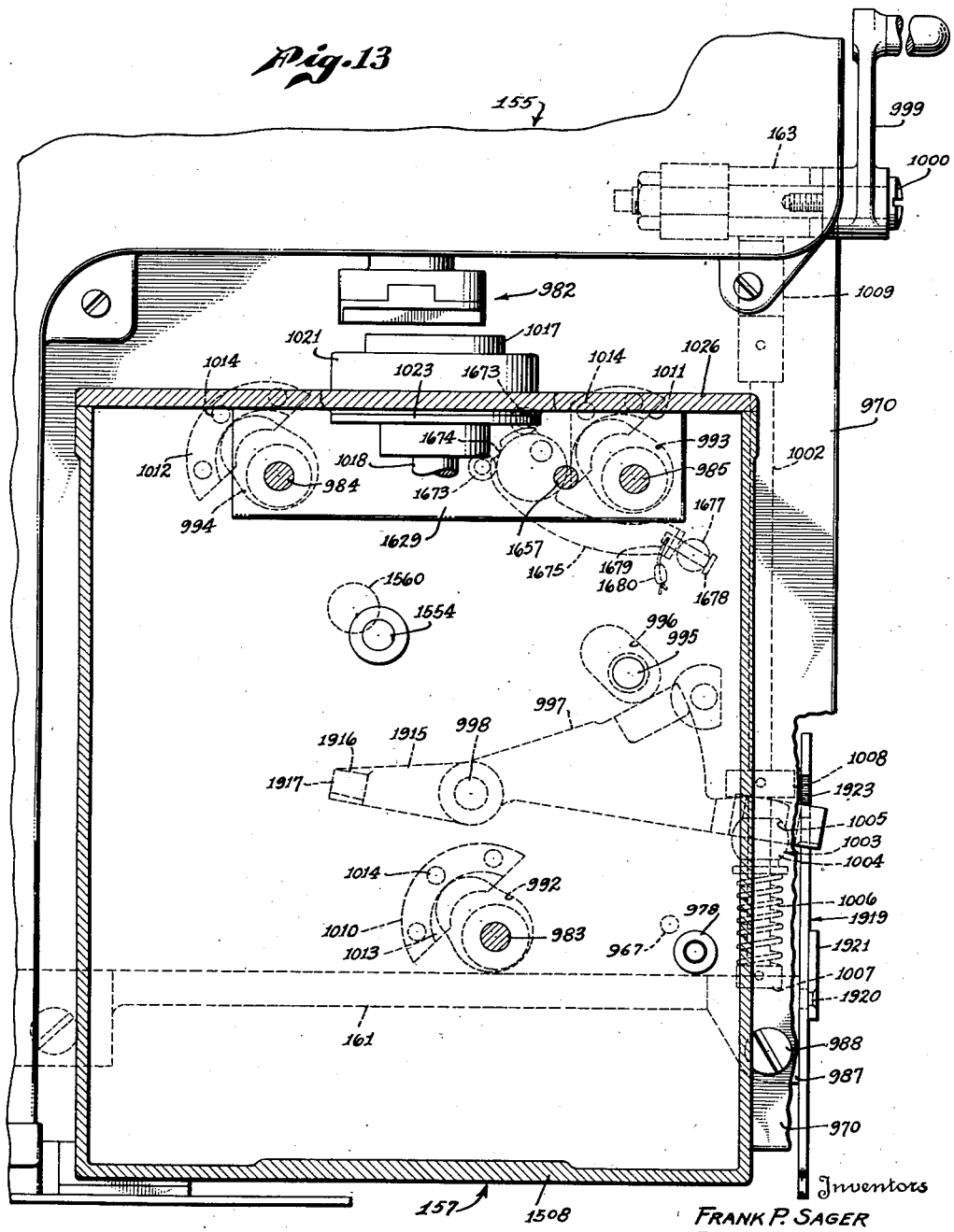

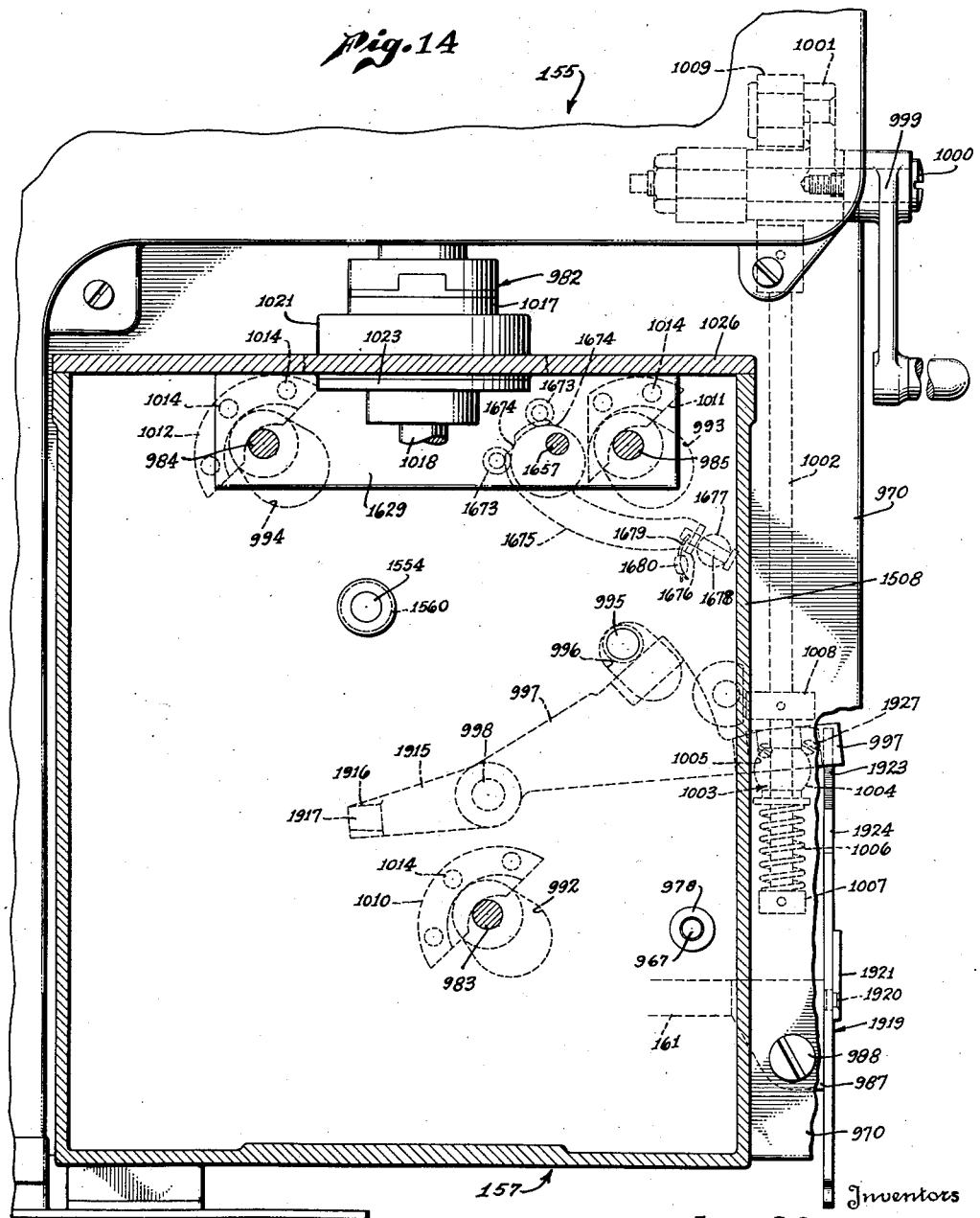

March 6, 1945.  F. P. SAGER ET AL  2,371,070
MAIL TREATING MACHINE
Filed April 29, 1940  32 Sheets-Sheet 11
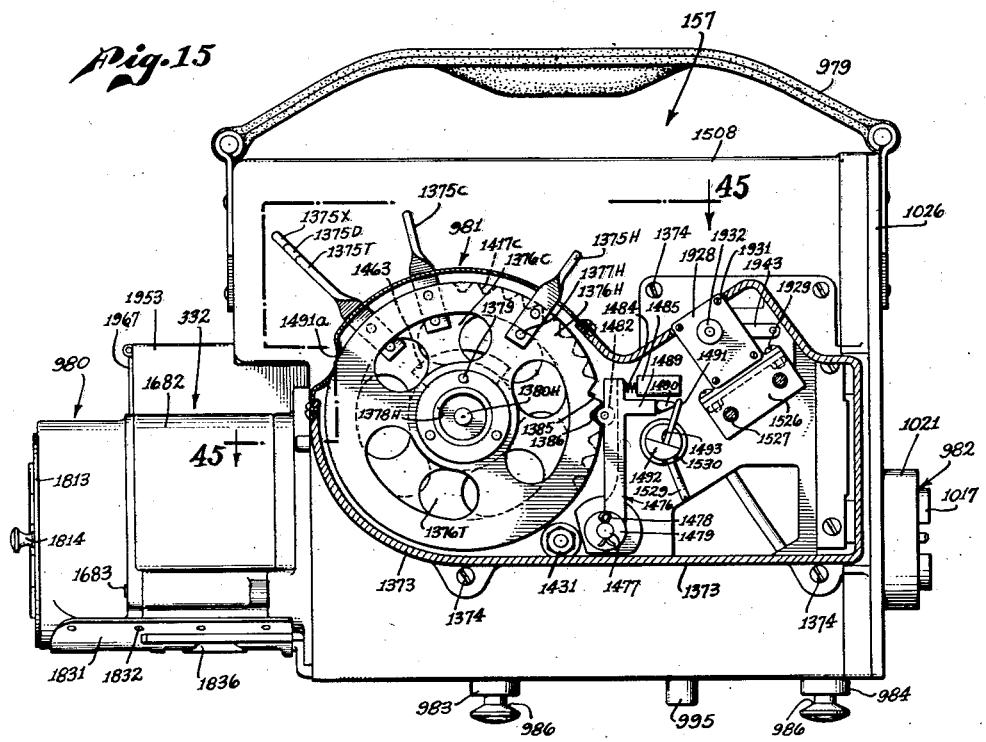
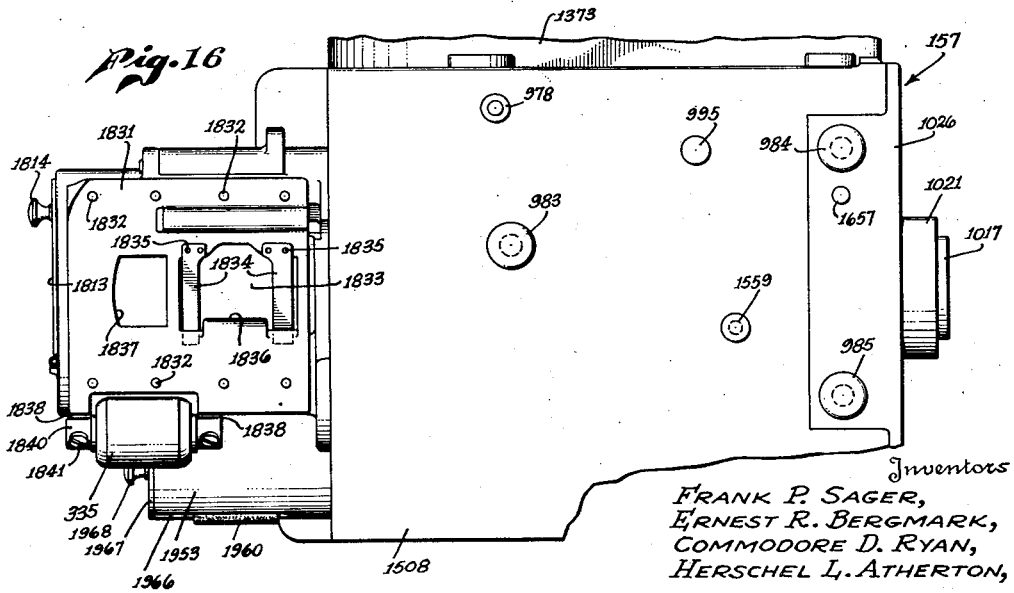
Inventors
Frank P. Sager,
Ernest R. Bergmark,
Commodore D. Ryan,
Herschel L. Atherton,
By Lyon & Lyon
Attorneys

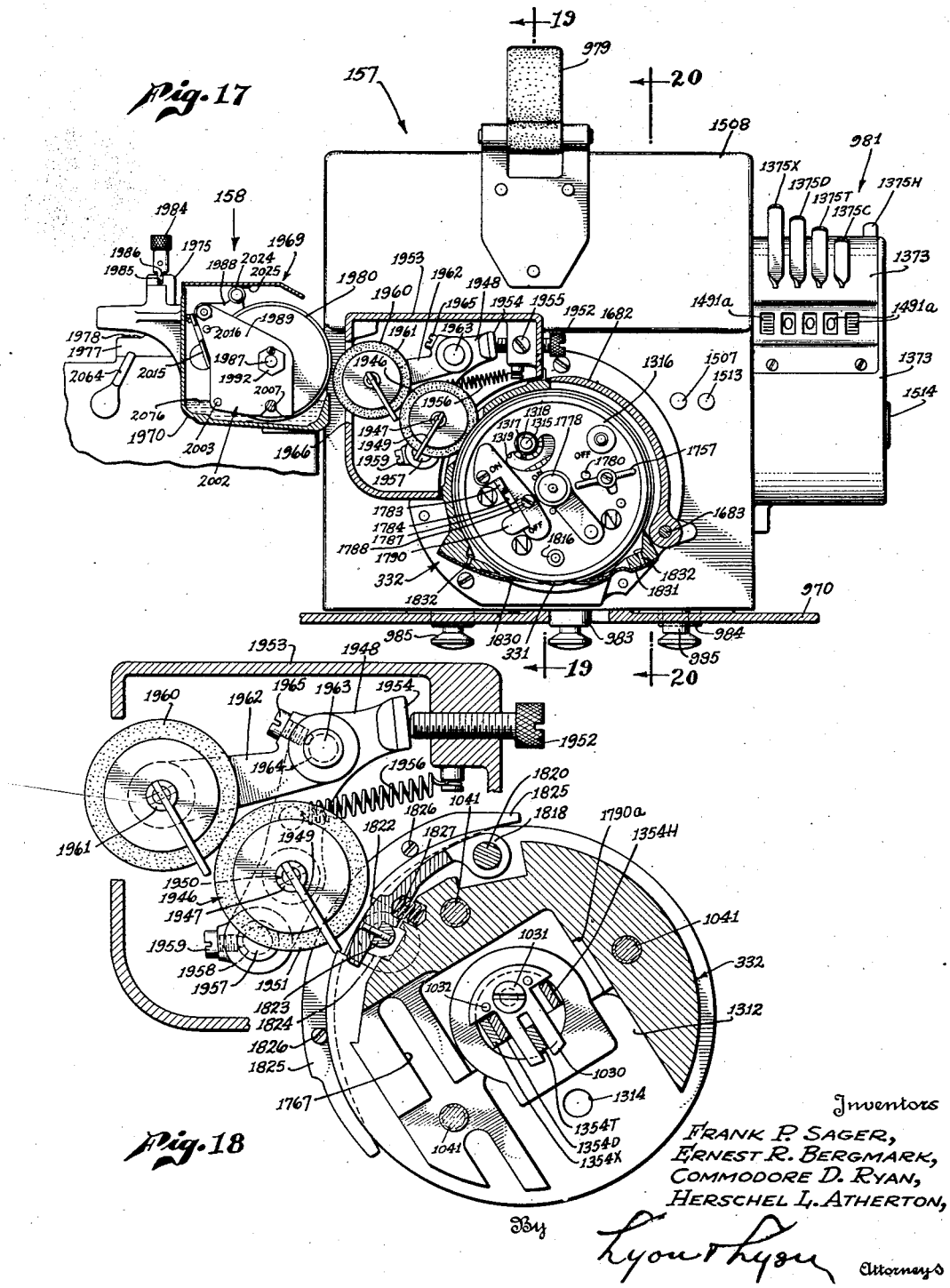

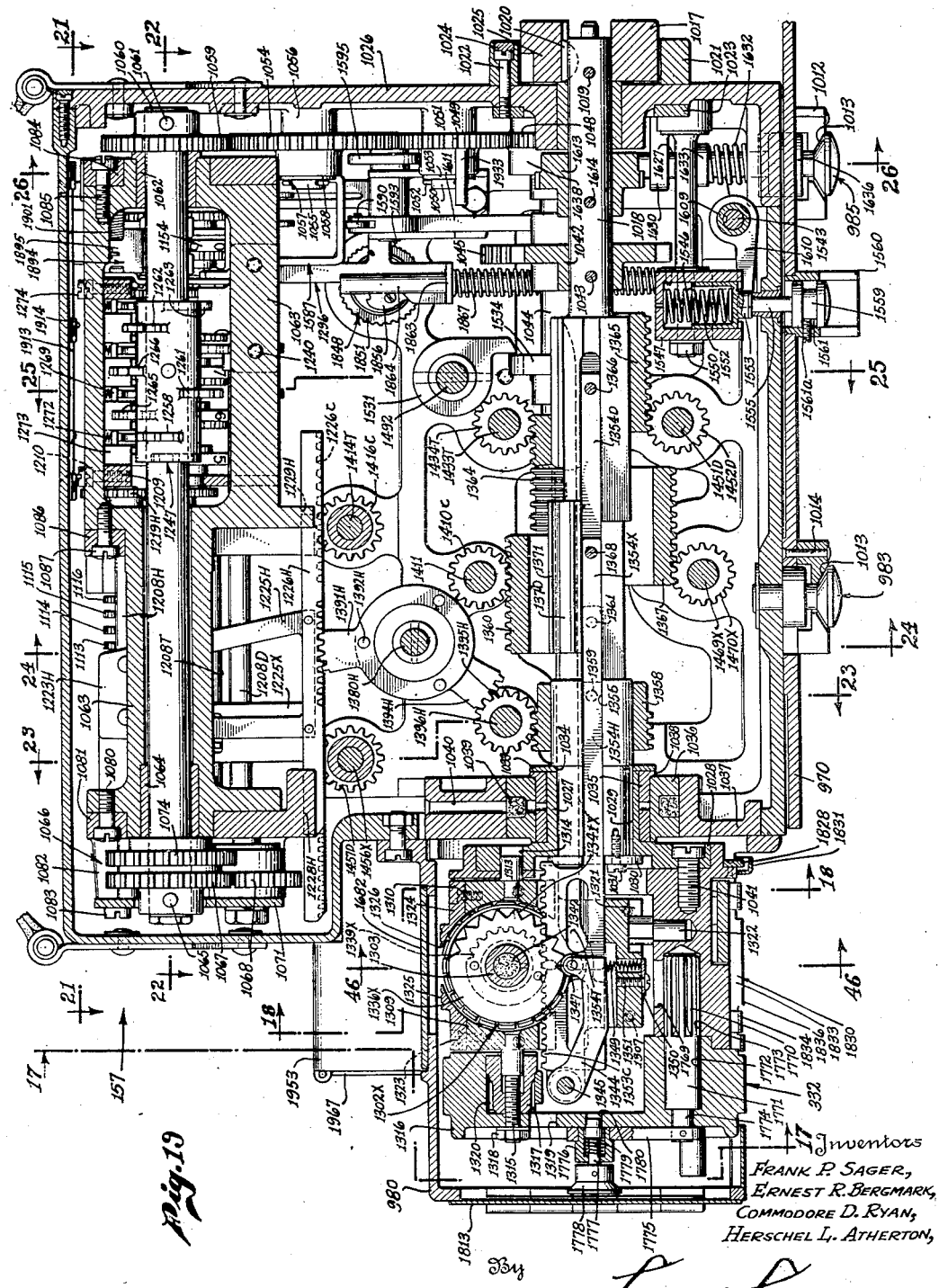

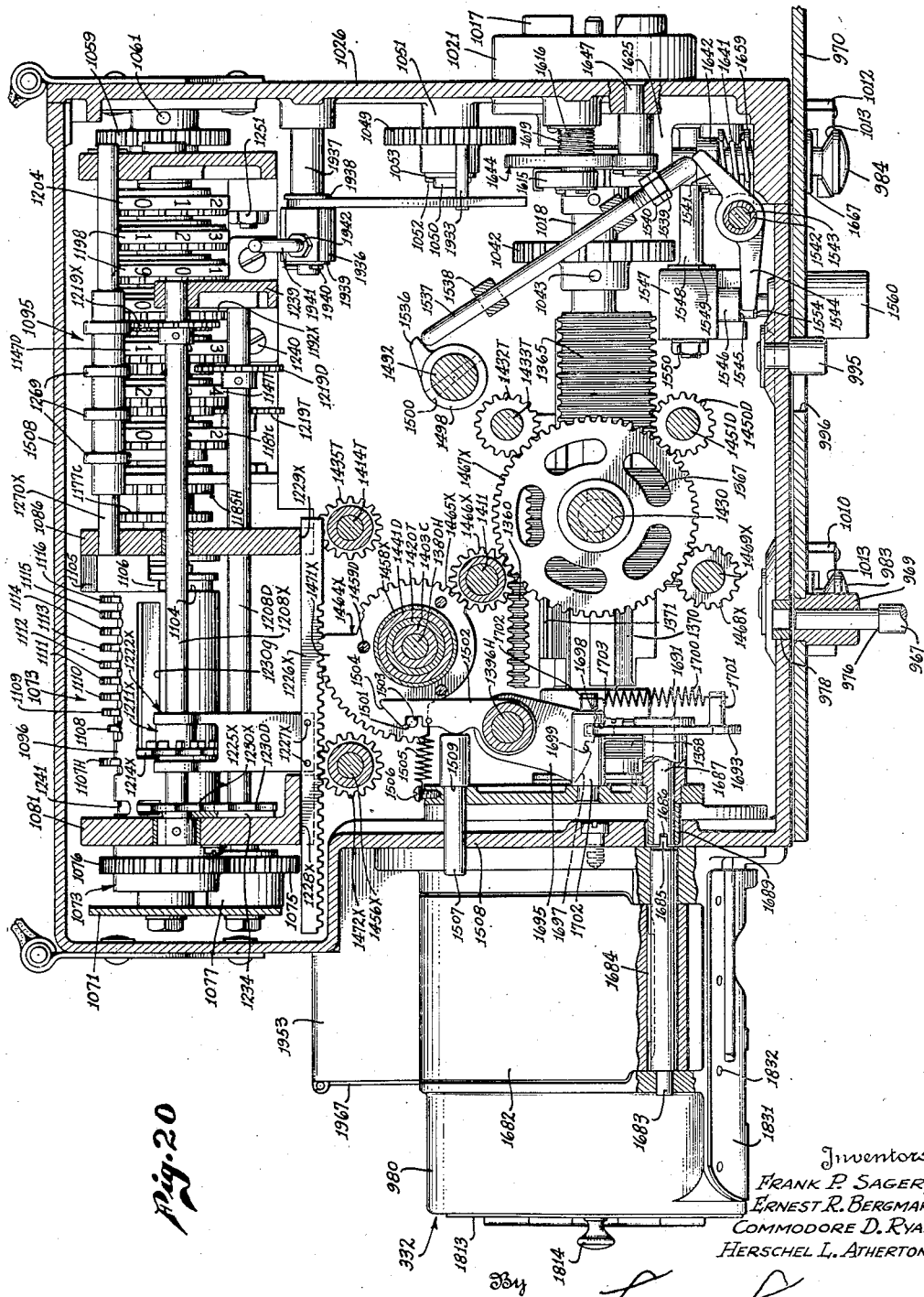

March 6, 1945.  F. P. SAGER ET AL  2,371,070
MAIL TREATING MACHINE
Filed April 29, 1940   32 Sheets-Sheet 15

Inventors
FRANK P. SAGER,
ERNEST R. BERGMARK,
COMMODORE D. RYAN,
HERSCHEL L. ATHERTON,
By Lyon & Lyon
Attorneys March 6, 1945. F. P. SAGER ET AL 2,371,070
MAIL TREATING MACHINE
Filed April 29, 1940 32 Sheets-Sheet 20

Inventors
FRANK P. SAGER,
ERNEST R. BERGMARK,
COMMODORE D. RYAN,
HERSCHEL L. ATHERTON,
By Lyon & Lyon
Attorneys

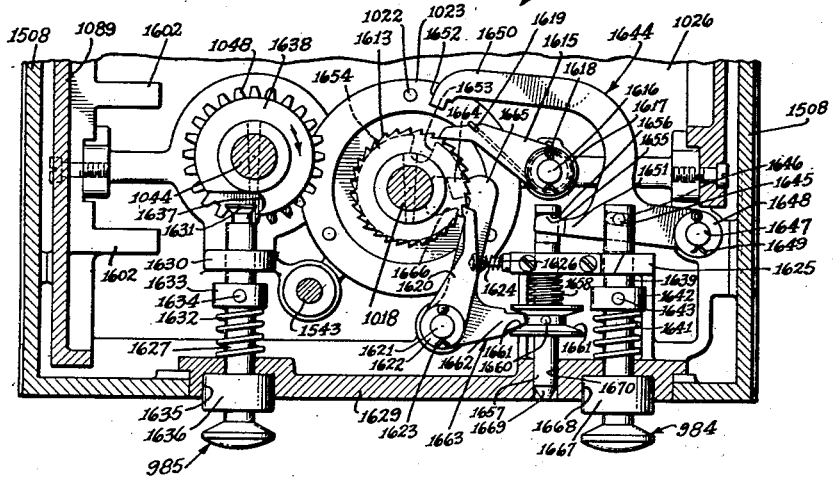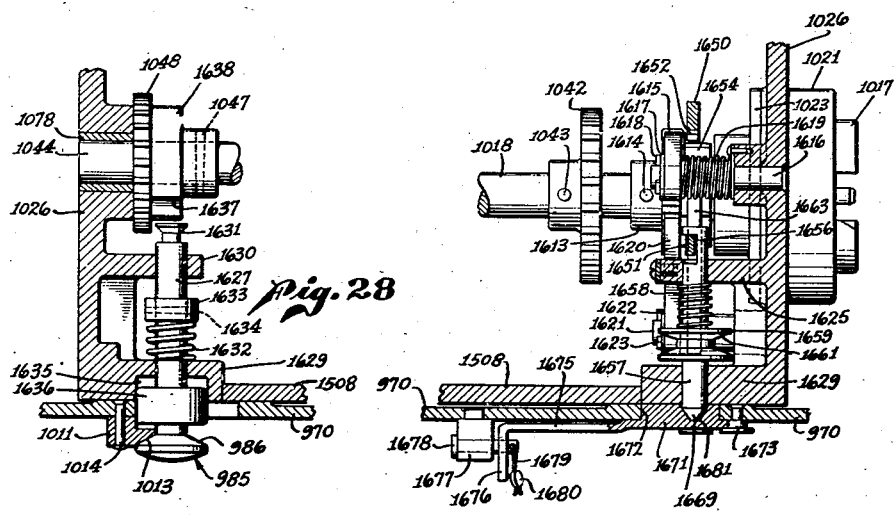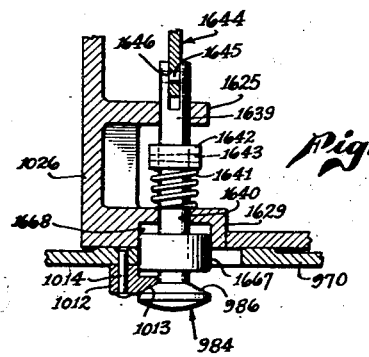

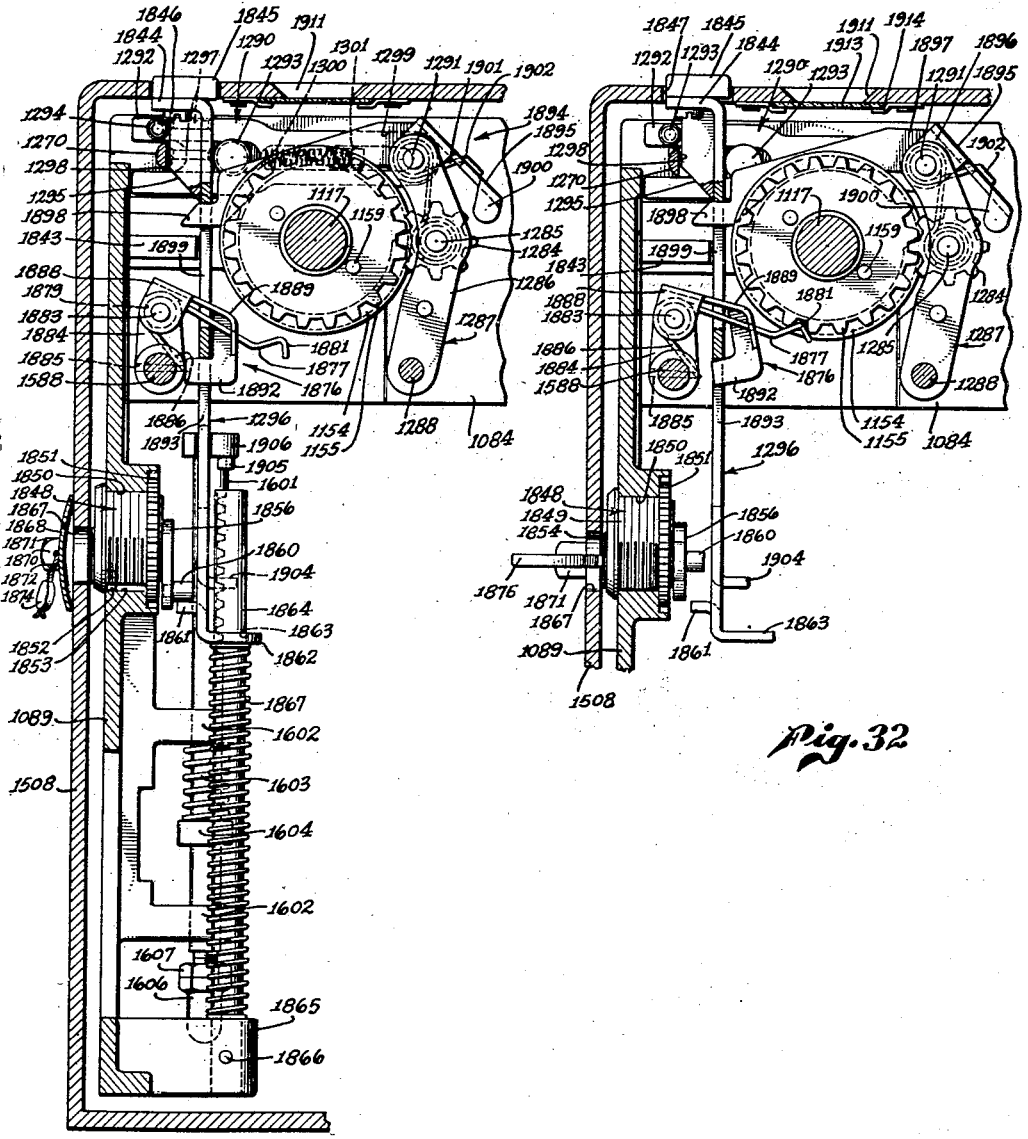

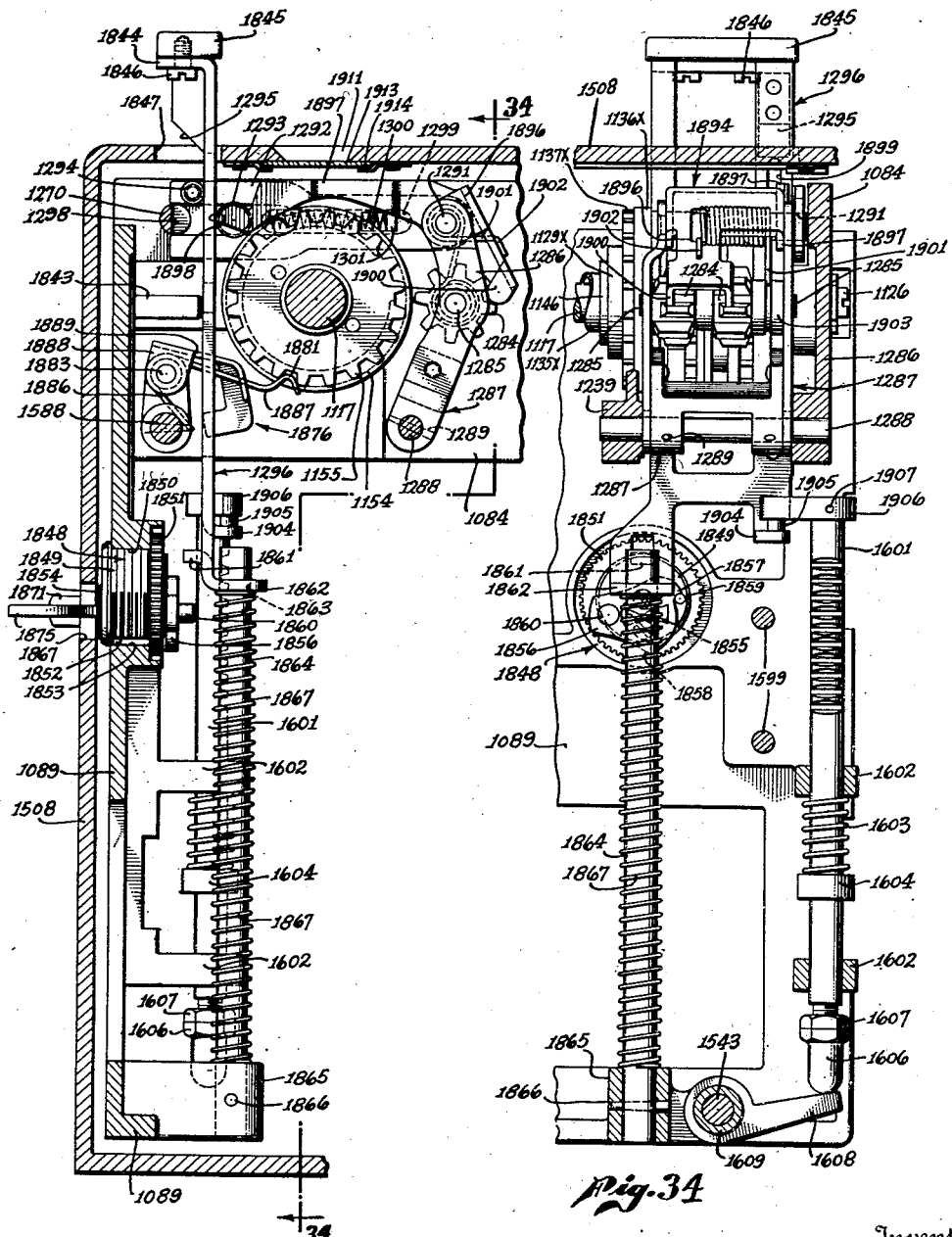

March 6, 1945.  F. P. SAGER ET AL  2,371,070
MAIL TREATING MACHINE
Filed April 29, 1940   32 Sheets-Sheet 24
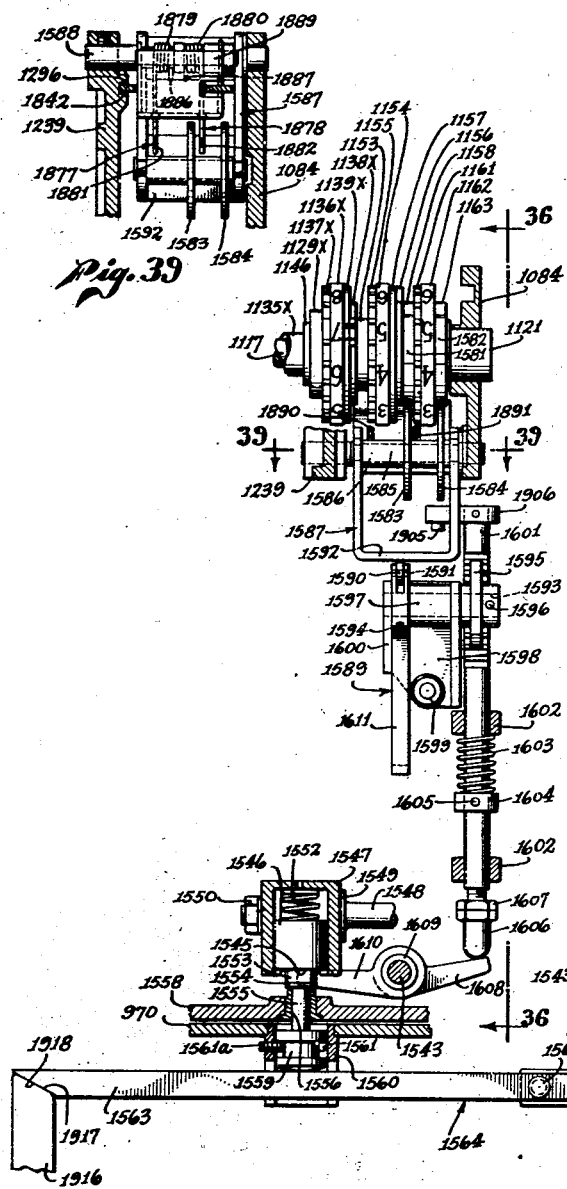
Inventors
FRANK P. SAGER,
ERNEST R. BERGMARK,
COMMODORE D. RYAN,
HERSCHEL L. ATHERTON,
By Lyon+Lyon
Attorneys

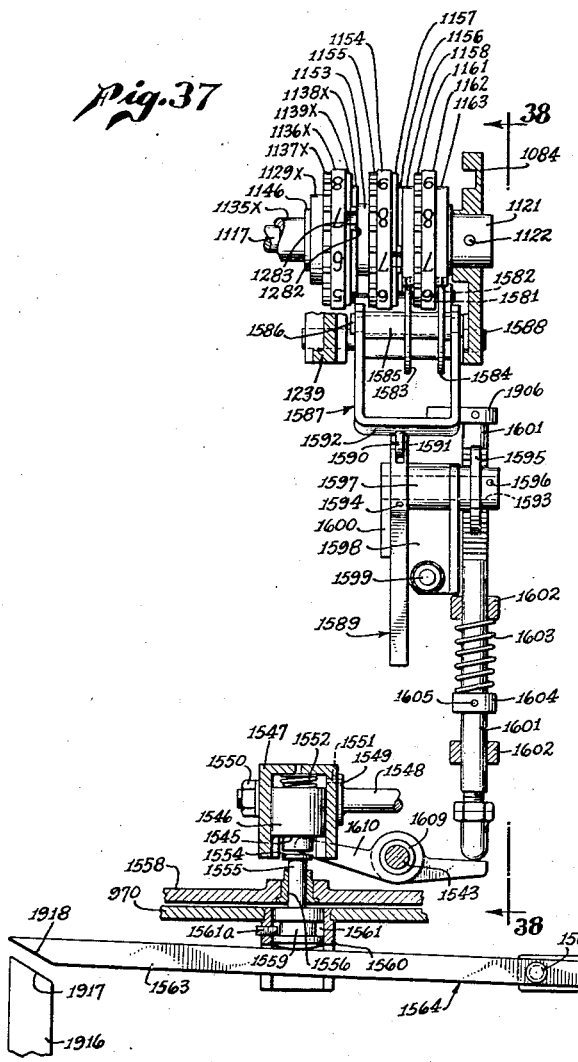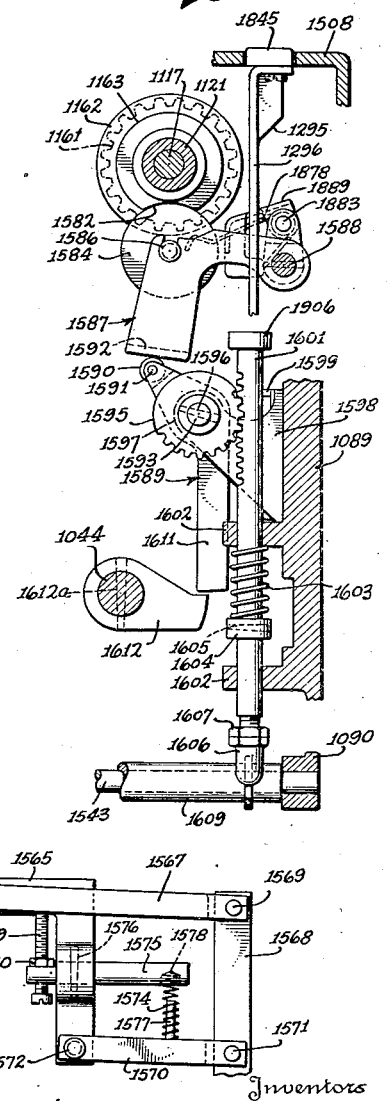

March 6, 1945. F. P. SAGER ET AL 2,371,070
MAIL TREATING MACHINE
Filed April 29, 1940 32 Sheets-Sheet 26

Inventors
FRANK P. SAGER,
ERNEST R. BERGMARK,
COMMODORE D. RYAN,
HERSCHEL L. ATHERTON,
By Lyon+Lyon attorneys

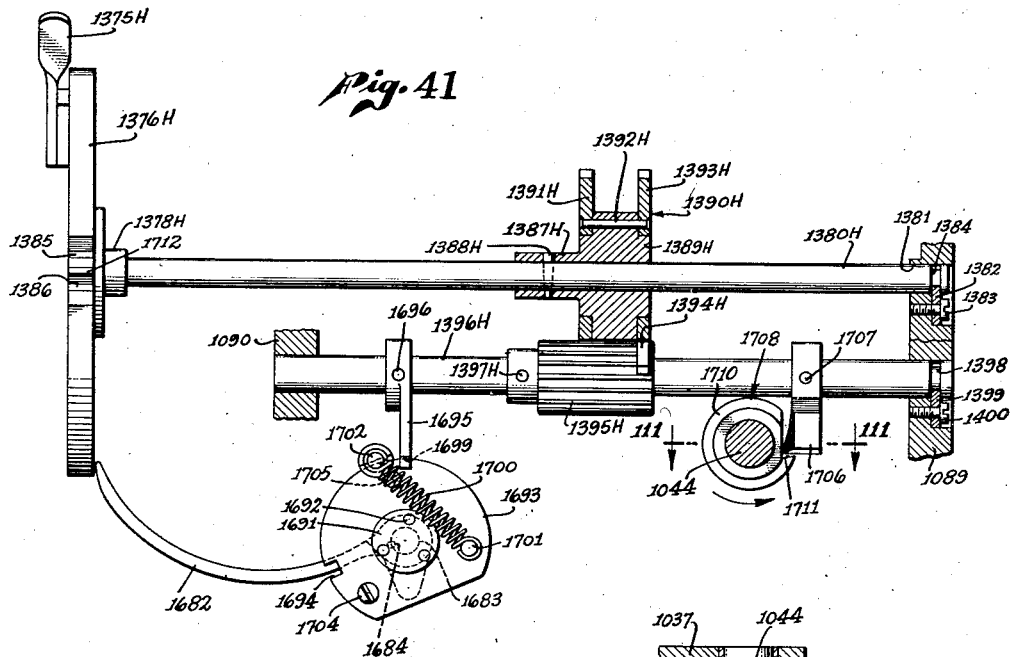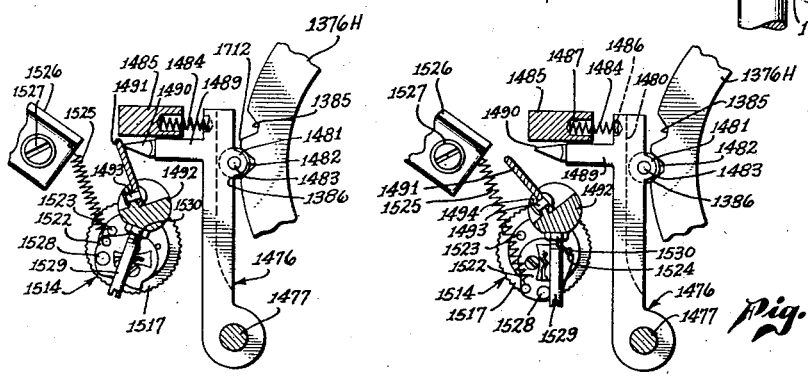

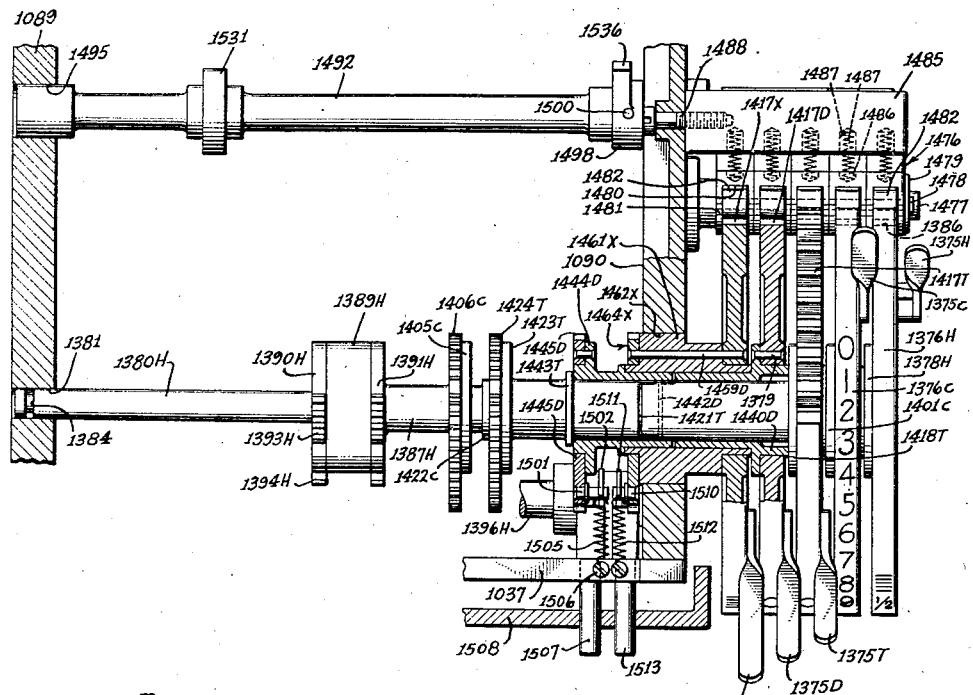
Fig. 45
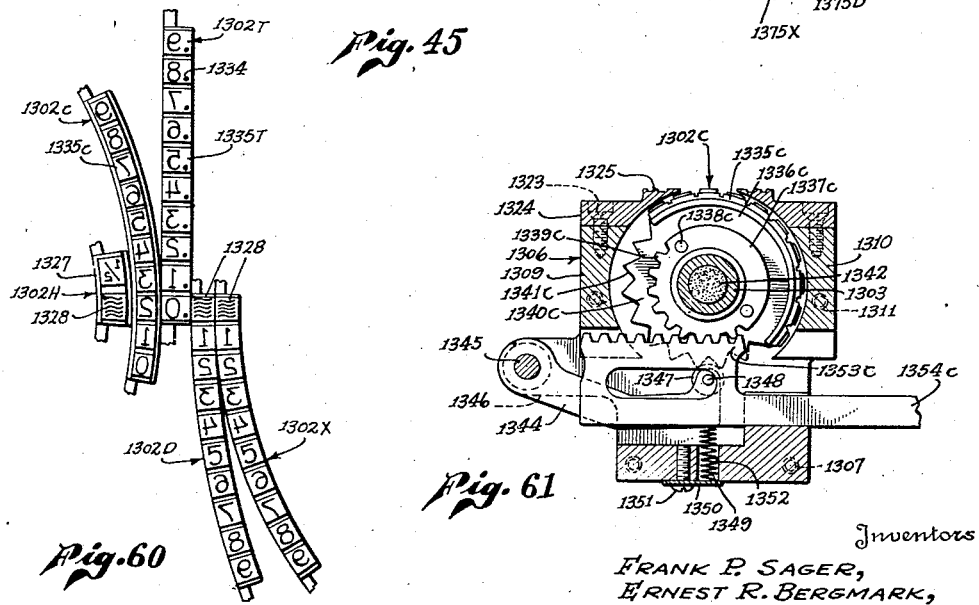
Fig. 60
Fig. 61
Inventors
FRANK P. SAGER,
ERNEST R. BERGMARK,
COMMODORE D. RYAN,
HERSCHEL L. ATHERTON,
By Lyon & Lyon
Attorneys March 6, 1945.  F. P. SAGER ET AL  2,371,070
MAIL TREATING MACHINE
Filed April 29, 1940   32 Sheets-Sheet 29
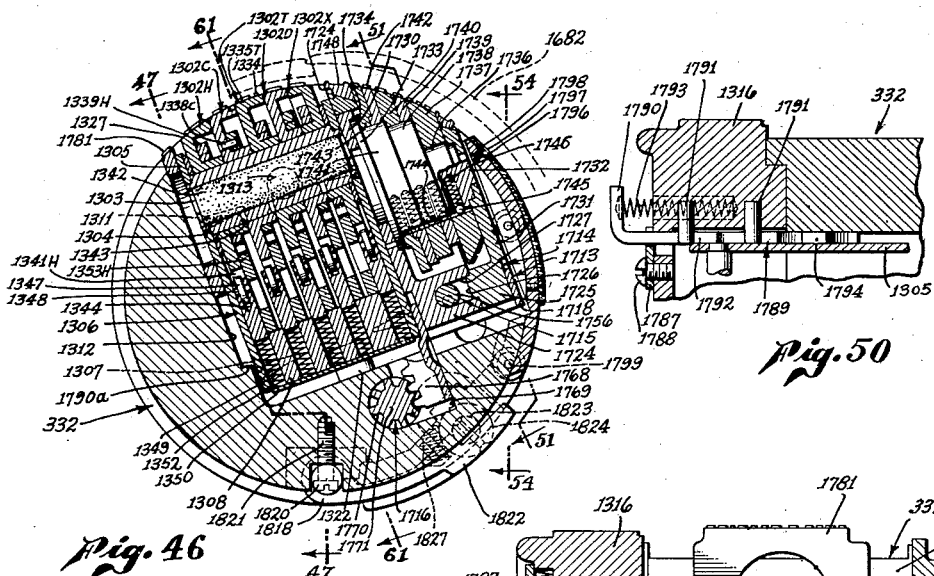
Fig. 46
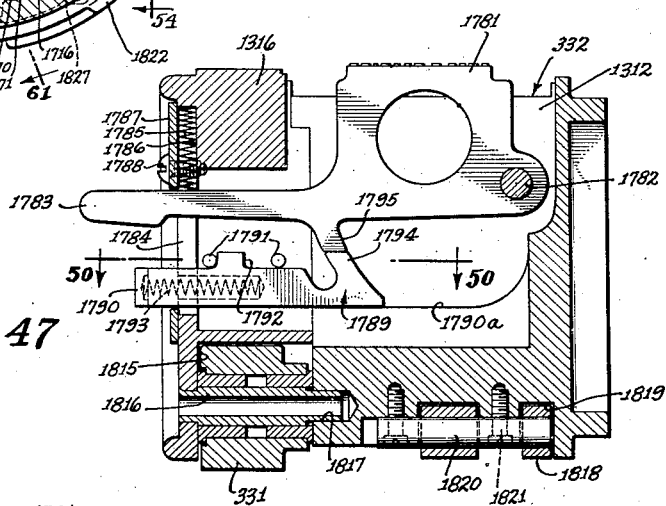
Fig. 50
Fig. 47
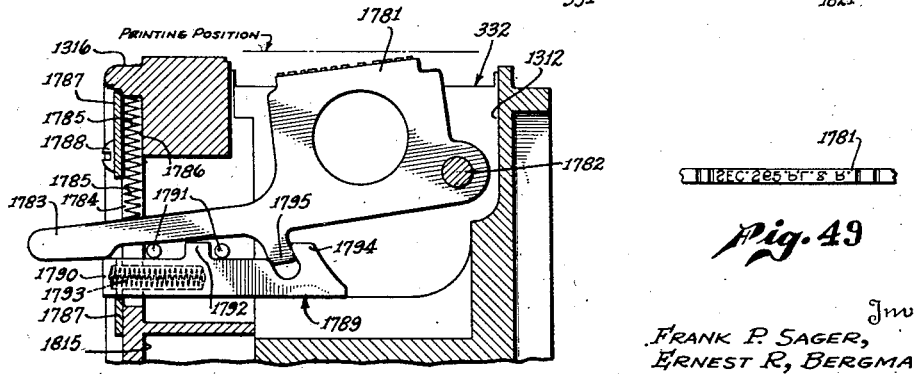
Fig. 48
Fig. 49
Inventors
FRANK P. SAGER,
ERNEST R. BERGMARK,
COMMODORE D. RYAN,
HERSCHEL L. ATHERTON,
By Lyon & Lyon
Attorneys

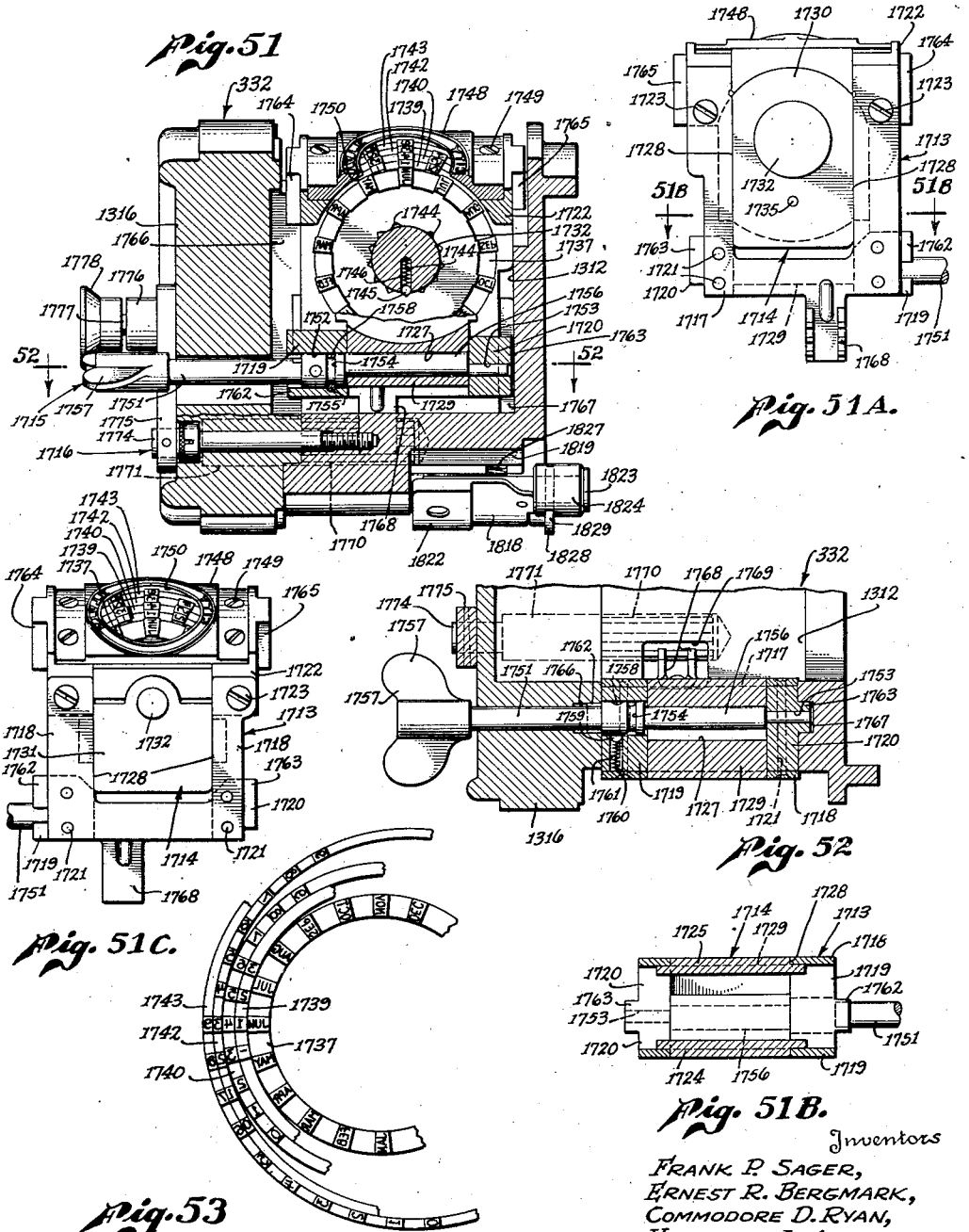

March 6, 1945.   F. P. SAGER ET AL   2,371,070
MAIL TREATING MACHINE
Filed April 29, 1940   32 Sheets-Sheet 31

Inventors
FRANK P. SAGER,
ERNEST R. BERGMARK,
COMMODORE D. RYAN,
HERSCHEL L. ATHERTON, By Lyon & Lyon
Attorneys March 6, 1945.　　F. P. SAGER ET AL　　2,371,070

MAIL TREATING MACHINE

Filed April 29, 1940　　32 Sheets-Sheet 32

Inventors
FRANK P. SAGER,
ERNEST R. BERGMARK,
COMMODORE D. RYAN,
HERSCHEL L. ATHERTON, By Lyon & Lyon
Attorneys Patented Mar. 6, 1945

2,371,070

UNITED STATES PATENT OFFICE 2,371,070

MAIL TREATING MACHINE

Frank P. Sager, Alhambra, and Ernest R. Bergmark, Commodore D. Ryan, and Herschel L. Atherton, Los Angeles, Calif., assignors to Commercial Controls Corporation, a corporation of Delaware Application April 29, 1940, Serial No. 332,305

38 Claims. (Cl. 101—91)

This invention relates to improvements in a mail treating machine and has for certain of its objects such improvements as will enable the machine to be operated efficiently at high speed; to effectively handle envelopes and cards varying greatly in width, length or in thickness; which without adjustment will treat both sealed and unsealed envelopes; will clearly print at high speed a wide range of postage values; and because of its improved character will prevent loss of postage through mutilation of the mail or other causes.

A further object is to improve the construction of the meter to enable the same to be safely operated at high speed; to be easily and conveniently set to print any one of a wide range of postage values on mail or tape; to provide novel driving connections between the source of power, the printing drum and the registers to enable the high speed operation of the machine with assurance that each value printed will be positively and accurately recorded in the registers; to provide a novel organization including denomination setting means, denomination selecting means for the registers and value printing type mounted in the printing drum, whereby the denomination setting means will at all times maintain a positive connection and control over these instrumentalities; to provide a printing drum easily and conveniently adjusted to print different classes of mail, i. e., first, second, third class (sec. 562 P. L. & R) or registered mail, parcel post or an advertising slogan; and to improve the locking and interlocking controls to prevent unauthorized use of the machine and to also prevent the waste of postage.

Other objects and advantages of the invention will become apparent as the nature of the same is more fully understood from the following description, and accompanying drawings wherein is set forth what is now considered to be a preferred embodiment. It should be understood, however, that this particular embodiment of the invention is chosen principally for the purpose of exemplification and that variations therefrom in details of construction or arrangement of the parts may accordingly be effected and yet remain within the spirit and scope of the invention as the same is set forth in the appended claims.

In the drawings:

Figure 5 is a sectional view taken substantially in the plane of line 5—5 of Fig. 3.

Figure 6 illustrates a developed diagrammatic view of the automatic and manual clutch tripping mechanism in its neutral position and as it would appear when the meter is mounted in place.

Figures 7, 8 and 9 illustrate the driving mechanism for the ink feeding device in three different operative positions.

Figure 13 is an enlarged fragmental sectional view taken generally in the plane of line 13—13 of Fig. 4 to show the manner in which the meter is mounted upon the power plant just prior to clamping the meter into its operative position.

Figure 14 is a view similar to Fig. 13, but shows the meter locked in its operative position in the power plant.

Figure 15 is a side elevational view of the meter removed from the power plant with a portion of the selector lever compartment sectionalized to show the arrangement of the selector levers and locking means therefor.

Figure 16 is a fragmentary bottom view of Fig. 15.

Figure 17 is a view taken generally in the plane of line 17—17 of Fig. 19 to show the relation of the ink feeding device of the power plant with relation to the ink transfer and feeding rollers of the meter.

Figure 18 is an enlarged fragmental sectional view taken substantially in the plane of line 18—18 of Fig. 19 and shows not only the ink transfer and feeding rollers, but also the cam means for depressing the tape feeding shoe to clear the inking rollers.

Figure 19 is an enlarged fragmentary sectional view taken substantially in the plane of line 19—19 of Fig. 17.

Figure 20 is a sectional view taken substantially in the plane of line 20—20 of Fig. 17.

Figure 27 is a fragmental view of the lower right hand portion of Fig. 26 showing the manner in which the locking means operates to lock the meter when it is removed from the power plant.

Figure 28 is a fragmental sectional view taken substantially in the plane of line 28—28 of Fig. 26.

Figure 29 is a fragmentary sectional view taken substantially in the plane of line 29—29 of Fig. 26.

Figure 30 is a fragmental sectional view taken substantially in the plane of line 30—30 of Fig. 26.

Figure 31 illustrates in enlarged detail the left hand portion of Fig. 26 to more clearly illustrate the post office locking mechanism and shows the resetting door in its locked position.

Figure 32 illustrates the upper portion of Fig. 31 to show the initial movement of the resetting mechanism when the post office lock has been turned to its open position.

Figure 33 is a view similar to Fig. 31 showing the resetting mechanism in its fully opened position.

Figure 34 is a sectional view taken substantially in the plane of line 34—34 of Fig. 33.

Figure 35 is a fragmental sectional view taken substantially in the plane of line 35—35 of Fig. 26 in combination with a portion of the power plant clutch control mechanism showing the parts as they would appear when the machine is in its normal running condition.

Figure 36 is a fragmentary sectional view taken substantially in the plane of line 36—36 of Fig. 35 showing the parts in the same operative relationship.

Figure 37 is similar to Fig. 35 but showing the parts as they would appear when the locking mechanism for the subtractive register has operated to render both the meter and power plant driving mechanism inoperative.

Figure 38 is a sectional view taken substantially in the plane of line 38—38 of Fig. 37.

Figure 39 on the same sheet as Figure 35 is a fragmental sectional view taken substantially in the plane of line 39—39 of Fig. 35.

Figure 40:
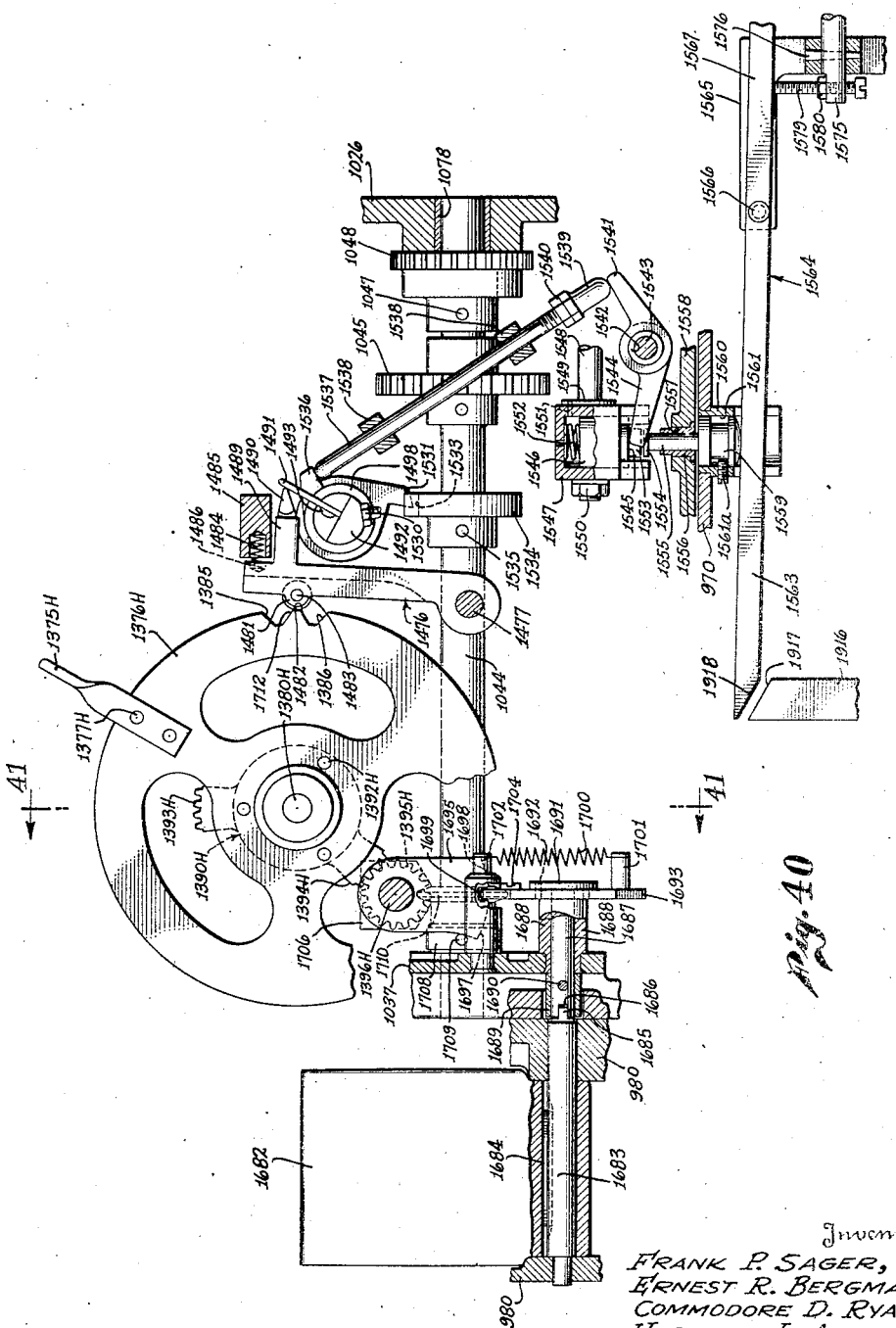

Figure 40 is a composite view showing the elements interlocking the one-half cent selector lever, printing head door, meter drive shaft and power plant clutch control mechanism and showing the relation of these parts as they appear in locked position.

Figure 41 is a fragmentary sectional view taken substantially in the plane of lines 41—41 of Fig. 40, but showing the printer head door in its open position.

Figure 25:
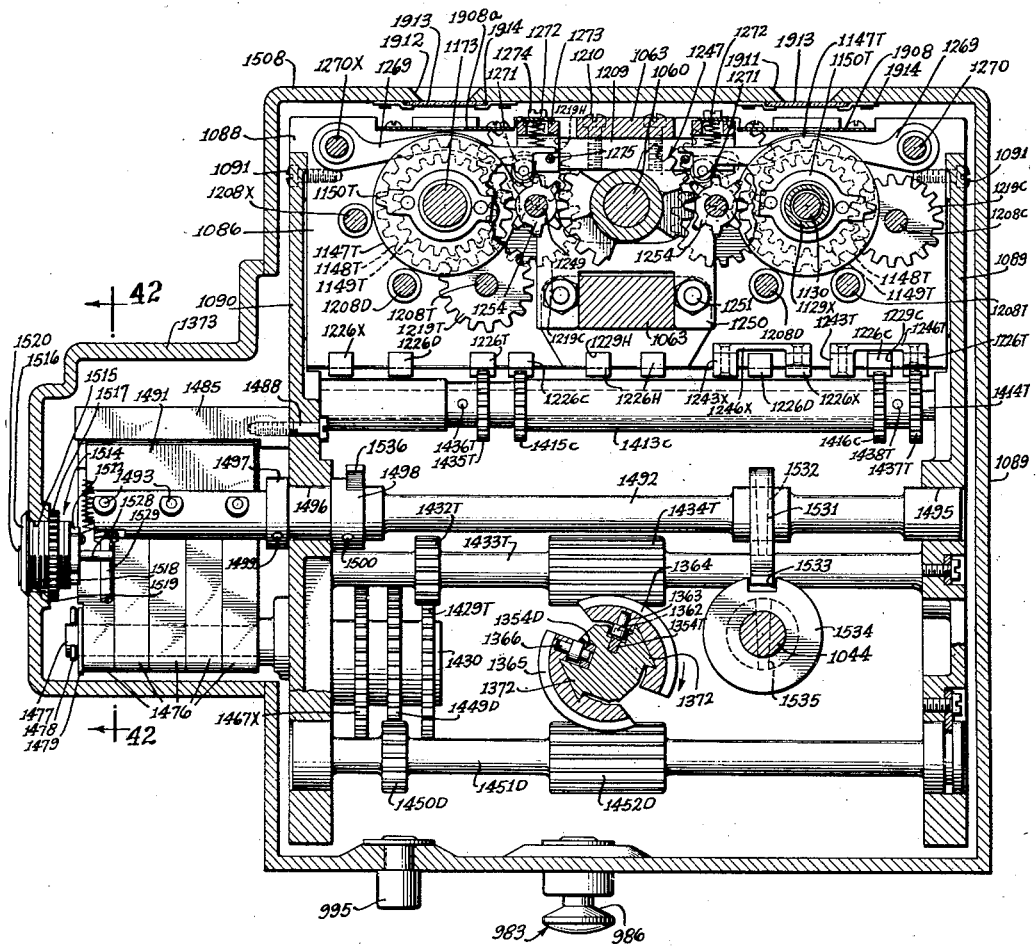
Figure 25 is a sectional view of the meter taken substantially in the plane of line 25—25 of Fig. 19.

Figure 42 is a fragmentary sectional view taken substantially in the plane of line 42—42 of Fig. 25 showing the meter lock in its unlocked position.

Figure 43 is similar to Figure 42, but illustrates the meter lock in its locked position.

Figure 44 is the fragmentary sectional view taken substantially in the plane of line 44—44 of Fig. 41.

Figure 45 is a fragmentary view taken generally in the plane of line 45—45 of Fig. 15 with certain portions of the view in section to more clearly show the construction of the dollars and tens of dollars safety locks.

Figure 46 is a fragmentary sectional view taken substantially in the plane of line 46—46 of Fig. 19.

Figure 47 is a sectional view taken substantially in the plane of line 47—47 of Fig. 46 and shows the type bar for printing, section 562 P. L. & R., on third class matter, in printing position.

Figure 48 is similar to Fig. 47, but showing the type bar withdrawn from printing position.

Figure 49 illustrates the face portion of the type bar shown in Figs. 47 and 48.

Figure 50 is a fragmentary sectional view taken substantially in the plane of line 50—50 of Fig. 47.

Figure 51 is a sectional view on an enlarged scale taken substantially in the plane of line 51—51 of Fig. 46.

Figure 51a is a left side elevation of the town circle and date wheel assembly as it would appear when removed from the printing drum.

Figure 51b is a sectional view taken substantially in the plane of lines 51b—51b of Fig. 51a.

Figure 51c is a right hand elevational view of the town circle and date wheel assembly as it would appear when removed from the printing drum.

Figure 52 is a fragmentary sectional view taken substantially in the plane of line 52—52 of Fig. 51.

Figure 53 is a developed view of the type faces of the date printing wheels.

Figure 54:
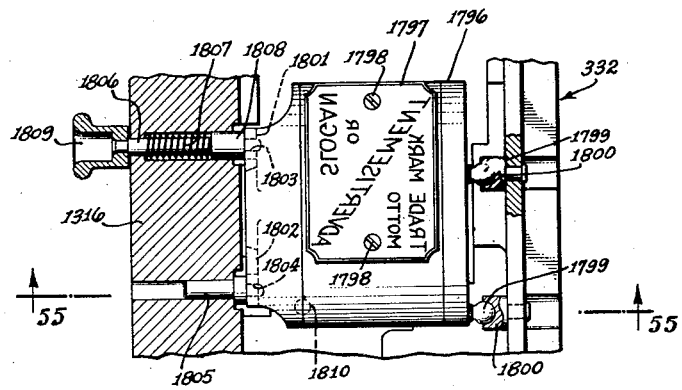

Figure 54 is a fragmentary sectional view taken substantially in the plane of line 54—54 of Fig. 46.

Figure 55:
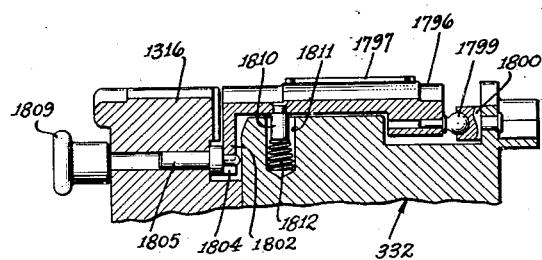

Figure 55 is a fragmentary sectional view taken substantially in the plane of line 55—55 of Fig. 54.

Figure 56:
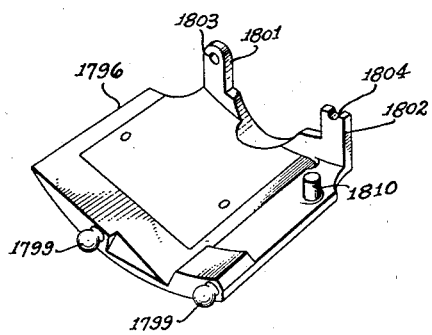

Figure 56 is a perspective view of the underside of the advertising slogan printing plate.

Figure 57:
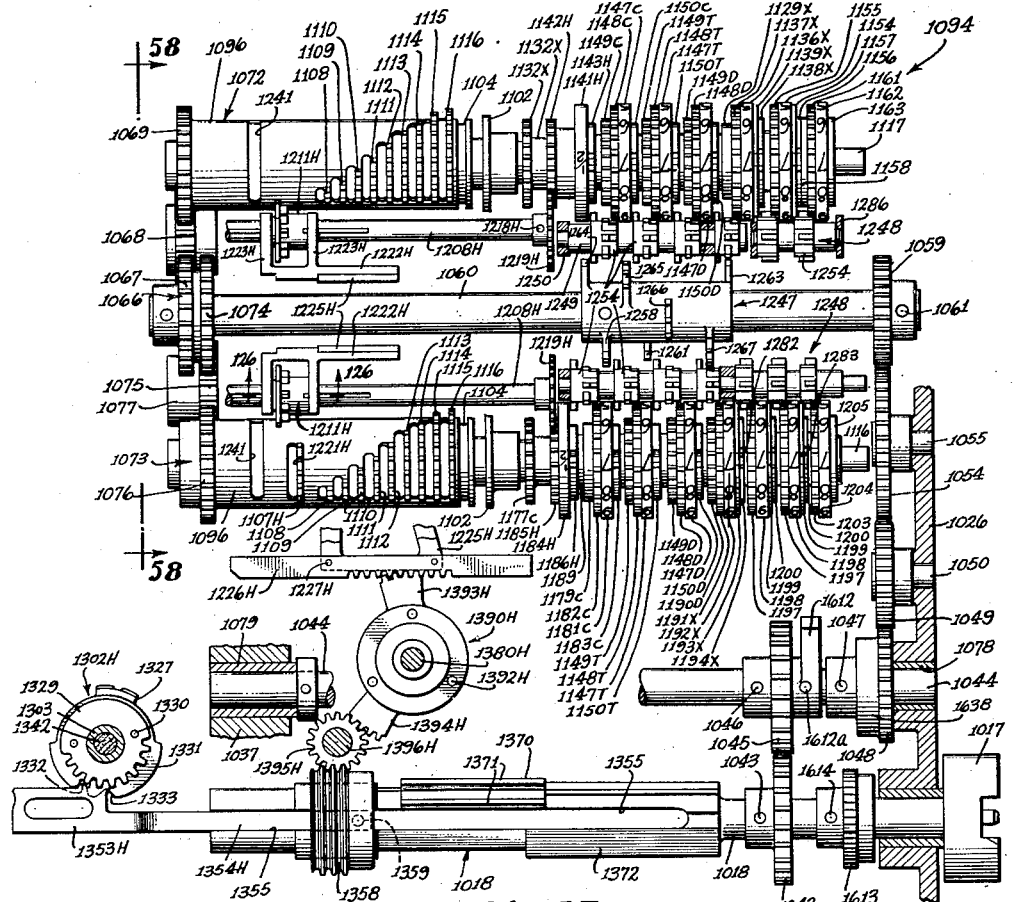

Figure 57 illustrates a developed composite view of the two registers, driving means and the half cent selector device.

Figures 58, 59:
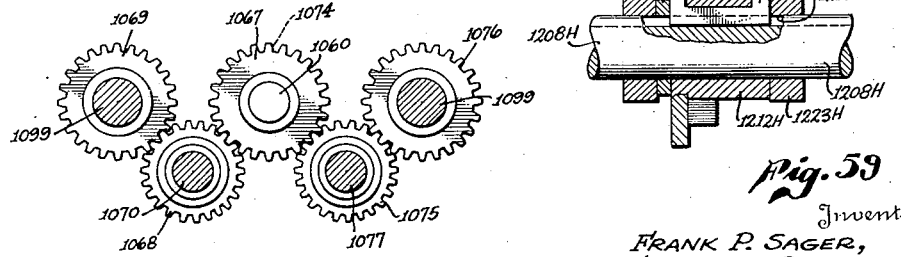

Figure 58 is a fragmental view taken substantially in the plane of line 58—58 of Fig. 57.

Figure 59 is an enlarged fragmental sectional view taken substantially in the plane of line 59—59 of Fig. 57.

Figure 60 is a developed plan view of the type face of the printing wheel flanges.

Figure 61 is a fragmental sectional view taken substantially in the plane of line 61—61 of Fig. 46.

GENERAL DESCRIPTION

The preferred embodiment of the mail treating machine illustrated in the drawings is an all purpose machine, that is, a machine readily adjusted to treating all types and classes of mail matter including first, second and third class mail, registered mail and parcel post, and for printing any one of a wide range of postage values, namely from one-half cent to ninety-nine dollars and nine-nine and one-half cents by steps of one-half cent, for all of the above classes of mail matter and parcel post. The machine provides for treating the above classes of mail matter at high speed and under full control and protection against waste of postage or unauthorized use, and may be easily and conveniently adjusted to seal and stamp or stamp without sealing or sealing without stamping envelopes of various lengths, widths and thicknesses.

The description of the machine and its operation will be generally directed to the use of the machine while treating envelopes and printing postage on gummed tape. It will be appreciated, however, that with the exception of sealing, postcards may be treated equally as well.

The machine includes generally the following major elements and instrumentalities, which for convenience, will be identified by the general reference numbers preceding each of these elements and instrumentalities.

150—Frame structure.
151—Feeding hopper.
152—Stripper.
153—Conveyor feeding system for the mail matter.
154—Envelope flap moistening device.
155—Power plant and driving mechanism.
156—Tape feeding device.
157—Meter.
158—Ink feeding mechanism for the meter.

The following description is directed to the frame structure 150, meter 157, and to the ink feeding mechanism 158, the other listed major elements being particularly shown and described in the hereinbelow scheduled copending applications or patents, as the case may be:

151—Feeding hopper—Patent No. 2,343,479;
152—Stripper—Patent No. 2,343,479;
153—Conveyor feeding system for the mailing matter—Patent No. 2,303,060; application Ser. No. 462,262, filed October 16, 1942; application Ser. No. 500,755, filed September 1, 1943;
154—Envelope flap moistening device—application Ser. No. 412,543, filed September 27, 1941; application Ser. No. 446,755, filed June 12, 1942;
155—Power plant and driving mechanism—application Ser. No. 435,448, filed March 20, 1942; application Ser. No. 450,155, filed July 8, 1942;
156—Tape feeding device—application Ser. No. 496,558, filed July 29, 1943.

150 FRAME STRUCTURE

The frame structure 150 may be of any suitable type of construction to support the different elements and instrumentalities of the machine. It provides the necessary supporting brackets, bearings and cover plates, and reference numbers will be given to those parts of the frame which enter into the description and operation of the machine.

Figure 2:
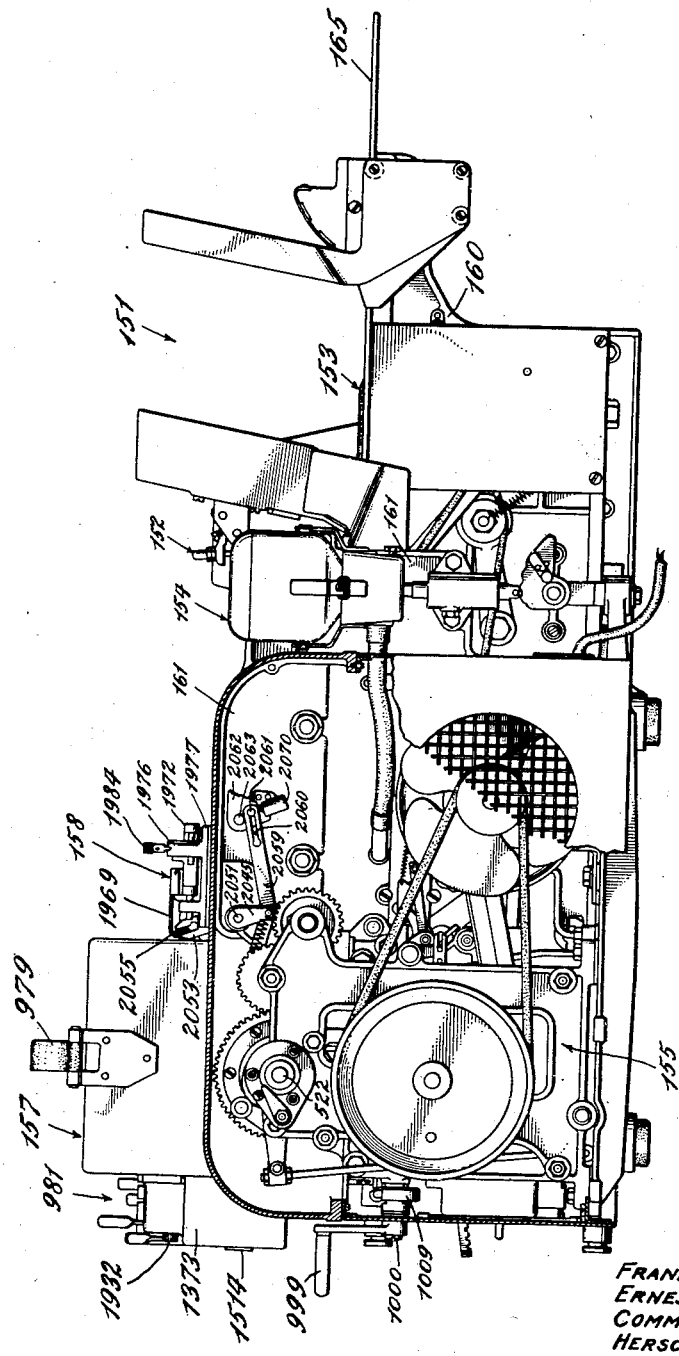
Figure 2 is a rear view taken substantially in the plane of line 2—2 of Fig. 4 with a portion of the casing removed to better show the driving mechanism. In this view the water bottle and its elevating cam are shown as they would appear during the normal operation of the machine.

In general, the frame includes a base 159 (Figs. 2, 3 and 4), a front plate 160 on which the sealer 155 is supported, an intermediate plate 161 on which is mounted a part of the envelope hopper 151, and the envelope stripper 152. Between plate 160 and 161, the conveyor system 154 is mounted. The frame also includes a meter supporting plate 162 which supports in part the tape feeding device 158. A front transmission bracket 163 and rear transmission bracket 164 is mounted on the frame for supporting a portion of the power plant driving mechanism.

Other portions of frame 150 will be pointed out and described during the description and operation of the machine.

The front wall 160 does not extend as high as the intermediate wall 161 and supports along its upper edge, an envelope conveyor table 165 (Figs. 1-5). The conveyor table 165 is in the form of a plate along which the envelopes are conveyed from the feed hopper 151 through the sealing mechanism to the printing drum of the meter as shown in said Patent No. 2,302,060.

The inner edge of the conveyor table plate 165 is spaced a short distance from the intermediate frame plate 161 in order to provide space for the depending flaps of the envelopes conveyed along the table to the sealing mechanism.

The moistening and folding of the flap against the body portion of the envelope takes place just prior to the delivery of the envelope to the printing drum of the meter in a manner as will be later described.

The conveyor table 165 is preferably of such size as to accommodate a wide range of envelope lengths and widths.

Figure 1:
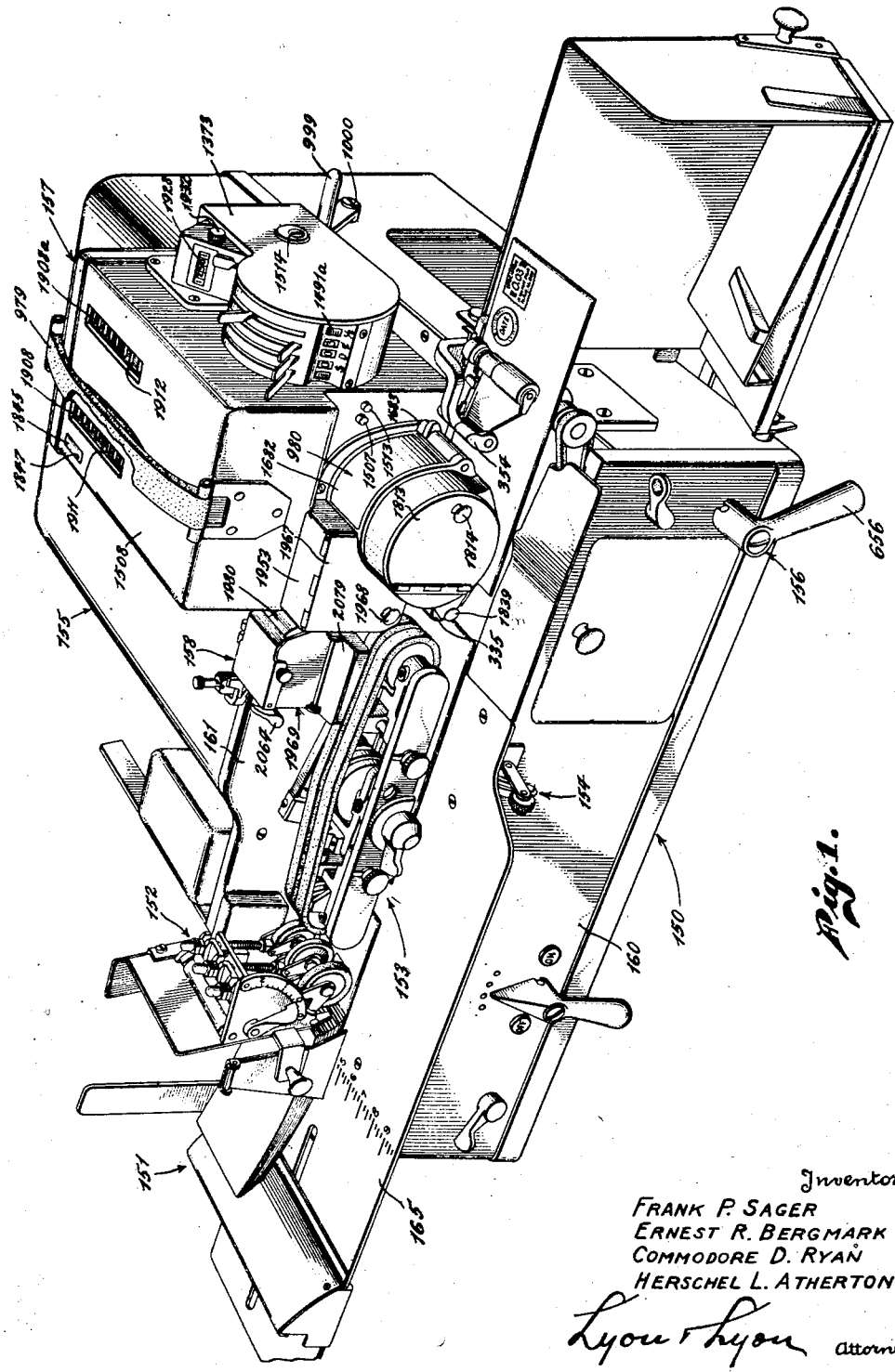
Figure 1 is a perspective view of the machine.
Figure 3:
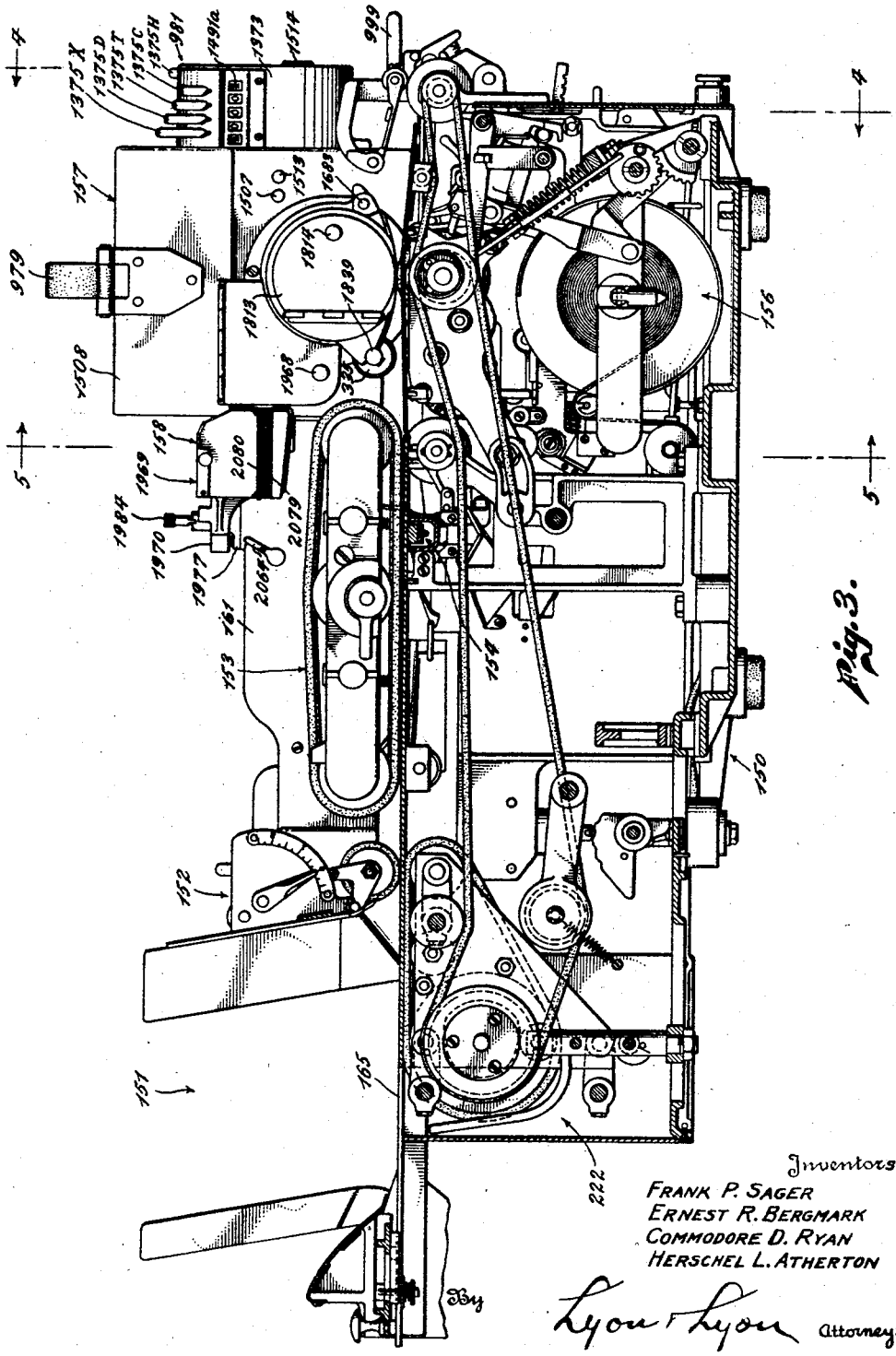
Figure 3 is a sectional view taken substantially in the plane of line 3—3 of Fig. 4 to show the envelope hopper, stripper and conveying mechanism. It also shows the tape feeding device in its retracted inoperative position along with other details of the machine.

An envelope feeding hopper 151 as shown in Patent No. 2,343,479 is arranged adjacent the left hand end of the conveyor table 165 in the manner shown most clearly in Figs. 1 and 3.

The stripper mechanism 152, also shown in said Patent No. 2,343,479, comprises another important feature of the machine. It operates to prevent the feeding of more than one envelope or piece of mail matter from the hopper at any one time. As a further feature, the stripper is made adjustable so as to efficiently strip relative thick, as well as extremely thin light mail matter.

Another important feature of this machine resides in the provision of a conveyor feed system 153 shown in said Patent No. 2,302,060 which will operate to meter the envelopes from the feed hopper, to convey these metered envelopes past moistening and printing devices and finally to eject the treated envelopes from the machine.

The envelope flap moistening device 154 comprises another of the important features of this machine, and is shown in the copending applications noted in the above schedule.

The mail treating machine is provided with a tape feeding device 156 formed as an integral part of the machine shown and described in said application Serial No. 496,558, filed July 29, 1943. The device may be conveniently moved to or from its printing position through the manual manipulation of a single lever.

The mechanism by means of which the device is moved from its non-printing to its printing position also operates means for rendering the envelope conveyor system 153 inoperative, to prevent simultaneous feeding of mail matter and tape. This mechanism also renders the manual trip device operative so that upon each successive manipulation of said trip the clutch control mechanism will be actuated to engage the meter driving clutch for a cycle of operation to print a stamp of selected value upon a strip of gummed tape.

The positioning mechanism for the tape feeding device while operating to return said device from its printing to its non-printing position will operate to automatically return the conveyor system to its operative condition and to render the manual clutch trip device inoperative.

The tape feeding device is provided with safety control means to prevent operation of the machine unless it is in condition to print a perfect stamp.

The tape feeding device 156 may be generally divided into three different portions namely a tape feed portion, a tape cutting and moistening portion and a positioning portion.

The tape feeding portion and the tape cutting and moistening portion of the device are separable to enable these to be brought up over the platen roller from each side so as to straddle the roller when moved up into printing position and to divide and retract in the reverse order when these two portions are moved to their non-printing positions.

The meter (Figures 1, 2, 3, 4, 13–58) of this invention is of sturdy construction insuring long life and is entirely enclosed and protected to prevent unauthorized use or tampering with the operating, printing or registering mechanisms thereof. The meter is provided with a simple drive, having a minimum number of rotating parts, which due to this simplicity and sturdy construction is capable of operating continuously at relatively high speed. As a further advantage all of the driven instrumentalities are maintained in positive driving engagement from the setting of a postage value until the completion of an operating cycle.

The meter is capable of printing a wide range of postage values, which in this embodiment includes values from ½-cent to $99.99½ by steps of ½-cent each.

A further feature resides in the provision of selector mechanism which may be easily and quickly manipulated to adjust the machine to print any selected value within the printing range of the machine. The selector mechanism includes an additional novel feature, namely, in maintaining at all times a positive connection with the denomination printing dies and the registers' selective drive units.

The meter includes an additive register and a subtractive register of sturdy construction, having easily read value wheels, positive and reliable transfer mechanisms and the subtractive register is provided with a locking organization for locking the machine against further use when the amount of postage entered therein has been used up and which subtractive register may be readily unlocked and reset by the proper post office authorities.

Another important feature resides in the provision of a meter which is readily adjustable to print the proper indicia for all classes of mail matter, and which meter will print without adjustment the selected indicia upon a wide range of envelope sizes and thicknesses, and upon cards or gummed tape.

A further feature is to provide the meter with a full set of locks and inter-locks to prevent misuse, to protect against possible waste of postage, and to prevent unauthorized use.

A further feature resides in the provision of a meter which is portable and which may be easily mounted upon or removed from the power plant portion of the machine.

The meter includes many other features and advantages which will be brought out during the description of its construction and operation.

GENERAL DESCRIPTION

The meter is in general a rectangular structure and its operating parts are entirely enclosed and protected by suitable covers and housings, as will be later described. In Fig. 1, the meter is provided with a handle 979 to enable the meter to be conveniently carried to the post office for setting and also for mounting or removing the meter from the power plant.

The forward end of the meter is provided with a printing drum housing 980 and at its right hand side, as viewed in Figure 1, with a denomination selector mechanism 981, and at its rear with a drive coupling 982 (Figs. 4, 15, 19 and 57).

The top rear surface of the meter is provided with two windows through which the additive and subtractive registers may be read.

The bottom surface of the meter is provided with a forward positioning and locking pin 983 and two spaced rear positioning and locking pins 984 and 985. Each of these pins is provided with an annular locking groove 986 by means of which the meter is positioned and locked in printing and driving register with the power plant portion of the machine.

MOUNTING OF METER ON POWER PLANT

The power plant portion of the machine is provided with a meter supporting plate 970 which plate at its forward end is mounted upon the upper surface of meter supporting bracket 162. The bracket is provided with bosses 987 (Figs. 4 and 13) to which the plate is securely fastened by means of screws 988. The rear end of plate 970 is securely fastened to blocks 989 (Figs. 4 and 5) by means of screws 990 and the blocks are fastened to the forward transmission bracket 163 by cap screws 991.

The meter supporting plate 970 is provided with three spaced openings 992, 993 and 994, which openings are more or less egg shaped, as shown in Figs. 13 and 14, through which the three meter locking pins extend when the meter is mounted upon the power plant.

When mounting the meter on power plant plate 970, its three locking pins are entered into the larger end of the three openings as shown in Fig. 79 and means are provided for shifting the meter until its pins engage the smaller ends of said openings. The meter is provided with a positioning pin 995 (Figs. 13, 14 and 20) which extends through an elongated opening 996 formed in plate 970 against which pin the meter positioning and locking lever 997 engages during the rotation of said lever about its pivot pin 998 to shift the meter from its mounting position, as shown in Fig. 79, to its locked operative position, as shown in Fig. 14.

The means for operating the meter positioning and locking lever 997 may include crank handle 999 pivotally mounted upon the forward transmission bracket 163 by pivot bolt 1000 (Figs. 1, 2, 4, 13 and 14) and connecting the crank arm 1001 of said crank to the meter positioning and locking lever 997 by means of connecting rod 1002. The forward end of connecting rod 1002 is pivotally connected to the meter positioning and locking lever 997 by a ball joint 1003. This ball joint may include slidably mounting a ball like member 1004 upon the connecting rod in position to engage a semi-spherical surface 1005 formed on lever 997 and interposing a compression spring 1006 between said member and a collar 1007 which collar is securely fastened to the forward end of the connecting rod. The compression spring is arranged to yieldingly urge lever 997 against a connecting rod stop collar 1008 which collar is securely fastened upon the connecting rod 1002, as shown in Fig. 13.

Due to the above described construction the meter positioning and locking lever 997 will be positively returned to its unlocked position, as shown in Fig. 13, by the connecting rod collar 1008 directly engaging the positioning and locking lever 997.

It is preferable to provide the rear end of connecting rod 1002 with a goose neck portion 1009 (Fig. 4) to enable the operating crank arm 1000 to pass over center when the meter is positioned and locked upon the power plant and the crank arm is held in this over center locking position by the tension of compression spring 1008.

The rotation of crank handle 999 from its retracted position of Fig. 13 to its locking position of Fig. 14, will through its connecting mechanism rotate the meter positioning and locking lever 997 in a counter-clockwise direction and during this rotation will engage the meter positioning pin 995, though such engagement will move the meter into its operative locked position.

The movement of the meter into its operative position as shown in Fig. 14 is employed to lock the meter to the supporting plate 970 by providing, adjacent the smaller end of each of the three openings formed in the meter supporting plate, a locking member 1010, 1011 and 1012 each of which is provided with a cam surface 1013 (Figs. 14 and 20) for engaging the annular locking grooves 986 formed in the meter positioning and locking pins. The engaging surfaces formed between the locking members and meter pins are preferably tapered as shown in the drawings for drawing the meter down tightly onto the plate when moved into its locked position. As shown in the drawings, the locking members may be fastened to the under surface of meter supporting plate by rivets 1014 (Figs. 13, 14 and 19).

The advantage of the mechanism just described permits the meter to be placed onto the meter supporting plate 970 and then moved rearwardly and to the left, as viewed in Figs. 13 and 14, along the surface of said plate into its operative position. To remove the meter from the power plant, the above described procedure will be reversed. The horizontal movement of the meter to or from its operative position is employed to connect or disconnect the meter driving coupling 982. In Fig. 13, the coupling is shown disconnected and the meter ready to be lifted from the power plant, while in Fig. 14, the coupling is shown connected and the meter is in its normal driving position.

The meter positioning and locking means just described provides a simple and effective mechanism for mounting the meter upon the power plant in its correct operating relation thereto or for removing the meter therefrom. It insures the correct aligning and connecting of the meter driving coupling 982 so that when the meter is moved to its operative position, it is automatically coupled with the power plant driving mechanism. The meter driving coupling 982 is of the type commonly used in machines of this character in which the two parts can be connected only when presented in proper relation. The coupling drive member 1016 is securely fastened to the forward end of the power plant driving mechanism shaft 522 (Fig. 4) by means of taper pin (not shown), while the driven member 1017 is securely fastened to the adjacent end of the meter drive shaft 1018 by taper pin 1019 and also by means of key 1020 (Fig. 19).

METER DRIVING MECHANISM

A guard ring 1021 surrounds the meter drive coupling member 1017, as shown in Figs. 15 and 19, to completely cover the portion of coupling 1017 through which the taper pin 1019 extends and in this way to protect the coupling from tampering. The guard ring may be fastened to the meter casing by means of screws 1022 (Fig. 19) extending through the casing and screw threaded into an annular ring 1023. The guard ring is counterbored to permit the heads of screws 1022 to be deeply set therein and in order to conceal the heads of screws 1022, the counterbored portion is filled with a sealing material 1024 thereby making it difficult to obtain access to the screws.

The meter drive shaft 1018 extends through the rear and forward ends of the meter housing. The rear end of said shaft is journaled in bearing 1025 carried by the meter rear frame plate 1026, and the forward end of shaft is mounted within the hub portion 1027 of the printing drum flange 1028 and is connected thereto in driving relation by a suitable drive key 1029 and secured therein by retaining plate 1030 which is fastened to the end of the shaft by means of screw 1031 and dowel pins 1032. The retaining plate 1030 acts to clamp washer 1033 between the inner end of hub 1027 and shoulder 1034 formed on the shaft. The hub portion 1027 of the printing drum flange 1028 is journaled in bearing 1035 which bearing is confined between the flange portion of the hub and washer 1033 so as to limit the axial movement of said shaft. The bearing 1035 is mounted in an annular ring 1036 which annular ring is mounted in the front bearing plate 1037 of the meter frame and is maintained therein by suitable means (not shown).

Attention is directed to Fig. 19 wherein it may be observed that bearing 1035 is provided with flange 1038 for confining the bearing within the annular ring 1036 in one direction of movement and that the ring is prevented from movement with respect to the bearing in the opposite direction by its engagement with the printing drum flange 1028. Due to this particular arrangement of the parts, the front shaft bearing and its annular ring 1036 will be maintained as an operative unit upon the shaft assembly and will remain with the shaft when the same is disassembled from the meter and likewise will be carried by the shaft during the assembly of the shaft into the meter frame. It is preferable to provide the annular ring 1036 with an annular oil groove 1039 and to mount wicking or other suitable oil conducting material within said groove and to communicate the groove with the hub bearing through suitable oil holes. It is also desirable to provide the front bearing plate 1037 with a duct 1040 for supplying oil to the wicking 1039.

The printing drum 332 is fastened to flange 1028 by means of screws 1041 (Figs. 18 and 19) thereby directly mounting the printing drum upon the forward end of meter shaft 1018 and as a result each rotation of the shaft will cause the printing drum to be rotated through a complete printing cycle of operation. In this way a direct drive is obtained between the meter shaft and its printing drum and permits high speed operation of the machine.

The meter shaft is at all times maintained in driving relation, not only with the printing drum, in the manner above pointed out, but also with the actuating mechanism for the additive and subtractive registers. This transmission mechanism includes securing driving gear 1042 to shaft 1018 by taper pin 1043 and providing a countershaft 1044 with gear 1045 meshing with driving gear 1042. The gear 1045 may be fastened to the countershaft by any suitable means such as taper pin 1046. Secured to countershaft 1044 by taper pin 1047 is gear 1048 meshing with an idler gear 1049 journaled upon stub shaft 1050 extending from a suitable boss 1051 formed upon the inner face of the rear meter plate 1026 and said idler gear is maintained upon said stub shaft by cotter pin 1052 and washer 1053. A second and larger idler gear 1054 is driven from the first idler gear. This second idler gear is journaled upon stub shaft 1055 which shaft is mounted in a suitable boss 1056 formed upon the inner face of the meter plate 1026 and the second idler is maintained upon its stub shaft by means of cotter pin 1057 and washer 1058. The large idler 1054 drives gear 1059 which gear is keyed upon the rear end of transfer shaft 1060 as by means of taper pin 1061.

The transfer shaft 1060 adjacent gear 1059 is journaled in bearing 1062 formed in a yoke member 1063 of the register frame and the transfer shaft adjacent its forward end is journaled in bearing 1064 formed in the forward end of said yoke member.

Securely fastened to the forward end of transfer shaft 1060 by means of taper pin 1065 is a pair of gears 1066. The outermost gear 1067 of said pair of gears, drives the subtractive register through an idler gear 1068 and the actuator gear 1069. The idler gear 1068 is journaled upon a stub shaft 1070 extending inwardly from the front register frame plate 1071, while the actuator gear 1069 is preferably formed as an integral part of the subtractive register actuator 1072.

Figure 22:
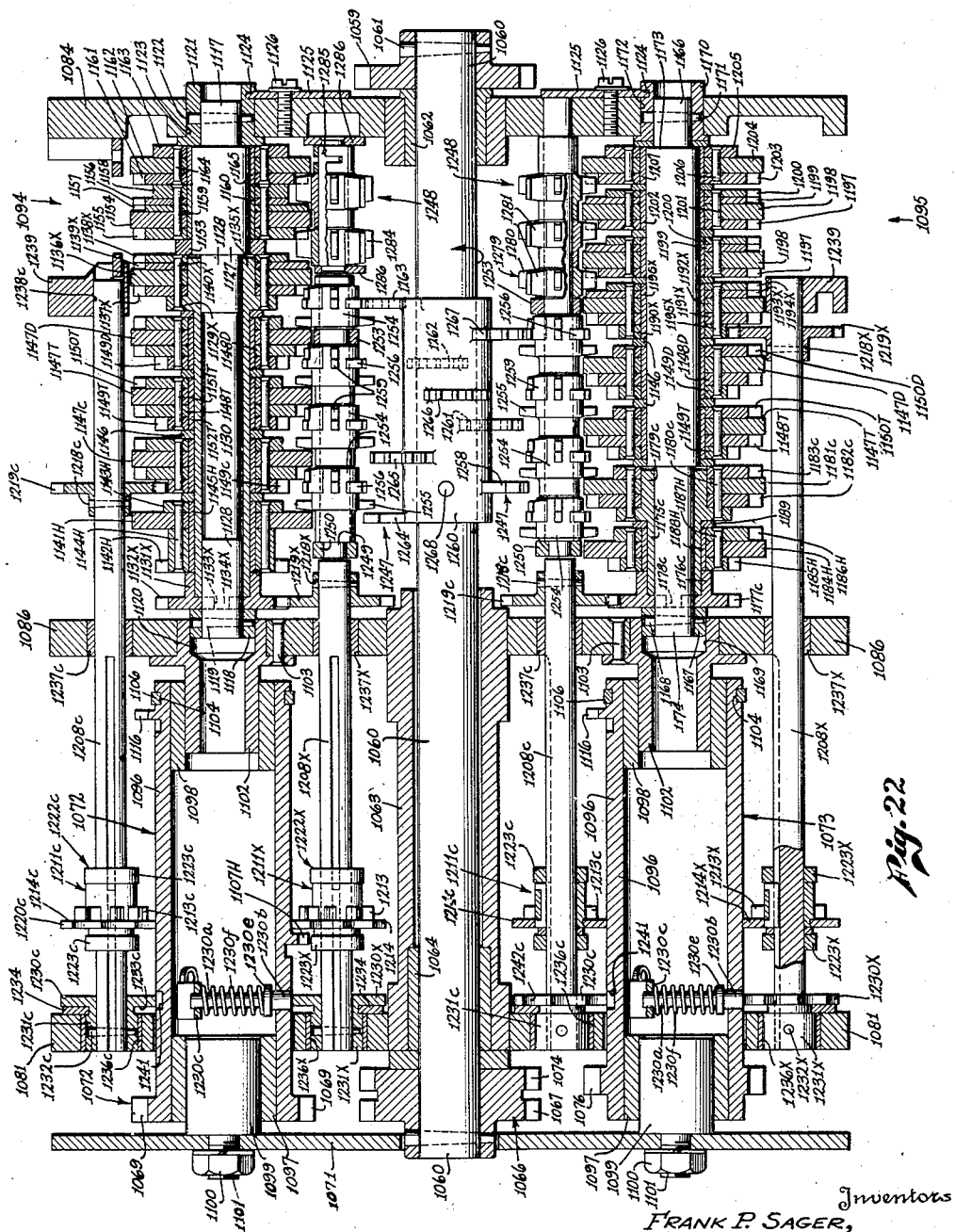
Figure 22 is an enlarged fragmental sectional view taken substantially in the plane of line 22—22 of Fig. 19.

The additive register actuator 1073 is driven from the innermost gear 1074 of said pair of gears 1066 through idler gear 1075 and actuator gear 1076. The idler gear 1075 is journaled upon stub shaft 1077 carried by the front register frame plate 1071 in a manner similar to the mounting of stub shaft 1070 for idler gear 1068, while the actuator gear 1076 is preferably formed as an integral part of the additive actuator 1073 (Fig. 22).

Figure 23:
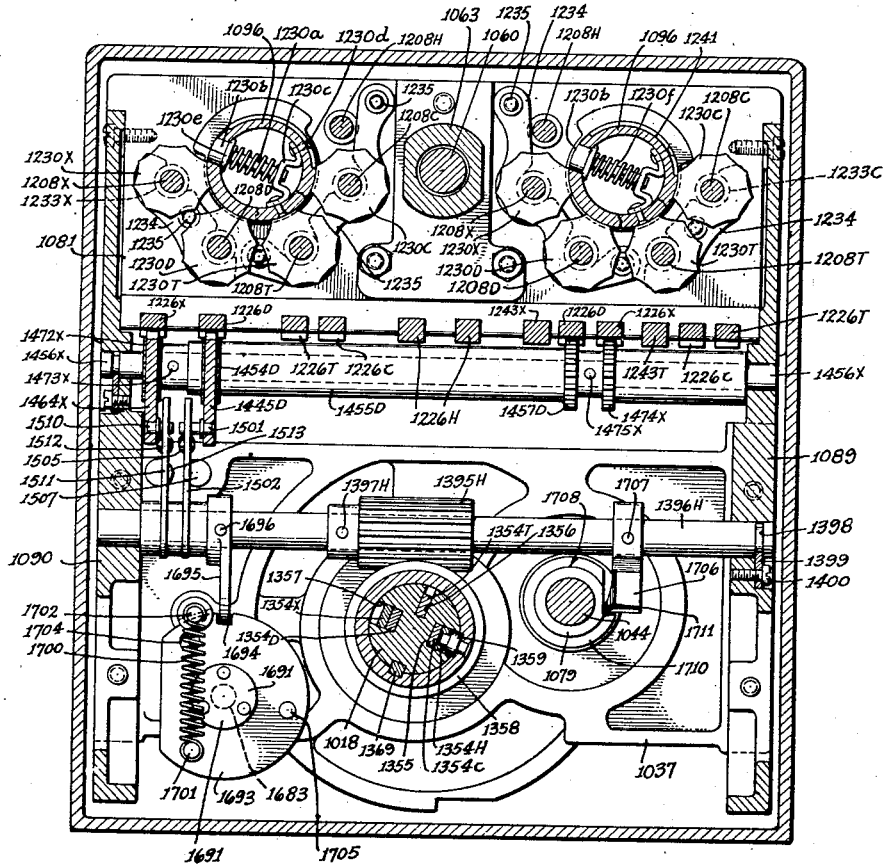
Figure 23 is a sectional view of the meter taken substantially in the plane of line 23—23 of Fig. 19.

The countershaft 1044 is journaled at its rear end in bearing 1078 carried by the rear meter plate 1026 and at its forward end in bearing 1079 carried by the meter front bearing plate 1037 (Figs. 23 and 57).

From the above description of the meter driving mechanism it will be apparent that the rotation of the meter driving shaft 1018 will positively rotate its attached printing drum 332 and through the gear train just described, the subtractive register actuator 1072 and the additive register actuator 1073.

Due to this direct connection it is impossible to, in any way, disconnect one or the other of these instrumentalities from the meter drive shaft. Attention is also directed to the fact that all of the driving gears are of the spur type, are of large size, and are capable of continuous high speed operation with absolutely no chance whatsoever of the printing drum being rotated without a corresponding rotation of the subtractive and additive register actuators.

The transmission gears connecting the two actuators to the meter drive shaft 1018 are so proportioned as to drive the actuators through one complete revolution for each revolution of said meter driving shaft.

SUBTRACTIVE AND ADDITIVE REGISTERS

Figure 21:
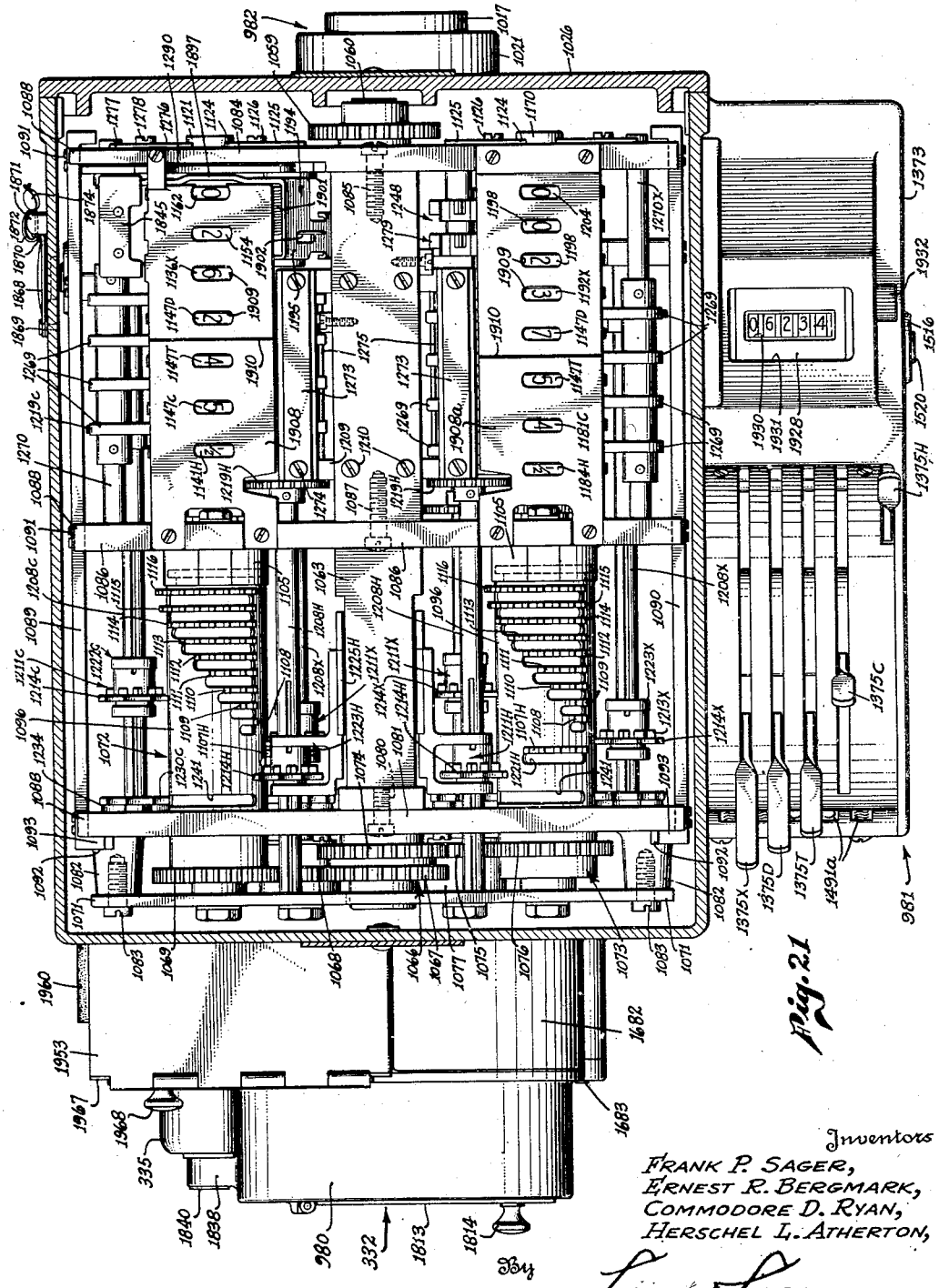
Figure 21 is a sectional view taken substantially in the plane of line 21—21 of Fig. 19.

The additive and subtractive registers are mounted within a sub frame structure which is separable from the main frame of the meter. This sub frame includes the yoke member 1063 shaped as most clearly shown in Figs. 19 and 21 and has fastened to its forward end, by screws 1080, plate 1081 which plate is provided with forwardly extending bosses 1082 to the forward ends of which the front plate 1071 is fastened by means of screws 1083. A rear plate 1084 is securely fastened to the rear end of yoke member 1063 by screws 1085. An intermediate plate 1086 is fastened to the central portion of yoke member 1063 by screws 1087. Each of the three sub frame plates are provided adjacent their upper ends with locating shoulders 1088 which seat upon the upper edge of the meter side plates 1089, and 1090 as may be clearly observed in Figs. 24, 25 and 26, when the sub frame is lowered into the meter. The sub frame plates are each securely fastened to the side plates of the meter frame by screws 1091 (Fig. 21). In order to longitudinally locate the sub frame with respect to the meter frame, the bosses 1082 extending forwardly from plate 1081 are provided with aligning grooves 1092 (Fig. 21) into which grooves the flanged ends 1093 of the side plates 1089 and 1090 extend.

The vertical alignment of the sub frame is obtained by the seating of shoulders 1088 upon the upper edge of the two side plates 1089 and 1090 and this alignment insures proper meshing of the transfer shaft gear 1059 with the teeth of the larger idler gear 1054. The alignment of the sub frame with relation to the meter frame also correctly connects the various operating racks, pinions and other mechanism, later to be described.

A further advantage of this construction resides in assembling the two registers within the sub frame so that each register is completely operatively mounted therein together with their actuators and transfer mechanism and can be removed as an operative unit from the meter for servicing or repairs.

The subtractive register 1094 and the additive register 1095 are each provided with their respective actuators 1072 and 1073. The two actuators are of substantially the same construction and therefore the description of one will suffice for both excepting wherein there are differences, which differences will be pointed out. The corresponding parts of both actuators will be given the same reference numbers.

The subtractive actuator 1072 has been selected for the purpose of description and includes a sleeve 1096 (Fig. 22), having bearing bushings 1097 and 1098 pressed into each end thereof. The forward bushing is journaled upon stub shaft 1099, securely mounted upon front plate 1071 by means of nut 1100 screw threaded upon the reduced portion 1101 of the stub shaft which extends through a suitable opening formed in the front plate 1071. The rear sleeve bushing 1098 is journaled upon a hollow flange stub shaft 1102 which is securely fastened to sub frame plate 1086 by means of rivets 1103 (Fig. 22). The actuator sleeve 1096 is maintained in longitudinal alignment by providing the rear end of the sleeve with an annular aligning groove 1104 and mounting an aligning block 1105 (Fig. 21) upon the forward face of sub frame plate 1086 and providing the block with yoke portion 1106 operatively engaging the sleeve aligning groove 1104.

As previously pointed out, the forward end of sleeve 1096 of the subtractive actuator 1072 is provided with an integral driving gear 1069, while the sleeve 1096 of the additive actuator 1073 is provided with an integral driving gear 1076 each of which gears is in alignment with its related driving gear carried by the forward end of transfer shaft 1060.

The peripheral surface of actuator sleeve 1096 is provided with ten spaced gear segments. The first of these gear segments is designated by the reference numeral 1107H, the "H" portion of the reference number indicates that this segment is for operating the ½-cent value wheel of the register and all subsequently designated operating and controlling parts of the ½-cent register will likewise bear the suffix "H." The remaining nine of these gear segments represent values from one to nine and correspondingly therewith are provided with from one to nine teeth as follows:

The first segmental gear, of this group 1108 is provided with one tooth, the second segmental gear 1109 is provided with two teeth, the third segmental gear 1110 is provided with three teeth and the fourth 1111 with four teeth, the fifth 1112 with five teeth, the sixth 1113 with six teeth, the seventh 1114 with seven teeth, the eighth 1115 with eight teeth and the last 1116 with nine teeth.

Figure 24:
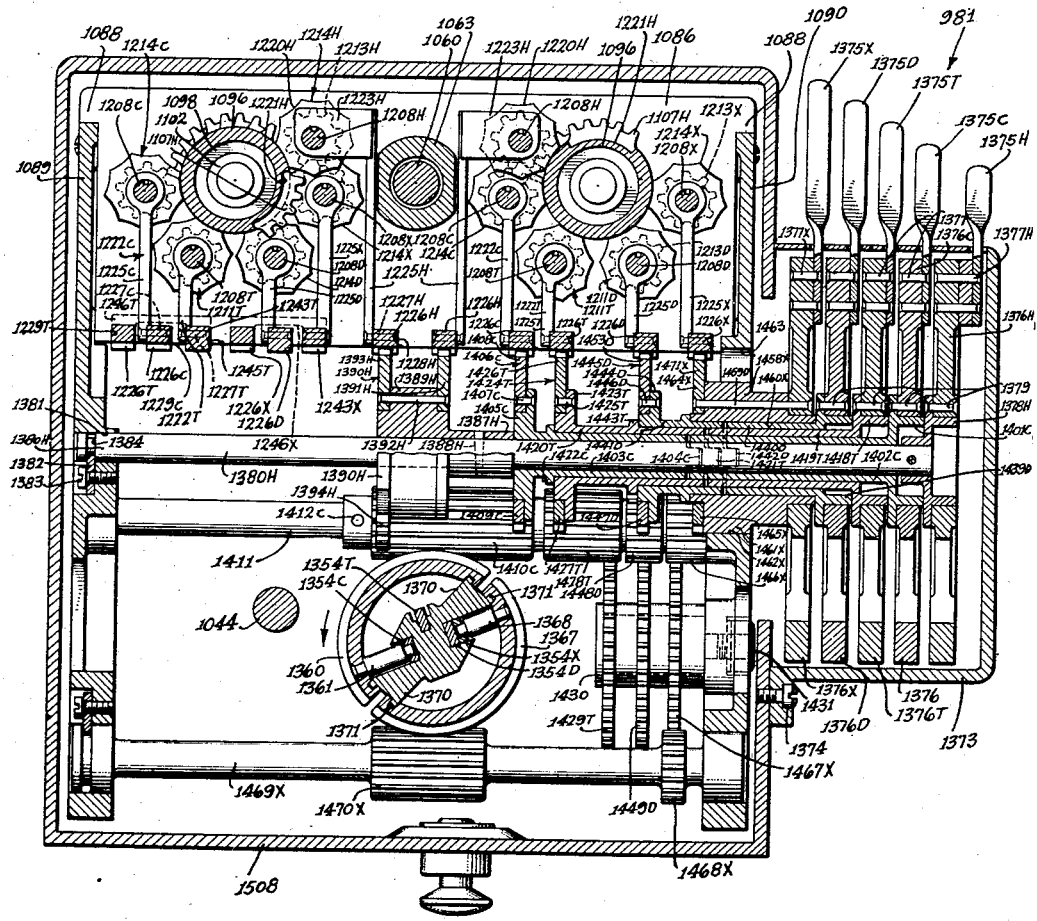
Figure 24 is a sectional view of the meter taken substantially in the plane of line 24—24 of Fig. 19.

The ½-cent actuator segmental gear 1107H includes five teeth and is the same with respect to both the additive and subtractive actuators excepting in respect to their radial position upon the actuator sleeves 1096, as is clearly shown in Figs. 21, 22 and 24.

The subtractive register 1094 and the additive register 1095 are mounted within the sub frame between plates 1084 and 1086. The two registers are in many respects similar as will be pointed out during the description of these devices.

The subtractive register 1094 includes seven register dials which are mounted upon a supporting shaft 1117 provided at its forward end with a collar 1118 fastened thereon by taper pin 1119. The counter shaft collar 1118 is supported in the counterbored portion 1120 formed in the rear end of the hollow stub shaft 1102 (Fig. 22), while at its rear end, register shaft 1117 is provided with a flange sleeve 1121 keyed thereto by means of taper pin 1122. The flange sleeve 1121 is mounted within bore 1123 formed in the end plate 1084 and is keyed therein against longitudinal displacement and rotation by providing the extending end of this sleeve with a cross slot 1124 and projecting the end of locking plate 1125 therein. The locking plate 1125 may be suitably fastened to end plate 1084 by means of screw 1126.

That portion of the register shaft 1117 which carries the register wheels is provided with two sections of different diameter, the larger of which 1127 rotatively supports the hundreds and thousands of dollar register wheels, while the section of the smaller diameter 1128 rotatively supports the tens of dollars driving sleeve 1129X and this section is turned down as at 1130 to reduce the rotative friction between the shaft and said sleeve.

The reference numerals for each order of the registers, the setting mechanisms and the printing dies will be provided with a suffix representing their respective orders. As already pointed out the ½-cent mechanism will be provided with the suffix "H." The cent mechanism with the suffix "C," the tens of cents mechanism, with the suffix "T," the dollars mechanism with the suffix "D" and the tens of dollars mechanism with the suffix "X."

The hub portion 1131X of driving gear 1132X is counterbored to closely fit upon the forward end of sleeve 1129X, while the smaller bore is of sufficient diameter to clear the register shaft 1117 and transmits its driving force to the sleeve through a tongue and groove connection (Fig. 22) which tongue and groove connection includes grooving the inner flange of the gear as at 1133X to substantially the same depth as its counterbored section and to provide the sleeve with a tongue 1134X extending into this groove in driving relation. The rear end of sleeve 1129X is provided with a flanged hub portion 1135X upon which portion the tens of dollars register wheel 1136X together with the transfer gear 1137X and transfer Geneva 1138X and Geneva locking disc 1139X are all securely fastened by means of rivets 1140X.

Extending from the flanged hub portion 1135X, the sleeve is provided with an external diameter corresponding to the diameter of section 1127 of the register supporting shaft 1117 and upon this portion of the sleeve are rotatively mounted the ½-cent, cents, tens of cents and dollars register wheels. The ½-cent register wheel 1141H, together with its driving gear 1142H and its transfer Geneva 1143H are all securely fastened together by rivets 1144H and through the bore of these assembled parts, a bearing bushing 1145H is tightly pressed. In order to space driving gear 1142H from the ½-cent register wheel, this gear is provided with an elongated hub, as is clearly shown in Fig. 89. One end of the ½-cent register wheel assembly is maintained in position upon the sleeve by the hub 1131X of the tens of dollars driving gear 1132X. Positioned adjacent the opposite end of the ½-cent register wheel assembly, is a spacer ring 1146. Positioned between the spacer ring 1146 and the flanged hub of sleeve 1129X are journaled the cent, tens of cents and dollars register wheel assemblies.

As each of these assemblies are identical, the same reference characters will be given to each, but will be provided with suffix characters representing their order.

Each of these assemblies includes a register wheel 1147, a transfer driving gear 1148, a main driving gear 1149 and a Geneva transfer 1150, all securely fastened together by rivets 1151 and the bore of these assembled parts is provided with a bearing bushing 1152 and said assemblies are spaced apart by washers 1146.

The hundreds and thousands of dollars register wheels, as previously mentioned, are journaled upon section 1127 of the register supporting shaft 1117. The hundreds of dollars register wheel assembly is spaced from the rear end of sleeve 1129 by washer 1153 and includes a register wheel 1154, a transfer driving gear 1155, a transfer Geneva 1156, a Geneva locking disc 1157 and a zero lock control disc 1158, all securely fastened together by rivets 1159 and the bore of these assembled parts is provided with a bearing bushing 1160. The thousands of dollar register wheel assembly includes a transfer gear 1161, a register wheel 1162 and a zero lock control disc 1163 all securely fastened together by rivets 1164 and the bore of these parts provided with a bearing bushing 1165.

Before describing the driving and transfer mechanism for the subtractive register 1194, the additive register 1195 will be described.

The additive register includes a supporting shaft 1166 provided at its forward end with collar 1167, secured thereto by means of taper pin 1168 and mounted within the counterbored portion 1169 of the hollow stub shaft 1102. While at its rear end the shaft is provided with a flanged bushing 1170 securely fastened thereto by means of taper pin 1171 and supported in bore 1172 formed in the end plate 1084. The shaft is keyed against longitudinal and rotative movement in the same manner as employed for the subtractive register and this locking means bears the same reference numerals.

The portion of the supporting shaft which carries the register wheels is divided into two sections of different diameter, the section of larger diameter is indicated at 1173, while the section of smaller diameter is indicated at 1174. A sleeve 1175C is journaled upon section 1174 of the shaft and upon its forward end is mounted the counterbored portion 1176C of the hub portion of the cent driving gear 1177C. The driving gear is connected to the sleeve through a tongue and groove connection indicated at 1178C of the same type as employed in connecting the tens of dollars driving gear 1132X to sleeve 1129X of the subtractive register as previously described. The rear end of sleeve 1175 is provided with a flanged hub portion 1179C upon which is securely fastened by means of rivets 1180C a cent register wheel 1181C, a transfer driving gear 1182C, and a Geneva transfer driver 1183C in the manner clearly shown in Fig. 22.

Journaled upon sleeve 1175 between the cent driving gear 1177C and the flange of the hub portion 1179C of sleeve 1175C is the ½-cent register wheel assembly which includes a ½-cent register wheel 1184H, a driving gear 1185H and a Geneva driver 1186H, all securely fastened together by means of rivets 1187H and through the bore of these assembled parts a bearing bushing 1188H is pressed. The ½-cent assembly is maintained in spaced relation from the flange of said sleeve by means of washer 1189.

Journaled upon section 1173 of the register shaft 1166 are six register wheels for indicating the tens of cents, dollars, tens of dollars, thousands of dollars and tens of thousands of dollars. The tens of cents and dollars register wheel assemblies of the additive register are identical to the cents, tens of cents and dollars register wheel assemblies of the subtractive register and the parts of these assemblies will bear the same reference characters given to the above mentioned register wheel assemblies of the subtractive register with the proper suffix characters to identify their respective orders. Each of the above mentioned assemblies are separated by washers 1146.

The tens of dollars additive register assembly includes a driving gear 1190X, a transfer gear 1191X, a register wheel 1192X, a Geneva locking disc 1193X and a Geneva driver 1194X, all securely fastened together by means of rivets 1195X and provided with a bushing 1196X.

The hundreds and thousands of dollars register wheel assemblies are substantially identical, each including a transfer gear 1197, a register wheel 1198, a Geneva locking disc 1199 and Geneva driver 1200, all securely fastened together by rivets 1201 and provided with bushing 1202.

The tens of thousands of dollars register assembly includes a transfer gear 1203, a tens of thousands register disc 1204 and a spacer washer 1205 all securely fastened together by rivets 1206 and provided with bushing 1207.

As may be observed from the drawings, the register wheels are sufficiently large to permit the engraving of relatively large figures around the periphery thereof, thus providing register which may be easily read, also a register which is rugged in construction and may be indexed at a high rate of speed without danger of damage or inaccurate registration.

The subtractive and additive registers are each driven from their respective actuators through a plurality of driving mechanisms which will now be described.

As these two groups of driving mechanisms are substantially alike with the exception of the relative position of some of their parts, the description of the driving mechanisms for the subtractive register 1094 will suffice for the description of such mechanisms for the additive register 1095. The corresponding parts of these two groups of driving mechanisms will be given the same reference numbers.

The ½-cent driving mechanism will first be described as including a drive shaft 1208H, (Figs. 21, 22, 23 and 57) extending through the sub frame plates 1081 and 1086 in which plates the shaft is journaled in suitable bearings and is maintained against longitudinal displacement by extending the forward end of said shaft to abut the front plate 1071 while abutting the rear end of the shaft against one end of bracket 1209 which bracket is securely fastened to the yoke member 1063 by means of screws 1210 (Fig. 21).

A drive pinion and locking disc assembly 1211 is shown in enlarged detail in Fig. 59, Sheet 60 of the drawings and as this same assembly is employed in each of the driving mechanisms to be described, the detailed description of this assembly for the ½-cent driving mechanism will suffice for all of the other driving mechanisms and for that reason this assembly has been given the general reference number 1211 to which will be added the suffix indicating which order of driving mechanism the assembly is employed.

This assembly includes a sleeve portion 1212H bored to slidably fit upon the driving shaft 1208H and is provided intermediate its ends with a driving pinion 1213H which is preferably formed as an integral part of the sleeve. The left hand end of sleeve 1212H extending from the pinion is turned down to receive a locking disc 1214H having a countersunk hole into which the end of the sleeve projects and is riveted, as shown in this figure, to securely fasten the locking disc thereon. The driving and locking disc assembly 1211 is provided with a suitable key seat 1215H to support a U shaped key member 1216H which key slidably rides in the shaft keyway 1217H and provides a driving connection between the assembly and the shaft and yet permits longitudinal sliding movement between said assembly and shaft.

Means later to be described are provided for sliding the assembly 1211H along the shaft to present the pinion thereof to or from the ½-cent gear segment 1107H.

To the rear end of shaft 1208H, is suitably fastened by means of taper pin 1218H, a driving gear 1219H which meshes in driving relation with the ½-cent register wheel gear 1142H.

The gear ratio of the ½-cent driving mechanism is such that for each operation thereof, the ½-cent register wheel 1141H will receive a half revolution. The driving pinion is provided with nine gear teeth and the actuator drum ½-cent segmental gear 1107H is provided with five teeth, therefore, when the pinion is driven from this actuator segmental gear, it will rotate slightly more than half a revolution. To compensate for this difference, the driving gear 1219H is slightly smaller than the ½-cent register wheel driving gear 1142H.

The locking disc 1214H is provided with nine arcuate locking seats 1220H, one for each tooth of pinion 1213H. Each arcuate locking seat 1220H is adapted to engage the peripheral surface of the actuator sleeve 1096 to prevent rotation of the ½-cent driving mechanism when the pinion of said mechanism is out of engagement with the ½-cent gear segment 1107H. The peripheral surface of the actuator sleeve 1096 is provided with an arcuate groove 1221H (Figs. 21 and 24) positioned along the front side of the gear segment 1107H to provide a clearance for rotation of the locking disc during such time as the teeth of pinion 1213H are in engagement with the teeth of its driving rack 1107H.

To control the position of assembly 1112H with respect to its actuator driving gear rack 1107H, a yoke 1222H is provided with a pair of arms 1223H and bored to slidably engage the ½-cent driving shaft 1208H and to confine therebetween the driving and locking assembly 1211H. It is preferable to provide washer 1224H between the forward end of said assembly and front yoke arm 1223H. The yoke is provided with a downwardly extending bracket 1225H securely fastened to the side face of gear rack 1226H by means of rivets 1227H (Figs. 24 and 57) which rack is slidably mounted in a suitable groove 1228H formed in the lower face of the sub frame plate 1081 and at its rear end in a suitable groove 1229H formed in the yoke member 1063 (Figs. 19 and 25).

The ½-cent driving mechanisms for both the subtractive and additive registers are substantially identical and are positioned with relation to the two groups of driving mechanisms as shown most clearly in Fig. 24.

The cent driving mechanisms are both positioned upon the left hand side of their respective actuators, as is shown in Figs. 22 and 24, and are of the same construction excepting for slight minor differences which will be pointed out during their description.

The cent driving mechanism for the subtractive register includes a driving and locking assembly 1211C slidably mounted upon drive shaft 1208C in the same manner as described for the ½-cent driving mechanism. The forward end of drive shaft 1208C is provided with a locking disc 1230C, the hub portion 1231C of which is securely fastened to shaft 1208C by means of taper pin 1232C. The hub portion adjacent the locking disc is provided with an annular groove 1233C into which one end of locking plate 1234 extends to lock the shaft against longitudinal movement (Fig. 23). The locking plate 1234 is securely fastened to the rear face of plate 1081 by means of screw 1235. The hub portion of locking disc 1230C is journaled in bearing 1236C carried by the sub frame plate 1081. The intermediate portion of shaft 1208C is journaled in bearing 1237C, carried by plate 1086, while the rear end of this shaft is journaled in bearing 1238C formed in bracket 1239, which bracket is securely fastened to the yoke member 1063 by screws 1240.

A driving gear 1219C is mounted upon shaft 1208C and securely keyed thereto by means of taper pin 1218C. The driving gear meshes in driving engagement with the one-cent register wheel driving gear 1149C.

The one-cent driving mechanism for the additive counter differs from the mechanism just described in that its drive shaft 1208C does not extend rearwardly to the bracket 1239, but instead terminates shortly after it passes through the bearing 1237C carried by plate 1086 and has keyed adjacent its rear end, drive gear 1219C by means of taper pin 1218C and engages the one-cent driving gear 1177C mounted upon the forward end of the one-cent register wheel sleeve 1175C, thus completing the drive to one-cent register wheel 1181C.

The one-cent driving mechanism is provided with a positioning yoke 1222C having spaced arms 1223C confining therebetween the driving and locking assembly 1211C in the same manner as described in the ½-cent driving mechanism.

The yoke is provided with a bracket 1225C securely fastened to the side face of gear rack 1226C by means of rivets 1227C (Fig. 24) which rack is slidably mounted at its forward end in groove 1228C extending through the lower edge of frame plate 1081 and at its rear end in groove 1229C extending through the intermediate frame plate 1086.

The driving and locking assembly 1211C for the cent driving mechanism may be positioned along its shaft 1208C into driving alignment with any one of the nine actuator gear segments 1108–1116 whereby the cents register wheel 1147 may be rotated one-tenth to nine-tenths of a revolution. The gear ratio of this driving mechanism is proportioned to turn its related register wheel one-tenth of a revolution for each gear tooth of the actuator gear segments.

Excepting for the ½-cent register wheels, all of the other register wheels in both the subtractive and additive registers are provided with the usual series of numerals from 0 to 9, and due to this relation of the parts for each tooth of the actuator, the register wheels of higher order than ½-cent will be advanced by their respective driving mechanisms the space of one numeral for each tooth of the actuator gear segments, therefore, to enter into the register any value from one to nine, the driving assembly 1211C need only be placed in driving alignment with the actuator gear segment having a number of teeth equal to the value to be entered into its related register wheel, whereby during the operating cycle of the machine, the selected actuator gear segment will engage and turn the driving gear assembly 1211C to in turn rotate the cent register wheel to enter the selected value therein.

Adjacent the forward face of each of the actuator gear segments, the actuator sleeve 1096 is provided with an arcuate groove to permit rotation of locking disc 1214C during the rotation of the driving assembly by its engagement with the teeth of the respective actuator gear segments in the same manner as described for the ½-cent driving and locking mechanism.

The locking disc 1230C operates as an auxiliary lock to prevent misalignment of the parts during the transfer phase of the operating cycle. The manner in which the lock operates during the transfer will be described along with the description of the structure and operation of the transfer mechanism.

The actuator sleeve 1096 is provided with an arcuate groove 1241 (Fig. 22) which turns under locking disc to release this disc for rotation during operation of its related driving mechanism by any one of the nine actuator segments and locks its related driving mechanism at all other times excepting as will be hereinafter set forth.

It will be understood that locking disc 1230C is provided with nine arcuate locking seats 1242C (Fig. 22) which correspond to the locking seats 1220C, any one of which will cooperate with the periphery of the actuator sleeve to lock the driving mechanism.

The tens of cents driving mechanisms are below and to the right of the cent driving mechanisms as is clearly shown in Fig. 24 and each includes substantially the same elements as described for the cents driving mechanisms, namely a drive shaft 1208T journaled in plates 1081, 1086 and bracket 1239. A driving and locking assembly 1211T is slidably mounted on the shaft in the manner described for the other driving mechanisms and is positioned along the shaft by means of yoke 1222T (Fig. 24). In the additive driving mechanism, the yoke bracket 1225T is fastened to the side face of gear rack 1226T by means of rivets 1227T and the rack is slidably mounted in grooves 1228T and 1229T in plates 1081 and 1086 respectively.

For the subtractive counter the yoke bracket is fastened to the side face of slide bar 1243T by means of rivets 1227T and the slide bar is slidably mounted in grooves 1244T and 1245T in the plates 1081 and 1086 respectively. The slide bar is connected to the gear rack 1226T by means of a bridge member 1246T (Figs. 24 and 25) which member is fastened to the slide bar and rack by suitable rivets. The gear rack 1226T is slidably mounted in grooves 1228T and 1229T in plates 1081 and 1086 respectively. The tens of cents drive shaft 1208T is provided with locking disc 1230T arranged and secured in the manner described for the cents locking disc 1230C. A register driving gear 1219T (Fig. 20) is fastened to drive shaft 1208T and positioned to engage and drive the register driving gear 1149T in the same manner as described for the other driving mechanisms.

The dollars driving mechanisms for the two registers are substantially identical and are positioned to the right of the tens of cents driving mechanisms as shown in Fig. 24. The dollars driving mechanisms each include the same elements as included in the previously described driving mechanisms, with the exception that they are arranged to drive the dollars register wheels. The parts of each of the dollar driving mechanisms which correspond to the similar parts of the tens of cents driving mechanisms have been indicated in the drawings by the same reference numerals with the exception of the suffix "D" instead of the suffix "T."

The tens of dollars driving mechanisms are positioned to the right hand side of their respective actuators as clearly shown in Fig. 24. Each of these tens of dollars driving mechanisms includes the same elements as employed in the dollars driving mechanism and, therefore, those parts which correspond have been given the same reference number with the exception that the suffix has been changed from "D" to "X." The two tens of dollars driving mechanisms although containing the same driving elements, slightly differ in the following respects, namely as may be observed in Fig. 22, the subtractive register drive shaft 1208X extends only a short distance through the intermediate plate bearing 1237X and has secured to its rear end a driving gear 1219X by means of taper pin 1218X for operatively engaging the tens of dollars drive gear 1132X which drive gear is fastened to the forward end of the tens of dollars driving sleeve 1129X for transmitting the drive to the tens of dollars register wheel 1136X, while the tens of dollars driving shaft 1208X for the additive meter extends rearwardly to and is journaled in bracket 1239 and has keyed thereto by means of taper pin 1218X, drive gear 1219X which meshes directly with the tens of dollars register wheel driving gear 1190X.

TRANSFER MECHANISM

The additive and subtractive registers are each provided with transfer mechanisms for transferring the carryover value progressively from the lower to the higher order register wheels. The transfer mechanisms for the two registers are generally alike and, therefore, the description of these mechanisms will be limited to the transfer mechanism for the subtractive register excepting wherein the transfer mechanism for the additive differs therefrom. Wherein the transfer mechanisms of the two devices are alike, the same reference numerals will be applied to corresponding parts.

The transfer mechanism for the subtractive register may be divided into two portions, the first of which will be referred to as the cumulative transfer mechanism, generally indicated at 1247 and the progressive transfer portion generally indicated at 1248. The cumulative transfer portion 1247 includes a transfer pinion shaft 1249 fixedly mounted at its forward end in bracket 1250 which bracket is securely fastened to the yoke portion 1063 by means of bolts 1251. Bracket 1250 is generally H shaped as shown in Fig. 25 and is provided at its upper ends with spaced bearings for supporting the subtractive transfer pinion shaft 1249 and the additive transfer pinion shaft 1252. These two shafts have been given separate reference numbers because they are of different length and perform different functions.

The subtractive transfer shaft 1249 adjacent its rear end is supported by an offset portion 1253 of bracket 1239 which bracket has been previously described in connection with the support of the rear ends of certain of the driving mechanism shafts 1208.

Journaled upon shaft 1249 are four transfer pinions 1254 each of which is provided with two radially extending and diametrically opposed positioning lugs 1255 arranged to be engaged by the transfer Geneva discs carried by the register wheel assemblies in a manner later to be described. Each of the transfer pinions are also provided with an interrupted gear portion 1256 normally provided with eight equally spaced radial teeth, having the two teeth directly in line with the positioning lugs removed, thus leaving only six teeth upon the pinion which are divided into two groups of three teeth each and the last two teeth in the direction of rotation in each of the above groups of three teeth are provided with an axially extending stepped gear tooth for engaging the transfer driving gear of the next higher order for advancing the register wheel thereof one numeral higher as result of the transfer operation. The stepped gear teeth of said transfer pinions are normally maintained clear of the register transfer gear.

Each of the transfer pinions 1254 of the cumulative portion of the transfer mechanism is substantially identical in structure and operation, and therefore, the description of the transfer pinion and its mode of operation for the carryover from the ½-cent to cents register wheel has been selected for the purpose of illustration. This transfer pinion includes a pair of diametrically opposed positioning lugs 1255 normally positioned to intercept the path of travel of the tooth 1257H carried by the ½-cent transfer Geneva 1143H so as to be actuated thereby when the ½-cent register wheel turns to its zero position. This actuator rotates the Geneva through one-eighth of a revolution and is maintained in this position by a suitable detent means later to be described. The transfer pinion is provided with an interrupted gear portion 1256 normally having eight teeth, the two teeth which are in alignment with the positioning lugs having been removed so as to divide the gear into two segments of three teeth each. The removal of the two teeth from the interrupted gear portion 1256 permits the gear to remain out of driving engagement with relation to the transfer driving gear segment 1258 when the transfer pinion is maintained in its normal position. However, when the pinion has been rotated in the manner just described through the engagement of the lower order transfer Geneva with the positioning lug, one of the two sets of three gear teeth are now positioned to mesh with the transfer driving gear segment 1258 which imparts three-eighths of a revolution to the transfer pinion returning same to its normal rest position with respect to this transfer driving gear segment and at the same time positioning the opposite lug 1255 in the path of travel of the lower order Geneva tooth to repeat the operation when the lower order wheel again turns to zero.

The above described rotation of the Geneva gear is employed to enter the carry-over from the ½-cent wheel into the cents register wheel and for this purpose, the transfer pinion is provided with the two sets of two teeth each, as illustrated at 1259, which teeth may form longitudinal extensions of the last two teeth of each set of three teeth of the pinion driving gear 1256 when considered in its direction of rotation and during the rotation of the pin, one set of the driving teeth 1259 will engage the teeth of the transfer driving gear 1148C of the cents register wheel assembly, advancing the cents register wheel one-tenth of a revolution, thereby entering the carryover into said register wheel.

For both the additive and subtractive registers, similar transfer pinions are employed for progressively entering the carryover from the ½-cent register wheel to and including the tens of dollars register wheels, this requiring four of the 1254 type of transfer pinions for each of said registers.

To operate these transfer pinions in progressive order so that a carryover impulse may be successively carried from the one-half to the tens of dollar register wheels during the final portion of the operating cycle of the machine, the transfer shaft 1060 is provided with a sleeve 1260, having a separate transfer driving gear segment for actuating each of the transfer pinions. We have already referred to one of these transfer segments in connection with the operation of the ½-cent carryover transfer pinion, which, at that time was given the reference numeral of 1258. These transfer driving gear segments are positioned in spiral order about the periphery of sleeve 1260 in order that they will progressively engage their respective transfer pinions, thereby progressively carrying the transfer impulse from the ½-cent to the tens of dollars register wheels.

The transfer driving gear segments for the subtractive counter may include the cents segment 1258, the tens of cents segment 1261, the dollars segment 1262 and the tens of dollars segment 1263. For the additive counter, sleeve 1260 is provided with a cents segment 1264, a tens of cents segment 1265, a dollars segment 1266 and a tens of dollars segment 1267.

As may be observed in Figure 22, the transfer pinions for the subtractive counter are offset with relation to the transfer pinions of the additive counter so that the series of actuating segments for the subtractive counter will not engage the transfer pinions of the additive counter and likewise the additive register segments will not engage the subtractive register transfer pinions.

As previously pointed out, each group of transfer segments is formed upon the transfer sleeve in spiral relation and positioned to progressively engage the transfer pinions which have been advanced for transfer and those pinions which have not been advanced for transfer are not engaged by their respective transfer segments due to the interrupted portion of the transfer pinion gears 1256.

The cumulative transfer mechanisms for the register wheels from the ½-cent to the tens of dollars register wheels respectively is necessary due to the possible driving of any one or all of these wheels during the initial portion of the operating cycle of the machine.

As previously described, the actuating and driving mechanisms can only drive the respective register wheels through nine-tenths of a revolution and therefore, cannot actuate any one of these register wheels through two transfer cycles for a single operating cycle of the machine and, furthermore, as each of the wheels can only set up one transfer impulse during an operating cycle of the machine, the cumulative type of transfer mechanism may be employed which will be affected by the rotation of any one of the register wheels to its zero position to set the transfer mechanism for operation in the manner previously described, which transfer will be completed during the final operating cycle of the machine through the engagement of their respective transfer driving segments.

Due to this arrangement of the parts, the register wheels are driven during the initial portion of the operating cycle and during their rotation may engage to set for transfer any one or more of the transfer pinions, therefore, accumulating all of the transfer impulses to be completed during the final portion of the operating cycle of the machine.

The transfer sleeve is preferably keyed directly onto shaft 1060 by means of taper pin 1268 and therefore, is positively driven during the rotation of the shaft to complete the transfer impulses in the manner described.

During the description of the driving mechanisms for the cents, tens of cents, dollars and tens of dollars register wheels, it was pointed out how these mechanisms were locked against rotation by means of their respective locking discs 1230 excepting for such times as their respective driving gear assemblies 1211 were in position to be driven by the actuator gear segments 1108-1116. The locking of the above referred to driving mechanisms will correspondingly lock their related register wheels and would thereby prevent the cumulative carryover action, above described, if means were not provided for releasing the respective locking discs for entry of the carryover impulses.

This locking disc releasing means is identical for both registers and therefore, the description will be limited to one, which locking disc releasing means may include mounting in the actuator sleeve 1096 a plunger 1230a (Figs. 22 and 90), having at one end thereof, a rectangular head portion 1230b, which rectangular head portion slidably enters a correspondingly shaped opening extending radially through the wall of said actuator sleeves 1096. The opposite end of said plunger is slidably supported in bracket 1230c which bracket is fastened to the inner wall of said sleeve by means of rivets 1230d.

The plunger head portion 1230b is provided with a stop flange 1230e for normally maintaining its head end flush with the outer peripheral surface of sleeve 1096. A compression spring 1230f is mounted upon said plunger and acts between its head flange and bracket 1230c for yieldingly maintaining the head end of said plunger flush with the outer surface of said sleeve.

The plunger head portion 1230b is positioned in the actuator sleeve so that it will be swung progressively under the respective locking discs 1230 in time with the sequence of the cumulative transfer impulses for their related register wheels.

As the plunger head portion 1230b progressively moves under the locking discs, the discs for those orders in which a transfer impulse has been set up are permitted to rotate from one locking surface to the next during which rotation the intermediate high point of said discs will push the head portion 1230b into its opening thereby providing the necessary clearance for such rotation.

It will be appreciated from the foregoing description that for each transfer impulse for any one of the above mentioned orders the related locking disc will be turned to present its next following locking surface into locking engagement with the outer periphery of the sleeve 1096.

It is also necessary to provide each sleeve 1096 with a relatively long narrow groove 1230g (Fig. 20) for releasing the locking discs 1214 of the driving pinion and locking disc assemblies 1211 during the cumulative transfer of the carryover factor. The releasing groove 1230g is formed in said sleeve in alignment with the plunger head portion 1230b and is of sufficient length to release these locking discs when in any one of their settable positions. When the plunger head 1230b turns into operative relation with any one of the locking discs 1230, the groove turns into releasing relation with its related locking disc 1214.

Spring 1230f maintains the plunger head 1230b flush with the outer surface of sleeve 1096 and thereby yieldingly maintains those locking discs for which no transfer impulse has been set up yieldingly locked.

The cumulative transfer pinions 1254 are yieldingly maintained in their normal inactive position or in their set position by means of a detent mechanism including a pawl 1269 journaled upon pivot rod 1270X at one end and provided with a detent roller 1271 at its opposite end which roller normally engages the teeth of the interrupted portion 1256 of the transfer pinion (Figs. 21 and 25). A compression spring 1272 is provided to urge the detent roller into yielding engagement with the teeth of the transfer pinion and acts between the detent pawl and a bridge structure 1273 supported by brackets 1209 by means of screws 1274. The bridge structure also carries a stop rod 1275 to limit the downward movement of the detent pawl. The detent pawl pivot rod 1270 is carried by the register frame plates 1084 and 1086 and is securely held therein by means of a key plate 1276 engaging a suitable slot 1277 formed in the end of the rod which projects through plate 1084. The key plate is secured to the plate 1084 by means of screw 1278. It will be understood that each of the cumulative transfer pinions 1254 are provided with their individual detent pawls 1269 for both the subtractive and additive registers.

The progressive transfer mechanisms for the subtractive and additive registers are alike in construction and operation excepting for certain minor details and with respect to the mounting of the transfer pinions, which mounting in the subtractive register permits the disengagement from the transfer pinions to the register wheels to enable these register wheels to be manually set to enter values in the register in a manner later to be described.

The transfer pinions for both the additive and subtractive registers are alike excepting that in the subtractive register, the pinions are of slightly greater width to span the wider spacing between the related transfer wheels.

In the subtractive register the progressive transfer mechanism 1248 operates to transfer the carryover impulse from the tens of dollars register wheel to the hundreds of dollars register wheel 1154 when the tens of dollars register wheel rotates from its one to its zero position, and after the hundreds of dollars register wheel 1154 has likewise rotated from its one to zero position to transfer the carryover to the thousands of dollars register wheel 1162. In the like manner, the progressive transfer mechanism for the additive register operates to carry the transfer impulse from the tens of dollars register wheel 1192X to the hundreds of dollars register wheel and thereon progressively to the tens of thousands of dollars register wheel. In the additive register, the transfer takes place when the respective register wheels turn from their nine to their zero position. It is believed that a detailed description of the construction and operation of one of the progressive transfer pinions will suffice for all.

Referring to the additive progressive transfer mechanism 1248, it includes three transfer pinions 1279, each of which is provided with eight equally spaced transfer teeth. The alternate teeth of the transfer pinion are cut back from the end of the pinion adjacent the lower order register wheel so as to clear the Geneva locking disc carried thereby. In considering the first of the three transfer pinions 1279 which transmits the carryover from the tens of dollars register wheel 1192X to the hundreds of dollars register wheel 1199, the alternate cutback gear teeth 1280 clear the Geneva locking disc 1193X of the tens of dollars register wheel 1192X in the manner shown in Fig. 22, while the full width gear teeth 1281 positioned intermediate the narrow teeth 1280, will slidably engage the peripheral surface of the Geneva locking disc 1193X, thereby locking the transfer pinion against rotation. The tens of dollars register wheel 1192X is provided with a Geneva driver 1194X having two gear teeth 1282 (Fig. 57) which turn into driving engagement with the narrow tooth 1280 which extends inwardly between the two register wheels to rotate the transfer pinion one-quarter of a revolution during the time that the tens of dollars register wheel is turning from its nine to its zero position. The one-quarter revolution of the transfer pinion, through the meshing of its gear teeth with the teeth of the hundreds of dollars register wheel driving gear 1197, will advance the hundreds of dollars register wheel one unit higher and upon the completion of this transfer operation, the transfer pinion will again be locked by the Geneva locking disc 1193X of the lower order register wheel. The Geneva transfer disc 1193X of the tens of dollars register wheel is provided with a notch 1283 representing the width of a gear tooth to permit the rotation of the transfer pinion when engaged by the Geneva driver.

The transfer of the carryover from the hundreds of dollars register wheel to the thousands of dollars register wheel and from the thousands of dollars register wheel to the tens of thousands of dollars register wheel is accomplished in the same manner as described for the transfer of the carryover from the tens of dollars to the hundreds of dollars transfer register wheel.

The three transfer pinions 1279 for the subtractive register advance the next higher order wheel from the lower order wheel each time the lower order wheel turns from its nine to its zero position. This is a progressive transfer of carryover impulse from the lower to the higher order and the entire driving force for actuating the carryover is attained from the tens of dollars transfer wheel.

The progressive transfer mechanism for the subtractive register includes only two transfer pinions 1284 for the reason that this register is provided with one less register wheel. The operation of these two transfer pinions is identical to that already described for the additive register and therefore, the description will not be repeated.

However, it will be pointed out that these transfer pinions are of slightly greater width and mounted upon shaft 1285 which shaft is in turn securely fastened at each end as by riveting the ends thereof in countersunk holes in the spaced arms 1286 of swing frame 1287 (Figs. 33 and 34). The swing frame 1287 is keyed to rocker shaft 1288 by means of taper pins 1289. The rocker shaft is mounted in suitable bores carried by end plate 1084 and bracket 1239, as is clearly shown in Fig. 34.

The swing frame 1287 is normally maintained in its operative position, as shown in Fig. 31, by means of a link 1290 pivotally connected at its rear end by means of pivot pin 1291 to the upper end of the rear swing frame arm 1286 and is provided at its front end with a yoke portion 1292 for straddling a guide pin 1293 and for passing over the pivot rod 1270. The upper prong of the yoke is provided with a cam roller 1294 cooperating with a cam block 1295 securely fastened to a slide frame 1296 by means of rivets 1297.

When the slide frame 1296 is in its normally depressed position as shown in Figs. 31 and 32, the cam block 1295 will engage the cam roller 1294 to maintain link 1290 in its forward position and thereby retaining the transfer swing frame in its operative position as shown in these figures.

In order to enable the cam block 1295 to pass the pivot rod 1270, this rod is grooved as at 1298 to provide sufficient clearance for said block. Means are provided for yieldingly urging the transfer swing frame 1287 to its retracted position as shown in Fig. 33 and these means may include slotting the register end plate 1084 as at 1299 and mounting a compression spring 1300 therein to act between the outer end of said slot and a lug 1301 formed on the side face of link 1290 which lug extends into slot 1299.

PRINTING DRUM 332

As previously pointed out the printing drum 332 is mounted upon the forward end of the meter drive shaft 1018 and includes value printing type wheels mounted in a suitable opening formed within said drum. There are five printing type wheels which will be given the same reference number 1302 with a suffix representing the value thereof in the following manner. 1302H represents the ½-cent printing wheel, 1302C the cents printing wheel, 1302T the tens of cents printing wheel, the dollars printing wheel 1302D and the tens of dollars printing wheel 1302X.

All of the printing wheels are freely journaled upon a hollow shaft 1303. The shaft is turned down at its ends as at 1304 to provide annular shoulder portions for mounting said shaft within suitable openings formed in the side plates 1305 of the printing wheel supporting frame 1306. The frame is more or less of box construction and includes the two side plates 1305 just referred to which are securely fastened at their lower ends by means of screws 1307 to a base block 1308 and at their upper ends the said plates are secured to the end blocks 1309 and 1310 by means of screws 1311.

The printing wheel frame 1306 is mounted within a suitable opening 1312 formed in the printing drum 332 by providing the rear end block 1310 with a stud 1313 which closely fits in hole 1314 extending through the printing drum flange 1028 (Fig. 19) and by providing the forward end block 1309 with a shouldered stud 1315 which extends through a suitable opening formed in the front cap 1316.

The printing wheel frame is adjustably secured in its operative position by means of adjusting nut 1317 and lock nut 1318 screw threaded upon the stud 1315 and engaging opposite faces of the drum cap 1316. The transverse position of the printing drum frame may be adjusted by loosening the lock nut 1318 and by rotating the adjusting nut 1317 through an opening 1319 formed in the cap and thereafter tightening the locking nut 1318. This adjustment permits the printing wheels to be correctly aligned with other printing type carried by the drum. To facilitate turning of adjusting nut 1317 through the opening 1319 it is provided with suitable splines 1320 along the forward outer peripheral portion thereof.

To assist in maintaining the printing frame centralized within the drum the base block 1308 of the frame is provided with an elongated groove 1321 which cooperates with the flattened sides of guide pin 1322 which guide pin extends upwardly from the bottom portion of the drum opening 1312.

Securely mounted upon the top surface of the printing wheel supporting frame 1306 by means of screws 1323 is a stamp printing plate 1324 which is provided with raised type surface 1325 which carries all of the stamp printing type excepting for the value type are carried by the printing wheels previously referred to. The raised type surface is provided with a curvature concentric with the axis of rotation of the printing drum. The type surface is further provided with an opening 1326 through which the printing type faces of the wheels 1302 project. The type carrying portions of the printing wheels are formed to present the type thereof when located in printing position concentric with the axis of rotation of the printing drum and at substantially the same height as the printing type formed on the raised type surface 1325 as is clearly shown in Fig. 46.

The ½-cent printing wheel 1302H is provided with a relatively short type flange 1327 (Fig. 60) having provided thereon a ½-cent printing type and a plurality of closely spaced wavy lines 1328 which is commonly referred to as a "flag." The ½-cent printing wheel is provided with a hub extending substantially the full width of the printing wheel for providing a relatively wide bearing surface upon the hollow shaft 1303. A ½-cent positioning gear segment 1329 is mounted upon the hub portion of the ½-cent printing wheel 1302H and secured to the flange portion of said wheel by means of rivets 1330 (Fig. 57), while the lower portion of the printing wheel flange is provided with a locking segment 1331 having formed therein two positioning notches 1332 and 1333 into which notches a detent mechanism acts to maintain the ½-cent printing wheel properly located in either one of its two printing positions.

The cents, tens of cents, dollars and tens of dollars printing wheels all include the same elements and therefore, the same elements will be given the same reference number with the proper suffix to indicate the respective orders of these several wheels. The tens of cents printing wheel differs from the cent wheel in that the ten cent printing wheel is provided with a decimal point 1334 in front of each of its printing type characters, while the dollars and tens of dollars printing wheels are provided with flags of the same type as provided on the ½-cent printing wheel, as indicated thereon by the reference numeral 1326 (Fig. 60). The rotation of the dollars and tens of dollars printing wheels is in the reverse direction to that of the cents and tens of cents wheels. As may be observed in Fig. 46, the type supporting flange and hub of the tens of dollars printing wheel are directed in the opposite direction to the hubs and flanges of the other printing wheels. The above mentioned differences are slight and do not in any way materially affect the operation of these wheels.

The one-cent printing wheel 1302C may include a type supporting flange 1336C (Figs. 60 and 61) upon the peripheral surface of which are engraved a series of printing characters from zero to nine and is provided with a hub portion 1336C for mounting the wheel upon the hollow shaft 1303. A positioning gear segment 1337C is mounted upon the hub portion of the one-cent printing wheel and fastened to the flange portion of said wheel by means of rivets 1338C and is provided with nine gear teeth 1339C. The cent printing wheel is also provided with a positioning segment 1340C having ten positioning notches 1341C.

In order to provide a supply of lubricant to insure a continuous operation of the machine without attention, the hollow shaft 1303 is provided with wicking 1342 (Figs. 19, 46 and 61). The wicking is impregnated with oil and oil holes 1343 communicate the bore of shaft 1303 with the bearing surfaces of the printing wheels to enable the feed of oil to lubricate these parts.

Each value printing wheel is provided with a detent for yieldingly maintaining the respective wheels in their selected printing positions. As all of the detents are alike, the description will be confined to the detent mechanism for the one-cent printing wheel which may include a pawl 1344 pivoted at its rear end on cross shaft 1345 which shaft is carried by two forwardly extending arms 1346 preferably formed as an integral part of the printing wheel frame side plates 1305. The detent pawl is preferably shaped as shown in Fig. 61 and is bifurcated at its forward end to support a detent roller 1347 by means of pin 1348. A compression spring 1349 is interposed between the pawl and a spring plate 1350 secured to the underside of base block 1308 by means of screws 1351. The springs extend through holes 1352 drilled through the base block 1308 in the manner shown in Fig. 61.

The printing wheels are rotated by individual rack bars which will be identified by the same numeral with distinguishing suffixes added thereto as for example, the rack bar for controlling the ½-cent printing wheel is indicated at 1353H, the cent rack bar 1353C, the tens of cents rack bar 1353T, the dollars rack bar 1353D and the tens of dollars rack bar 1353X. The front block 1309, the rear block 1310 and base block 1308 of the printing wheel supporting frame 1306 are provided with a series of aligned grooves, one set of each of said aligned grooves is provided for each printing wheel rack, whereby each rack will be guided and supported in driving engagement with its respective positioning gear segment.

The ½-cent rack 1353H is provided with a rearwardly extending shank 1354H operatively mounted within a groove 1355 milled in the meter driving shaft 1018 (Figs. 19, 23 and 57). The one-cent rack 1353C is provided with a shank 1354C slidably mounted within the same shaft groove 1355 (Fig. 23). The tens of cents rack bar 1353T is provided with a shank 1354T slidably mounted in the shaft groove 1356. The dollars rack bar 1353D is provided with a shank 1354D slidably mounted in shaft groove 1357. The tens of dollars rack bar 1353X is provided with a shank 1354X slidably mounted within the same groove 1357 as the dollars shank 1354D. As may be observed in Fig. 23 the shaft grooves 1355, 1356 and 1357 are of sufficient depth to permit the nesting of the rack bar shanks sufficiently within the shaft to permit the rack shanks to pass through the hub portion 1027 of the printing head drum 892.

The rear end of the ½-cent shank 1354H is connected to a circular gear rack 1358 by means of shoulder pin 1359. The one-cent rack shank 1354C is connected to a semi-circular gear rack 1360 by means of shoulder pin 1361 (Fig. 24). The tens of cents gear rack shank 1354T is provided at its rear end with a notch 1362 into which the head of pin 1363 engages to connect the shank to a semi-circular gear rack 1364 (Fig. 25). The dollars shank 1354D is connected to the dollars semi-circular gear rack 1365 by means of shoulder pin 1366 (Fig. 24). The tens of dollars shank 1354X is connected to a semi-circular gear rack 1367 by means of shoulder pin 1368. The ½-cent circular gear rack 1358 is slidably mounted upon shaft 1018 directly to the rear of the front shaft supporting bearing and is connected to the shaft for rotation therewith by means of key 1369 (Fig. 23). Directly to the rear of the ½-cent circular rack 1358, shaft 1018 is provided with a pair of diametrically opposed wings 1370 (Fig. 24). The outer edge of each of said wings 1370 is provided with two spaced tongues 1371 for slidably supporting the cents and tens of dollars semi-circular gear racks 1360 and 1367, in the manner shown in Fig. 24, wherein it may be observed that the tongues engage suitable longitudinal grooves formed in the respective gear racks. This arrangement securely mounts the two semi-circular gear racks for rotation with the shaft yet permitting independent longitudinal movement of these two racks with respect to the shaft. This arrangement has a further feature in that it enables the mounting of two of the semi-circular gear racks along opposite sides of the shaft, thereby conserving space.

Directly to the rear of the wing portions 1370, the shaft is provided with two diametrically opposed dovetailed tongues 1372, for slidably mounting the tens of cents semi-circular gear rack 1364 and the dollars semi-circular gear rack 1365, in the manner shown in Fig. 25. This mounting of these racks upon said shaft is in the nature of a tongue and groove arrangement whereby the gear racks rotate with the shaft, but are permitted to freely slide longitudinally therealong. The dovetailed grooves 1372 are formed on shaft 1018 in staggered relation with respect to the winged portions 1370 of said shaft to straddle therebetween the tens of cents rack groove 1356 and also to permit the ends of gear racks 1364 and 1365 to slide past the winged portions 1370 as is shown in Fig. 19. For this purpose, the two racks above referred to are slightly less than a full semicircle in order to provide between the opposed ends of each, sufficient clearance to pass the winged portions 1370.

The racks 1364 and 1365 are constructed in the semi-circular form as shown in the drawings to permit overlapping with respect to each other when moved to their various positions of adjustment and thereby requiring a minimum of space for movement to either extreme end of their positions of adjustment. The semi-circular racks 1366 and 1367 are of substantially larger diameter than the semi-circular racks 1364, 1365 and the ½-cent circular rack 1358 and these racks 1360 and 1367 are provided with an internal bore of sufficient diameter to enable said racks to freely telescope or pass over the racks 1364, 1365 and 1358 during the various positions of adjustments. This arrangement enables the provision of a compact sturdy and light construction. It enables the rotation of any one of the printing wheels to present in printing position any value from ½-cent to $99.99½, merely by the longitudinal movement of the various racks along the axis of the meter shaft 1018. A selector mechanism is provided for controlling the position of the circular racks along the meter shaft which means simultaneously therewith positions the actuating mechanism for the subtractive and additive registers whereby when the printing wheels are set to print a selected value, the mechanism simultaneously therewith sets the subtractive register actuator mechanism to subtract from the subtractive register said selected value and to set the additive register actuating means to add said selected value into the additive register.

DENOMINATION SELECTOR MECHANISM 981

The denomination selector mechanism 981 includes the means by which the selected denomination is set up for printing and for entry into the two registers and includes a hand lever for each order in the printing range of the machine. These handles project upwardly through suitable slots formed in the upper portion of an enclosed housing 1373 which housing is securely fastened to the right hand side of the meter casing by means of screws 1374 (Figs. 1, 15 and 24).

The selector mechanism includes a ½-cent lever 1375H securely fastened to an index wheel 1376H by means of rivets 1377. The index wheel in turn is fastened to a flanged hub 1378H by means of rivets 1379 and the hub portion of said flanged hub 1378H is keyed to cross shaft 1380H by means of a suitable taper pin. The shaft is journaled at its opposite end in bearing 1381 formed in the meter side plate 1089 and maintained in longitudinal alignment by means of key plate 1382 fastened to the side plate 1089 by means of screw 1383 and having one end extending into an annular groove 1384 formed in the end of said shaft, as clearly shown in Fig. 24. The key plate 1382 and its retaining screw are mounted within a suitable recess formed in the side plate 1089. The ½-cent selector shaft 1380H is journaled intermediate its ends in a manner later to be described.

The ½-cent lever 1375H has two positions of adjustment, the first of which sets the ½-cent printing wheel 1302H to position the flag printing type 1328 in printing position, representing no value, and at the same time positions the ½-cent driving and locking assemblies 1211H for both the subtractive and additive actuators in their locked non- driving position, whereby during the operating cycle of the machine, no value will be printed or entered in either of said registers.

When the selector lever 1375H is moved to its second position, through mechanism later to be described, it operates to rotate the ½-cent printing wheel 1302H to position the ½-cent printing type in printing position and at the same time moves the ½-cent driving and locking assemblies 1211H into driving alignment with the ½-cent gear segments 1107H carried by the respective actuators whereby during an operating cycle of the machine, a stamp bearing a ½-cent value will be printed and during this same operating cycle of the machine through the operation of the registers driving mechanisms previously described, the ½-cent register wheels 1142H for both the subtractive and additive registers will be rotated through a half revolution representing the entry of a ½-cent value into the respective registers. A half revolution of the subtractive register ½-cent wheel 1142H reduces the amount within the subtractive register by the value of ½-cent, while for the additive register, a half revolution of the ½-cent register wheel adds the value of ½-cent to the amount therein.

A detent mechanism, later to be described, cooperates with either a zero or flag detent notch 1385 or a ½-cent detent notch 1386 to yieldingly maintain the ½-cent selector lever 1375H correctly positioned in either its flag or ½-cent printing positions (Figs. 15 and 40).

The one-half cent selector actuating mechanism may include a sleeve 1387H keyed to shaft 1380H by taper pin 1388H and providing said sleeve with a relatively wide flange 1389H to opposite sides of which are fastened segmental gears 1390H and 1391H by means of long rivets 1392H. The segmental gear 1390H is provided with two gear segments 1393H and 1394H (Figs. 41 and 57), the first of which, namely the gear segment 1393H, meshes in operative engagement with the teeth of the ½-cent gear rack 1226H for the subtractive register, while its second gear segment 1394H meshes in operative engagement with the gear teeth of a relatively wide pinion 1395H keyed to cross shaft 1396H by means of taper pin 1397H. The pinion 1395H in turn engages the teeth of the ½-cent gear rack 1358. The segmental gear 1391, which is fastened to the opposite side of flange 1389H, meshes with the gear rack 1226H for the additive register. The cross shaft 1396H is journaled in the meter side plates 1089 and 1090 (Fig. 41) and is maintained against longitudinal displacement by grooving one end of the shaft as at 1398 into which groove one end of key plate 1399 extends, the plate being securely fastened within a suitable recess formed in the side wall 1089, by means of screw 1400.

Through the train of mechanism above set forth, movement of the ½-cent lever will rotate the two segmental gears 1390H and 1391H and will thereby simultaneously advance or retract the driving mechanism positioning racks 1226H for both the subtractive and additive registers and will also advance or retract the ½-cent circular gear rack 1358 through the rotation of pinion 1395.

The manner in which the positioning racks 1226H control the positioning of the ½-cent driving and locking assemblies 1211H for the subtractive and additive registers and the manner in which the ½-cent circular gear rack 1358 controls the positions of the ½-cent printing wheel has been previously pointed out.

From the above description, it will be appreciated that the ½-cent selector lever 1375H positively and accurately controls the positioning of the ½-cent printing wheel and will simultaneously therewith positively and accurately control the positioning of the two driving and locking assemblies 1211H whereby the setting of said printing wheel and driving assemblies for the two registers will correspond, that is, if the machine is to print a ½-cent value the actuation of the ½-cent selector lever to its ½-cent setting will correspondingly set the two driving assemblies so that a ½-cent value will be added into the additive register, while a ½-cent value will be subtracted from the subtractive register.

As a further important feature of this invention, attention is directed to the formation of the ½-cent rack 1358 which is made circular as previously pointed out so that its teeth will remain in constant engagement with the teeth of pinion 1395H during the entire operating cycle of the machine, in other words, the teeth of these two gear members are never and cannot be disconnected and through this positive connection between the rack bar 1358 with the circular gear 1395, the ½-cent printing wheel is at all times maintained in positive control of the ½-cent selector lever 1375H. From the above description, it will be readily appreciated that the ½-cent selector lever 1375 maintains positive and absolute control over the ½-cent printing wheel and the ½-cent driving and locking assemblies 1211H, whether the machine is in its rest position or during any portion of the operating cycle of the machine.

The cents selector mechanism includes a selector lever 1375C secured to index disc 1376C by means of rivets 1377. The index disc is fastened to the flanged portion 1401C of sleeve 1402C by rivets 1379. The cents selector sleeve 1402C is journaled upon the ½-cent cross shaft 1380H and is confined upon the shaft at its outer end by the ½-cent flanged hub 1378H and at its inner end by abutting against the adjacent end of a second sleeve 1403C likewise journaled upon the ½-cent cross shaft 1380H and is connected to the second sleeve by means of a tongue and groove connection as indicated in Fig. 24 at 1404C.

The sleeve 1403C is provided with a flange 1405C to which is securely fastened a segmental gear 1406C by means of rivets 1407C and is provided with two gear segments, the first of which 1408C meshes with the subtractive register rack 1226C, while the second gear segment 1409C meshes with the long pinion 1410C which pinion is keyed to cross shaft 1411 by means of taper pin 1412C. The cross shaft 1411 is journaled in the side plates of the meter in substantially the same manner as described for the ½-cent cross shaft 1380H. The long pinion 1410C meshes with the cents semi-circular gear rack 1360 carried by the meter shaft 1018.

The positioning means for the subtractive register cents driving mechanism is actuated from the additive meter driving mechanism positioning rack 1226C by means of sleeve 1413C (Fig. 25) which sleeve is journaled upon cross shaft 1414T and is provided at one end with gear 1415C meshing with the additive register gear rack 1226C and having a second gear 1416C formed adjacent its opposite end for meshing with the subtractive register positioning rack 1226C.

Through the train of mechanism just described, the cents selector lever 1375C will actuate the cents printing wheel to any one of ten positions and will simultaneously therewith position the subtractive and additive register driving mechanisms for the cents order to a corresponding one of said ten positions. In order to properly locate the cents selector lever in any one of its ten positions, its index wheel 1376C is provided with ten detent notches 1417C (Fig. 15) into which a detent mechanism, later to be described, is yieldingly urged. Through the actuation of the cents selector mechanism, the cents printing wheel may be turned to present any one of its ten type faces into printing position and simultaneously therewith positioning the driving mechanisms for the subtractive and additive registers to a corresponding position, whereby the value presented in printing position will be subtracted and added to the respective registers.

The tens of cents selector mechanism includes a selector lever 1375T secured to index wheel 1376T by means of rivets 1377 and securing the index wheel to the hub portion 1418T of sleeve 1419T by means of rivets 1379. The sleeve 1419T is journaled upon the cents sleeve 1402C and is confined between the hub portion 1401C of said cents sleeve and the adjacent end of sleeve 1420T. The two sleeves 1419T and 1420T are connected in driving relation by means of a tongue and groove connection 1421T (Fig. 24). The inner end of sleeve 1422 is confined against displacement by means of a flange 1422C formed upon the cents sleeve 1403C and the tens of cents sleeve 1423T is provided with a flange 1423T to which is securely fastened segmental gear 1424T by means of rivets 1425T. The segmental gear 1424T is provided with two gear segments, the first of which indicated at 1426T meshes with the additive register positioning rack 1226T, while the other gear segment 1427T meshes with an idler pinion 1428T journaled upon cross shaft 1411. The idler pinion 1428T in turn meshes with a large gear 1429T journaled upon headed stub shaft 1430 which stub shaft is securely fastened to the inner face of the meter side plate 1090 by means of nut 1431. The large gear in turn meshes with pinion 1432T preferably formed as an integral part of cross shaft 1433T which shaft is journaled in suitable bearing formed in the side wall of the meter frame in the manner previously described for the ½-cent cross shaft 1380H. A pinion 1434T is preferably formed integral with cross shaft 1433T adjacent its center portion so as to mesh with the rack teeth of the tens of cents semi-circular rack 1364 (Fig. 25), thereby establishing an operating connection between the selector lever and the tens of cents printing wheel in the printing drum.

The subtractive register selector bar 1243T is actuated from the additive register rack 1226T by providing cross shaft 1414T with a pinion 1435T secured thereto by means of taper pins 1436T and by securing to said shaft, adjacent the side wall 1089 of the housing, a pinion 1437T by means of taper pin 1438T. The pinion 1437T meshes with a gear rack 1226T which is connected to slide bar 1243T by means of bridge member 1246T and as in the manner previously described, the slide bar 1243T is secured to the bracket of the driving and locking assembly positioning yoke 1222T.

The tens of cents selector mechanism just described may be operated to simultaneously set to the same value the tens of cents printing wheel and the subtractive and additive register driving mechanisms.

The tens of cents index wheel 1376T is provided with ten positioning notches 1417T and with a cooperating detent mechanism later to be described.

The dollars selector mechanism includes a selector lever 1375D fastened to index wheel 1376D by means of rivets 1377 and the index wheel in turn is securely fastened to the hub portion 1439D to sleeve 1440D by means of rivets 1379. The sleeve 1440D is journaled upon the tens of cents sleeve 1419T and is confined against longitudinal movement by the hub portion 1418T of the cents sleeve and the adjacent end of sleeve 1441D. The sleeves 1440D and 1441D are connected in driving relation by means of a tongue and groove connection 1442D. Sleeve 1441D is maintained in its proper operative position by means of collar 1443T formed on the tens of cents sleeve 1420T. The inner end of sleeve 1441D is provided with a flange 1444D to which the segmental gear 1445D is secured by means of rivets 1446D. The segmental gear 1445D is provided with a lower gear segment 1447D meshing with idler pinion 1448D journaled upon cross shaft 1411 and meshing with the large gear 1449D journaled upon the headed stub shaft 1430 adjacent the gear 1429T. This large gear 1449D meshes with pinion 1450D preferably formed integral with cross shaft 1451D journaled in the side plate of the meter frame in substantially the same manner as described for the ½-cent cross shaft 1380H and in the same manner keyed against longitudinal displacement. A driving pinion 1452D is preferably formed as an integral part of cross shaft 1451D in position to engage the circular rack teeth of the semi-circular dollars positioning rack 1365 which is, in the manner previously described, connected to the dollars printing wheel in the printing drum. The other gear segment 1453D carried by the segmental gear 1445D meshes with the dollars positioning rack 1226D of the additive register. The subtractive register positioning rack is operated from the additive register positioning rack 1226D by means of pinion 1454D, meshing with said rack, and which pinion is fastened to one end of sleeve 1455D which sleeve is journaled upon cross shaft 1456X and having at its opposite end a pinion 1457D meshing with positioning rack 1226D for the subtractive register.

The dollars index wheel 1376D is provided with ten detent notches 1417D and a spring loaded detent pawl mechanism, later to be described, cooperates therewith for yieldingly maintaining the index wheel in any one of its ten positions of adjustment.

The tens of dollars selector mechanism includes a selector lever 1375X securely fastened to index wheel 1376X by means of rivets 1377X. The index wheel is securely fastened to a flange sleeve 1458X by long rivets 1459X and the sleeve is provided with an internal bearing 1460X through which the dollars sleeve 1440D is journaled and thereby supporting the other sleeves and shaft of this portion of the mechanism previously referred to. Sleeve 1458X is provided with a bearing flange 1461X of relatively large diameter which extends through the bearing 1462X formed in the side plate 1090 (Fig. 45). The side plate bearing 1462X adjacent its upper portion is provided with a clearance opening 1463 (Figs. 15 and 24) which in connection with the relatively large diameter of bearing 1462X permits the entire selector assembly to be removed as a unit through the side wall 1090 of the meter frame.

A segmental gear 1464X is securely fastened to the inner end of flange sleeve 1458X by means of the same long rivets 1459X which fasten the index wheel to the forward end of said sleeve. The segmental gear is provided with a lower gear segment 1465X meshing with an idler pinion 1466X journaled upon cross shaft 1411. The idler gear 1466X meshes with the large gear 1467X journaled upon the headed stub shaft 1430 between gear 1449D and the inner face of side plate 1090 (Fig. 24). The large gear 1467X meshes with pinion 1468X preferably formed integral with cross shaft 1469X which shaft is journaled in the two side plates of the meter frame in substantially the same manner as described for the ½-cent cross shaft 1380H. Shaft 1469X is provided with a relatively long pinion 1470X likewise formed as an integral part of the shaft and which long pinion meshes with the tens of dollars semi-circular gear rack 1367 and through the mechanism previously described is thereby connected to the tens of dollars printing wheel carried by the printing drum 332. The segmental gear 1464X is provided with an upper gear segment 1471X which meshes with the tens of dollars positioning rack 1226X for the additive register. A pinion 1472X (Fig. 23) meshes with the positioning rack 1226X of the additive register and is securely fastened upon cross shaft 1456X by taper pin 1473X. The cross shaft 1456X is journaled in the two side plates of the meter frame in substantially the same manner as described for the ½-cent cross shaft 1380H. Directly below the subtractive register, a pinion 1474X is keyed to cross shaft 1456X by taper pin 1475X and meshes with the subtractive register positioning rack 1226X which rack is connected to the slide bar 1243X by means of bridge member 1246X and as previously pointed out, the bracket portion 1225X of positioning yoke 1222X is connected to the slide bar by rivets 1227X.

Through the mechanism just described, the operation of the tens of dollars selector lever 1375 will simultaneously adjust the tens of dollars printing wheel and the actuator mechanism for both of the registers to corresponding values.

The index wheel 1376X is provided with ten positioning notches 1417X and a detent mechanism is provided to cooperate with said notches for holding the index wheel in any one of its ten positions of adjustment.

DETENT MECHANISM FOR INDEX WHEELS

As previously pointed out, there is a separate detent mechanism for each of the five index wheels. Each is separate and distinct from the other and as they are all of substantially the same construction, the description of one will suffice for all. As may be observed most clearly in Figs. 43 and 45, each detent mechanism may include pawl 1476 pivotally mounted upon stub shaft 1477 which stub shaft is fastened to the side wall 1090 of the meter frame in any suitable manner and extends outwardly therefrom. The manner in which all of the detent pawls 1476 are assembled upon stub shaft 1477 is clearly shown in Fig. 45 and are maintained thereon by means of cotter pin 1478 and washer 1479.

The forward face of the upper end of detent lever 1476 is channeled as at 1480 to provide two spaced lugs 1481 between which a detent roller 1482 is pivotally mounted by means of pin 1483. A compression spring 1484 is interposed between the upper end of pawl 1476 and spring block 1485. The pawl is provided with a spring recess 1486 to retain the front end of said compression spring, while the block is provided with a spring bore 1487 for retaining the rear end of said spring. The spring block may be fastened to the meter frame side wall by means of screw 1488 (Fig. 45) or by any other suitable means.

Each of the detent pawls 1476 are provided with a rearwardly extending locking lug 1489 having a wedge shaped hardened pin 1490 securely fastened in the free end thereof against which a locking plate 1491 is brought to bear during the operating cycle of the machine to lock the index wheels through the detent pawls and thereby preventing shifting or displacing of any one of the selector levers which shifting might result in damage to the machine during its operating cycle. The locking of the selector mechanism during an operating cycle of the machine serves a further purpose by maintaining the actuating pinions for the semi-circular shaft racks in correct meshing alignment as will be pointed out hereinafter. The locking plate 1491 is securely fastened to the outboard end of control shaft 1492 in any suitable manner as by means of rivets 1493 extending through a flange 1494 formed in the end of the shaft by milling a segment from the shaft, in the manner shown in Figs. 42 and 43. The control shaft is journaled in the side plates 1089 and 1090 of the meter frame as by means of bearings 1495 and 1496 and is maintained in longitudinal alignment by collars 1497 and 1498 secured to said shaft at opposite sides of the side plate bearing 1496 as by means of taper pins 1499 and 1500 respectively.

For convenience, during the setting of the index levers, each of the index wheels is provided with index numbers representing its positions of adjustment. These numbers appear through suitable openings 1491a (Figs. 1 and 17) in the forward end of the selector housing 1373 and below each of said openings the housing is engraved with characters indicating the order of the respective openings, as indicated in Fig. 1. This arrangement gives a visible check to the setting of the respective selector levers.

At this point, attention will be directed to an important feature resulting from the particular construction and arrangement of the selector mechanism and the semi-circular printing wheel positioning racks carried by the meter shaft 1018. By reference to Figs. 20 and 24, it will be observed that the cents semi-circular rack 1360 is normally engaged by its actuating pinion 1410C while the meter is in its rest position and in the same way the opposed semi-circular rack 1367 of the tens of dollars printing wheel is in mesh with its related actuating pinion 1470X. As may be observed in Figs. 20 and 24, pinions 1410C and 1470X are positioned in vertical alignment upon opposite sides of the meter shaft 1018. The mechanism, as described before, for operatively interconnecting the index wheels 1376C and 1376X with their respective semi-circular gear racks 1360 and 1367 is arranged in such a manner that in all of the adjusted positions of said index wheels, the semi-circular racks 1360 and 1367 will be positioned so that their respective circular teeth are in alignment with each other, which alignment permits the rotation of said semi-circular racks with the meter drive shaft 1018 between the two actuating pinions 1410C and 1470X.

It may be observed in Fig. 24 that the direction of rotation of the meter shaft 1018 is counterclockwise as indicated by the arrow. During the initial portion of the cycle of rotation, the leading edges of the semi-circular racks 1360 and 1367 will enter in meshing engagement with actuating pinions 1470X and 1410C respectively, before the trailing edge of these semi-circular gear racks turn out of meshing engagement with the actuating pinions 1410C and 1470X respectively. This arrangement permits a free rotation of the shaft and at the same time maintains the semi-circular racks locked securely in their adjusted positions throughout the operating cycle of the machine.

The arrangement of the semi-circular racks 1364 and 1365 with respect to their actuating pinions 1434T and 1452D (Fig. 25) is similar to that just described for the semi-circular racks 1360 and 1367, therefore, it will follow that the locking of these racks in their said positions is effected in the same manner.

As has been described previously, the ½-cent rack 1358 is formed in a complete circle and, therefore, is maintained constantly in mesh with its actuating pinion 1395H, thereby permitting the free rotation of the shaft and at the same time locking the circular rack in its set position. As will be appreciated from the description just given, the selector mechanism operates not only to set up the printing of the selected value and the registering of such selected value, but also at the same time acts to lock these devices in their set position throughout the entire operating cycle of the machine, thereby insuring accurate and reliable operation.

As a further feature in safe-guarding the machine against the possible waste of postage and especially the inadvertent setting of the dollars or tens of dollars selector levers, means are provided for locking these two levers in their zero positions so that an operator intending to set the machine to print cents or tens of cents cannot inadvertently set the machine to print dollars or tens of dollars. This feature includes providing a separate locking means for each of the dollars and tens of dollars selector mechanisms which require manual release in order to permit operation of these two selectors. The safety lock for the dollars selector mechanism includes providing the dollars segmental gear 1445D with a horizontally extending latch pin 1501 (Figs. 20, 23 and 45) and providing a latch pawl 1502 at one end freely journaled upon the ½-cent cross shaft 1396H and at its upper end provided with a notch 1503 for engaging the said pin 1501 in the manner shown in the above referred to figures. The end portion of latch pawl 1502 is provided with an inclined cam surface 1504 to swing the pawl to admit the latch pin 1501 into the locking notch when the segmental gear 1445D is rotated in a counterclockwise direction, as viewed in Fig. 20, when returned to a zero position, thereby locking the dollars selector lever in its zero setting. The latch pawl is yieldingly maintained in its active latching position by means of tension spring 1505 interconnected between said pawl and screw 1506 carried by the upper edge of the meter front plate member 1037. To release the latch, a plunger 1507 is slidably mounted in and extends through the meter frame front bearing plate 1037 and through the front face of the meter housing 1508 to provide a push button by means of which the operator may swing the latch pawl 1502 to release latch pin 1501 thereby releasing the dollars selector mechanism for adjustment to any desired value setting. Upon release of plunger 1507, spring 1505 will return the pawl 1502 to its retracted position and said pawl will be maintained in this position by providing the plunger with a stop shoulder 1509 which engages the inner face of plate 1037 when the pawl has reached its fully retracted position.

The locking mechanism for the tens of dollars selector mechanism is substantially like that employed for the dollars mechanism and includes providing the tens of dollars segmental gear 1464X with a latch pin 1510 cooperating with a latch pawl 1511 which pawl at its lower end is journaled upon the ½-cent cross shaft 1396H and is provided at its upper end with a locking notch and tapered cam surface of similar construction to that formed in the upper end of the dollars latch pawl 1502. A spring 1512 interconnected between the pawl and frame acts to maintain the pawl in its retracted position. A plunger 1513 extending through the meter front plate 1037 and through the front wall of the meter housing 1508 and may be operated in the same manner described for the dollars lever for releasing the tens of dollars latch pin 1510 from its locking notch when it is desired to actuate the tens of dollars selector mechanism. This locking mechanism will automatically operate to relock the tens of dollars selector mechanism when returning to its zero position. Through the provision of these two locking mechanisms, it requires a deliberate act on the part of the operator before either the dollars or tens of dollars selector mechanisms may be operated and will thereby prevent accidental setting of these selector mechanisms.

METER LOCKING SYSTEM

The meter locking system may be divided into the following portions; one, a key lock for locking the machine against unauthorized use; two, a locking mechanism actuated by the rotation of the subtractive hundreds and thousands of dollars register wheels to zero; three, means for locking the meter when removed from the power plant; four, means for locking the printing drum housing door; and five, means for locking the meter against reverse rotation. Through the provision of the above referred to locking means, the meter is adequately protected against misuse, whether accidental or intentional.

The first of the above enumerated locking means, namely the key lock for locking the machine against unauthorized use, may include a key operated tumbler lock 1514 (Figs. 1, 25, 42 and 43) extending through a suitable bore 1515, formed in the side wall of the selector housing 1373 and securely fastened within said bore by providing the forward end of the lock with a flange 1516 which is brought into clamping engagement with the selector housing by means of a lock nut 1517 screw threaded upon the barrel portion of said lock to engage the rear face of said housing in the manner shown in Fig. 25. The lock 1514 is secured against rotation by providing its barrel portion adjacent its forward flange with a radially extending pin 1518, the outer end of which engages a keyway 1519 extending through the housing bore 1515. The rotative core portion of the lock 1520 is provided with the usual key slot 1521 to receive the key for rotating the core element of the lock. The inner end of the lock core is provided with a stop plate 1522 for engaging stop pin 1523 when the lock is in its unlocked position as shown in Fig. 42 and a stop pin 1524 when turned to its locked position as shown in Fig. 43. To yieldingly maintain the lock in its unlocked position as in Fig. 42, a spring 1525 is interposed between the stop plate and bracket 1526 which bracket is secured to the selector housing 1373 by means of screws 1527. A lock actuating pin 1528 extends outwardly from the lock plate to engage a stud 1529 projecting radially from control shaft 1492 into which the pin is screw threaded and securely retained in position by means of lock nut 1530.

By reference to Figs. 42 and 43, it may be observed that when the lock is rotated from its unlocked position of Fig. 42 to its locked position of Fig. 43, the lock actuating pin 1528 will engage the control shaft stud 1529 and will thereby rotate the control shaft in a counterclockwise direction as viewed in these figures to a locking position as shown in Fig. 43. A locking finger 1531 is securely keyed to the control shaft by means of taper pin 1532. Rotation of control shaft 1492, in a manner just described, will swing the locking finger 1531 (Fig. 25) into mesh with a locking notch 1533 formed in the periphery of a locking collar 1534 which collar is securely fastened to countershaft 1044 by means of taper pin 1535, thereby locking the countershaft against rotation and as this countershaft is at all times connected to the main driving shaft 1018 by means of gears 1045 and 1042 the main shaft of the meter is thereby securely locked against rotation.

In order to prevent possible damage to both the power plant and meter, the locking means above described is provided with means for rendering the meter driving clutch tripping mechanism inoperative whenever the locking means is actuated to lock the meter against unauthorized use.

The mechanism for rendering the clutch tripping mechanism inoperative includes providing control shaft collar 1498 with an actuating finger 1536 (Figs. 25 and 40) positioned to engage the upper end of push rod 1537 and force push rod downwardly, as viewed in Fig. 40, when the locking mechanism is actuated to lock the meter. The push rod is slidably mounted in bearing lugs 1538 suitably carried by meter frame side plate 1090. A head 1539 is screw threaded upon the lower end of push rod 1537 and locked thereon by means of lock nut 1540. The push rod head 1539 engages the free end of crank arm 1541 which crank arm is securely fastened to one end of sleeve 1542, which sleeve is journaled upon cross shaft 1543 while the cross shaft is suitably supported at its opposite ends in the meter side plates 1089 and 1090. Securely mounted upon the opposite end of sleeve 1542 is a second crank arm 1544, the free end of which engages shoulder 1545 formed on the lower end of plunger 1546, which plunger is slidably mounted in a plunger block 1547 securely mounted upon flanged stud 1548 between the flange 1549 of said stud and a nut 1550 screw threaded upon the end of said stud and said block is prevented from rotation by providing the block with a dowel pin 1551 extending into a suitable bore formed in the flange portion of said stud (Fig. 40). The plunger is yieldingly urged downwardly by means of compression spring 1552 interposed between the plunger and head portion of said block. As illustrated in Fig. 19, the plunger 1546 may be bored to receive the lower end of spring 1552. The lower end of plunger 1546 is turned down as at 1553 and the lower end of this portion engages the head 1554 of pin 1555 slidably extending through bushing 1556 which bushing is mounted in a suitable bore 1557 formed in the meter base plate 1558 (Figs. 19 and 40). Each side of plunger block 1547 is cut away as is clearly indicated in Fig. 36 to provide operating clearance for the end of crank arm 1544 to engage the shoulder portion of the plunger.

This completes the meter portion of the mechanism for rendering the power plant clutch tripping device inactive and the remaining portion of this mechanism is mounted upon the power plant and includes a plunger 1559 slidably mounted in sleeve 1560 which sleeve depends from the meter supporting plate 970. The plunger 1559 is provided with an annular groove 1561 and the sleeve with screw 1561a, the point of which screw enters the plunger groove to limit the extent of vertical movement of said plunger (Figs. 19 and 40). The lower portion of sleeve 1560 is provided with a longitudinal slot through which extends arm 1563 of lever 1564. The lower end of plunger 1559 is provided with a rounded portion which engages the upper edge of lever arm 1563. The lever 1564 is pivotally connected to bracket 1565 by means of pin 1566. The bracket is securely mounted upon the front face of the front transmission bracket 163 (Fig. 5) by any suitable means. The arm 1567 of lever 1564 is connected to the upper end of control link 1568 (Figure 37) by means of pivot pin 1569. The intermediate portion of said control link is swingably supported from bracket 1565 by means of link 1570 which link at its free end is connected to said control link 1568 by means of pivot pin 1571, while the opposite end of said link 1570 is pivotally connected to bracket 1565 by pin 1572.

The lower end of control link 1568 (Figure 6) is provided with a horizontally extending foot 1573 which overlies the floating link pin 593 in the manner shown in Figure 6. A compression spring 1574 is interposed between link 1570 and a bar 1575 projecting rearwardly from bracket 1565 and securely fastened therein by means of taper pin 1576. A spring retaining pin 1577 extends upwardly from link 1570 through the spring to prevent the same from buckling. The upper end of spring 1574 is confined within a hole 1578 formed in the bar 1575. Screw threaded through the forward end of bar 1575 is a stop screw 1579 for limiting the clockwise rotation of lever 1564 as viewed in Fig. 6. The stop screw is securely fastened in its adjusted position by means of lock nut 1580.

The position of the parts just described in Fig. 6 illustrates these parts as they would appear when the clutch tripping mechanism is conditioned for normal operation. When the meter is locked by its key locking means, this key locking mechanism operates to release lever 1564 for rotation in a clockwise direction as viewed in Fig. 6 under the influence of its compression spring 1574.

The clockwise rotation of lever 1564 moves control link 1568 downwardly and by means of its foot portion 1573 engaging pin 593 forces the forward end of link 592 downwardly until its shoulder 605 is well below the contact surface 606 of trip lever 549, whereby an attempted actuation of the clutch tripping mechanism, either by the envelope tripping mechanism 621 or the manual tripping mechanism 846, the floating link 592 will be swung forwardly, in the manner described in the above-noted copending application Serial No. 435,488 when placing the meter clutch in operation, but due to the depressing of its forward end, by the mechanism just described, its shoulder 605 instead of engaging the surface 606 of the clutch tripping lever 549 will move freely past the end of the trip lever without engaging said lever and consequently said tripping lever cannot be operated to place the motor driving clutch in operation.

When the meter is unlocked by means of the key locking mechanism above described, it will function to rotate lever 1564 in a counter-clockwise direction as viewed in Fig. 6 which rotation will lift the control lever foot 1573 and thereby permit the forward end of floating link 592 to return to its normal operative position.

Through the mechanism above described, whenever the meter is locked by means of its key lock 1514, not only will it operate to lock the meter against rotation, but simultaneously therewith, will render the power plant tripping mechanism inoperative, thereby making it impossible to trip the meter clutch into operation while the meter is locked, and upon release of the meter key lock 1514, the driving mechanism of the meter will be released and simultaneously therewith the clutch tripping mechanism of the power plant will be returned to its operative condition.

SUBTRACTIVE REGISTER LOCK

*(Figs. 22, 26, 34–39 inclusive)*

The locking system for the meter includes mechanism which becomes operative when the hundreds and thousands of dollars register wheels in the subtractive register reach their zero positions to lock the machine against further use until an additional amount of postage is purchased and entered into these two register wheels by an authorized post office official through means later to be described.

The subtractive register portion of the locking system may include providing the hundreds of dollars locking disc 1158 with a circular recess 1581 and providing the locking disc 1163 of the thousands of dollars register wheel with a similar circular recess 1582 and locating these discs with relation to their respective register wheels, whereby when these register wheels indicate a zero reading, their related recesses will be positioned directly downwardly as shown in Figs. 37 and 38.

A pair of control wheels 1583 and 1584 are arranged to yieldingly engage the control discs 1158 and 1163 respectively. The control wheels are preferably formed as an integral part of sleeve 1585 journaled upon shaft 1586 which shaft at its opposite ends is securely fastened in the side members of a control yoke frame 1587. Frame 1587 is pivotally mounted upon shaft 1588 which shaft is securely mounted in the rear register end plate 1084 and bracket 1239. A locking lever 1589 is bifurcated at its upper end to pivotally support a roller 1590 by means of pin 1591, which roller is maintained in engagement with the bridge portion 1592 of frame 1587. The lever 1589 is securely fastened upon one end of rocker shaft 1593 by means of taper pin 1594. A gear segment 1595 is securely fastened upon the opposite end of rocker shaft 1593 by means of taper pin 1596 and said rocker shaft is supported intermediate lever 1589 and gear segment 1595 in bearing 1597, which bearing is carried by one arm of a U shaped bracket 1598 securely fastened to the inner face of the meter frame side wall 1089 by suitable screw means 1599. The other arm 1600 supports the extreme inner end of shaft 1593 in the manner clearly shown in Fig. 35.

A vertically extending gear rack 1601 meshes with the gear teeth formed on gear segment 1595 and is slidably mounted in bearing lugs 1602 preferably formed as an integral part of the meter side plate 1089 (Figs. 36 and 38). The gear rack 1601 is yieldingly urged downwardly by interposing a compression spring 1603 between the upper of the two bearing lugs 1602 and collar 1604, securely fastened to the gear rack by means of taper pin 1605. A head 1606 is screw threaded upon the lower end of rack bar 1601 and locked in its adjusted position by means of lock nut 1607 and engages the free end of lever 1608. The lever 1608 at its opposite end is securely fastened to sleeve 1609 which sleeve is journaled upon cross shaft 1543. Securely fastened upon the opposite end of sleeve 1609 is lever 1610, the free end of which engages shoulder 1545 upon the opposite side of plunger 1546 from that engaged by the key locking mechanism lever 1544 (Fig. 36).

From the above description, it may be observed that the subtractive register locking mechanism engages the same plunger 1546 engaged by the key locking mechanism whereby if the meter is locked by either the key or subtractive register locking mechanisms the power plant clutch tripping mechanism will be rendered inoperative in the manner previously described.

The locking impulse of the subtractive register locking mechanism takes place when the hundreds of dollars and thousands of dollars register wheel assemblies turn to their zero positions whereupon as clearly shown in Figs. 37 and 38, the control wheels 1583 and 1584 will enter the circular recesses 1581 and 1582 of their related locking discs, thereby permitting the upward movement of control frame 1587 and a resultant clockwise rotation of the locking lever 1589 as viewed in these figures. The clockwise rotation of lever 1589 and the upward movement of frame 1587 results from the action of spring 1603, which spring continuously urges the rack bar 1601 downwardly and through its meshing engagement with gear segment 1595 moves the parts in the manner above described.

The downward movement of rack bar 1601 through the engagement of its head portion 1606 will rotate lever 1608 in a clockwise direction as viewed in Fig. 37 and this rotation will be transmitted through sleeve 1609 to rotate lever 1610 from its normal position as shown in Fig. 35 to its locking position as shown in Fig. 37. This action lifts the plunger 1546 thereby rendering the meter clutch tripping mechanism inoperative in the manner described for the key locking portion of the locking system.

Not only does the subtractive portion of the locking system render the clutch tripping mechanism inoperative, but it also locks the driving portion of the meter so that it cannot be operated during such time that the hundreds and thousands of dollars register wheels are in their zero position. For this purpose, the locking lever is provided with a downwardly extending arm 1611 normally maintained clear of stop member 1612, which stop member is securely keyed to countershaft 1044 by means of taper pin 1612A, as shown in Fig. 36.

The rotation of locking lever 1589 in a clockwise direction in the manner previously described, when the hundreds of dollars and thousands of dollars register wheels turn to zero, swings the free end of the locking lever arm 1611 into locking register with the stop member 1612 as clearly shown in Fig. 38, thereby preventing rotation of the countershaft in a counter-clockwise direction as viewed in this figure.

Means are provided for preventing reverse rotation of the meter driving mechanism which means may include providing the meter shaft 1018 adjacent its rear supporting bearing 1025 with a ratchet wheel 1613 (Figs. 19 and 26) and securely locking the ratchet wheel to said shaft by means of taper pin 1614. Cooperating with ratchet wheel 1613 is pawl 1615 pivotally mounted upon stud 1616 extending inwardly from the end plate 1026 of the meter frame. The pawl is maintained upon stud 1616 by washer 1617 and cotter pin 1618 and its free end is yieldingly urged into operative engagement with the teeth of ratchet wheel 1616 by means of torsion spring 1619, which spring encircles the stud 1616 and acts between the plate 1026 and the pawl. A second latch pawl 1620 is mounted upon stud 1621 extending inwardly from plate 1026. The pawl is confined upon stud 1621 by means of washer 1622 and cotter pin 1623 and a compression spring 1624 acting between the pawl and bracket 1625 yieldingly maintains the free end of said pawl 1620 in operative engagement with the teeth of ratchet wheel 1613. The forward end of spring 1624 engages a suitable recess formed in pawl 1620, while the opposite end of spring 1624 is mounted upon a supporting pin 1626 projecting from bracket 1625. The two pawls 1615 and 1620 are so related that when one abuts the radial surface of one tooth, the other pawl will be half way between the radial surface of two adjacent teeth, thereby insuring a positive and reliable locking of the main meter shaft 1018 against reverse rotation.

MEANS FOR LOCKING METER WHEN REMOVED FROM POWER PLANT

That portion of the locking system which includes the means for locking the meter to prevent its operation when removed from the power plant, may include two separate locking features, the first of which may include providing the locking and positioning pin 985 (Figs. 26, 27 and 28) with a vertically extending shank 1627 passing through a guide bore 1628, formed in flange 1629, which flange is preferably formed as an integral portion of the meter end plate 1026 (Fig. 19). The upper end of shank 1627 is slidably guided in lug 1630, which lug preferably formed as an integral part of the meter rear plate 1026. The shank at its upper end is provided with a locking head 1631. The locking pin 985 is yieldingly urged upwardly by interposing a compression spring 1632 between the top surface of flange 1629 and collar 1633, which collar is securely fastened to said shank by means of taper pin 1634.

The flange portion 1629 is provided with a suitable counterbore 1635 to permit a limited upward movement of said pin until its enlarged portion 1636 seats against the upper end of said counterbore. When the locking pin is in the above mentioned position, namely when its head portion 1636 seats against the upper end of the counterbored portion 1635, as shown in Fig. 27, the locking head 1631 of said shank will move into locking engagement with a suitable locking notch 1637 formed in the hub portion 1638 of the countershaft driving gear 1045 (Fig. 28), thereby securely locking the countershaft from rotation in a clockwise direction as viewed in Figs. 26 and 27, while the reverse rotation of the countershaft is locked by the main shaft ratchet and pawl means previously described.

Figure 26:
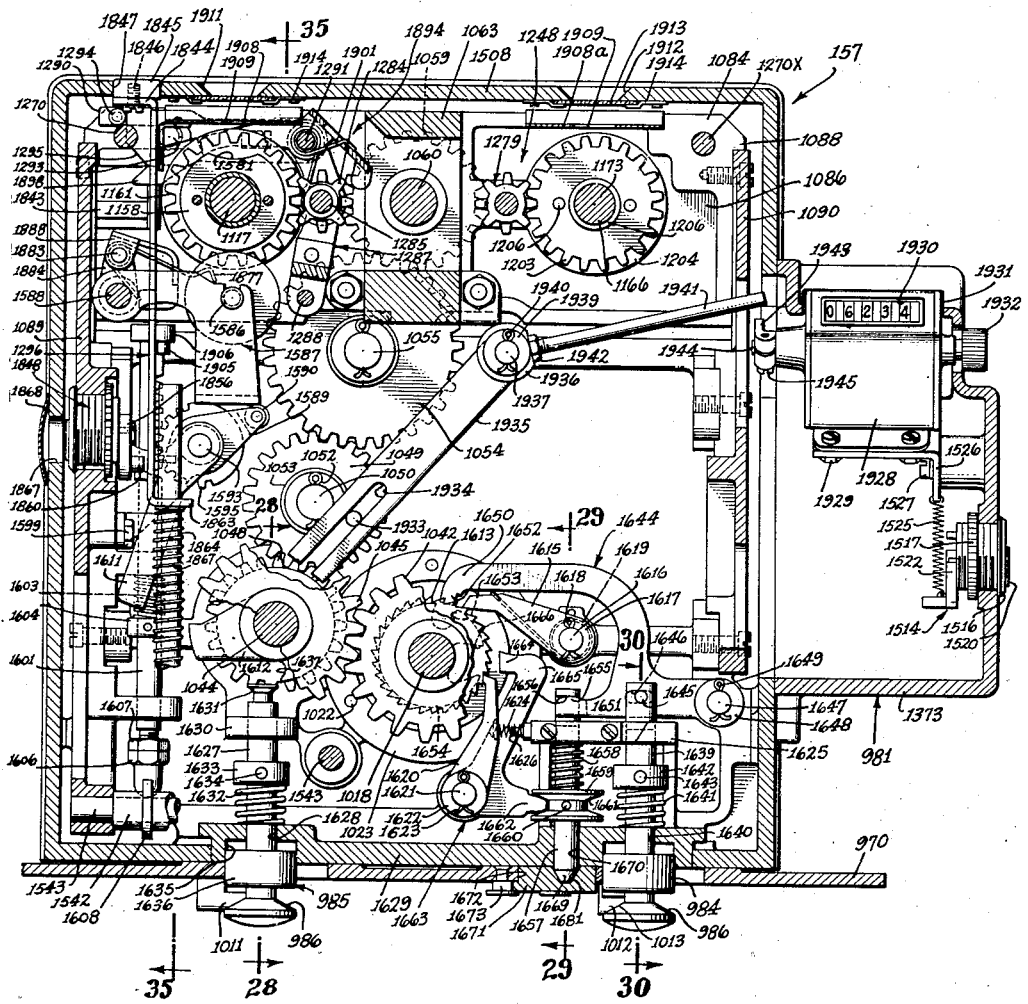
Figure 26 is a sectional view taken substantially in the plane of line 26—26 of Fig. 19.

The positioning and locking pin 985 is moved downwardly to release its locking head 1631 from the locking notch 1637 when the meter is in its operative position on the power plant as is clearly shown in Figs. 26, 28 and 30. This action is due to the engagement of the cam surfaces formed upon the lower end of the locking pin 985 and locking member 1011 which member is mounted upon the power plant meter supporting plate 970 and which cam surfaces engage and force the pin downwardly during the movement of the meter into its locked position in the manner previously described.

An additional locking means is provided for locking the meter when released from the power plant which may include the positioning and locking pin 984, similar in construction to the locking pin 985 and is provided with a shank 1639 extending through guide bore 1640 formed in flange 1629 and through bracket 1625. The pin 984 is yieldingly urged upwardly by means of compression spring 1641 interposed between the upper surface of flange 1629 and collar 1642 which collar is securely fastened to said shank by means of taper pin 1643. The upper end of shank 1639 is bifurcated to receive a locking lever 1644 and is pivotally connected to said lever by means of pin 1645 which pin engages a longitudinal slot 1646 formed in said lever. One end of lever 1645 is mounted upon pivot pin 1647 which pin is suitably fastened to the meter end plate 1026 and the lever is maintained upon said pivot pin by means of washer 1648 and cotter pin 1649.

The locking lever 1645 is provided with two arms, an upper arm 1650 and a lower arm 1651. The locking lever upper arm 1650 is provided with a downwardly directed locking finger 1652 which is arranged to cooperate with locking notch 1653 formed in the periphery of locking disc 1654 which disc is preferably formed as an integral portion of the ratchet wheel 1613.

The lower arm 1651 of the locking lever 1644 is provided with an arcuate cam surface 1655 engaging a cooperating cam surface 1656 formed on the upper end of plunger 1657 which plunger slidably extends through bracket 1625 and the end plate flange 1629. The plunger is yieldingly urged downwardly by interposing compression spring 1658 between the undersurface of bracket 1625 and a collar 1659 secured to said plunger by means of taper pin 1660. The collar 1659 is provided with an annular groove 1661 into which the free end of arm 1662 of bellcrank lever 1663 operatively engages. The bellcrank lever 1663 is pivotally mounted upon the ratchet pawl pivot pin 1621 and is interposed between ratchet lever 1620 and the front face of the meter rear plate 1026. A locking finger 1664 is formed upon the upper arm 1665 of bellcrank lever 1663 and cooperates with locking notch 1666, which locking notch is formed in the ratchet wheel locking disc 1654.

The operation of this portion of the locking mechanism is briefly as follows:

When the meter is removed from the power plant, the positioning and locking pin 984 is moved upwardly under the influence of spring 1641 until the enlarged portion 1667 of the pin seats in the upper end of counterbore 1668. This upward movement of the locking pin rotates the locking lever 1644 about its pivot 1647 in a clockwise direction as viewed in Fig. 27. This clockwise rotation of locking lever 1644 rotates the locking finger 1664 of the bellcrank lever 1663 into locking engagement with the notch 1666 formed in said ratchet wheel locking disc as is clearly shown in Fig. 27. The motion is transmitted from the locking lever to the bellcrank through plunger 1657, its collar 1659, to the arm 1662 of said bellcrank lever. When the meter is removed from the power plant, the locking finger 1664 of bellcrank 1663, in entering the locking notch 1666, positively locks the driving mechanism of the meter against operation in either direction. It also retracts the point 1669 of plunger 1665 into its guide bore 1670 to permit the placement or removal of the meter from the power plant.

When the meter is correctly positioned and locked upon the power plant, the locking and positioning pin 984 will be withdrawn a predetermined distance due to the engagement of the cam surface 1013, formed upon the pin and locking member 1012. This position of the parts is clearly shown in Fig. 26 and the downward movement of the locking pin 984 acts to rotate its connected locking lever 1644 in a counter-clockwise direction and through its connection with plunger 1657 will swing the bellcrank 1663 in a counter-clockwise direction to remove the bellcrank locking finger 1664 from engagement with the locking notch 1666 thereby releasing the power plant driving mechanism for operation.

The counter-clockwise rotation of locking lever 1664 swings the locking finger 1652, carried by its arm portion 1650 to a position directly adjacent by not entering the locking notch 1653, as is clearly shown in Fig. 26. It will be understood that finger 1652 of the locking lever 1644 does not enter into locking engagement with the locking disc when the locking pin 984 is pulled downwardly during the movement of the meter into operative position upon the power plant.

When the meter is removed from the power plant, should it be attempted to actuate the meter by pulling out the locking pin 984, there is no way for the person attempting such manipulation to know when the locking pin has reached its meter releasing position. If the pin is not moved far enough, the locking finger 1664 will not be released from its locking notch 1666 or if the pin is pulled out too far, the locking finger 1652 carried by arm 1650 of the locking lever will enter into locking engagement with the locking disc notch 1653, thereby locking the meter driving mechanism against operation.

The adjustment between the operating position and the two just referred to locking positions of the mechanism is so critical that is necessitates a very accurate positioning of the locking and positioning pin 984 to render the machine operative. This feature is incorporated for the purpose of discouraging attempts to tamper with the meter when removed from the power plant. If the person attempting to tamper with the machine, manipulated only the positioning and locking pin 984 and did not at the same time pull outwardly upon the locking pin 985, and did succeed in freeing the machine for operation, it would turn the undercut portion of the locking notch 1637 under the head portion 1631 of locking pin 985 and as a result thereof would not only lock the driving mechanism of the machine against operation, but would also lock the locking pin 985 against outward movement. As the meter driving mechanism can not be rotated in a reversed direction to release the engagement of notch 1637 with the head 1631, the meter would require returning for servicing in order to place it back in its normal operative condition.

As a further precaution to discourage tampering with the meter while it is removed from the power unit, the positioning and locking pin compression springs 1632 and 1641 are of sufficient strength to prevent manual manipulation of the pins. It would require special tools in order to accomplish the proper actuation of the pins to release the meter for operation.

Emergency means are provided for releasing the meter from the power plant should the driving mechanism of the meter or power plant become jammed or stuck during the operating cycle of the machine. This means includes providing the meter supporting plate 970 of the power plant with a disc 1671 (Figs. 13, 14, 26 and 31) which disc is journaled in a suitable bore 1672 extending through said plate so that the upper surface of said disc is flush with the top surface of said plate. The disc is provided adjacent its lower surface with a flange for supporting it to plate 970 by means of headed rivets 1673, as is clearly shown in Figs. 14 and 26, where it will be observed that the flange portion of the disc 1671 is retained between the heads of said rivets 1673 and the bottom surface of the meter supporting plate 970.

In order to assemble disc 1670, its flanged portion is provided with two notches 1674 positioned to register with the heads of rivets 1673 in order to permit the disc to be inserted into the bore 1672 when the disc is turned to an extreme inoperative position. The disc 1671 is provided with an arm 1675 (Figure 14) having a right angled end portion 1676 which right angled end portion is secured to a post 1677 by a headed locking pin 1678 which pin extends through aligned bores formed in said post and portion 1676 of said arm. The post 1677 is securely riveted to the under surface of plate 970. The end of pin 1678 is provided with a transverse bore through which the wires 1679 are passed. The ends of the wires are fastened together by means of a lead seal 1680 applied by an official of the post office department. A conical depression 1681 (Figure 26) is provided in the upper surface of disc 1671 eccentric to the axis of rotation thereof to receive the point 1669 of plunger 1657 when the meter is locked in its operative position.

During the removal of the meter from the power plant, the tapered surfaces of the plunger point 1669 and conical depression 1681 will cam the plunger upwardly against the tension of its spring 1658. This upward movement of the plunger will cause the bellcrank 1663 to rotate about its pivot in a counter-clockwise direction and as the meter driving mechanism is in its rest position, the locking finger 1664 of this lever may enter the locking disc notch 1666. However, should it be attempted to remove the meter from the power plant while the driving mechanism of the meter is in some other position than its normal rest position, the end of locking finger 1664 will engage the periphery of locking disc 1665 thereby preventing the camming of the end of plunger 1658 from the conical depression 1681 and as a result, the meter cannot be removed from the machine until the parts are returned to their rest position. This is for the purpose of preventing the removal of the meter while the stamp printing die is located opposite the printing aperture in the printing drum cover 980.

In the event that the mechanism in the meter or the power plant becomes inoperative through jamming, when the driving and driven mechanism of said meter and power plant are out of normal rest position, it will be impossible to remove the meter from said power plant in the normal and above described manner and it will necessitate the service of an authorized official of the post office department to break the seal 1660, remove the wire 1679 from the end of the headed locking pin 1678 and thereafter withdraw the said headed locking pin from the end 1676 of the disc arm 1675 and thereafter to rotate the disc by means of manipulating the arm 1675 while simultaneously actuating the meter locking crank handle 999 and thereby permitting the pointed end 1669 of plunger 1665 to travel during the movement of the locking and positioning pins along their respective slots until the pins are free of their respective locking members, whereupon the meter may be lifted from the power plant.

LOCKING MEANS FOR THE PRINTING DRUM HOUSING DOOR

The printing drum housing 980 is provided with a door 1682 (Fig. 1) to permit access to the date printing type wheel of the printing drum for the actuation of said type wheels to set the date for printing. The door 1682 is securely fastened to rocker shaft 1683 by means of key 1684 (Figs. 40 and 41). Each end of shaft 1683 is journaled in bearings formed in the drum housing 980, as is clearly shown in Fig. 40, and at its inboard end, is provided with a tongue 1685 operatively engaging groove 1686 formed in the end of shaft 1687 which shaft is supported in bearing 1688. The shaft bearing 1688 is preferably mounted upon the meter front plate 1037 and extends inwardly therefrom. Shaft 1687 is maintained against longitudinal displacement by means of sleeve 1689, secured to the forward end of said shaft by means of taper pin 1690 and which sleeve engages the forward end of bearing 1680.

The opposite end of shaft 1687 is provided with a flange 1691 to which is securely fastened by means of rivets 1692, a locking disc 1693, which disc abuts the inboard end of bearing 1688 to prevent longitudinal displacement of the shaft in a forward direction. A locking notch 1694 is formed in the periphery of locking disc 1693 and normally engages a locking segment 1695 which locking segment is securely fastened to the ½-cent cross shaft 1396H by means of taper pin 1696. The locking segment is provided with a ½-cent locking surface 1697, a zero locking surface 1698 and between these two surfaces with slot 1699 which slot is provided to free the locking disc when the ½-cent selector lever is positioned half way between its ½-cent and zero printing positions.

An over center spring 1700 acts between pin 1701, carried by the locking disc 1693 and pin 1702 extending rearwardly from the front meter plate 1037. The pin is provided with a clearance groove 1703 through which the peripheral edge of locking disc 1693 may pass. The locking disc 1693 is provided with two stop pins 1704 and 1705. As shown in Fig. 23, the stop pin 1704 is in engagement with the spring pin 1702 to prevent further rotation of the disc under the influence of its spring 1700, while in Fig. 41, the stop pin 1705 is shown in engagement with spring pin 1702 to prevent further rotation of the disc in a counter-clockwise direction, as viewed in this figure, under the influence of spring 1700.

Means are provided for locking the driving mechanism of the meter against rotation when the locking segment slot 1699 is swung into alignment with the edge of locking disc 1693 and for this purpose a locking finger 1706 is securely fastened to the ½-cent cross shaft 1396H by means of taper pin 1707. Secured to countershaft 1044 is a locking sleeve 1708, by means of taper pin 1709 (Fig. 44). The locking sleeve 1708 is provided with a flange 1710 which flange is notched as at 1711 to provide a stop shoulder to engage the free end of stop finger 1706 when the half cent selector lever 1375 is positioned half way between its ½-cent and zero setting. Fig. 44 illustrates locking finger 1706 in position to engage the locking notch 1711 of sleeve 1708 when the ½-cent selector lever is in between its ½-cent and zero positions. This figure also indicates in broken lines the position to which the locking finger will be moved when the ½-cent lever is located in either its ½-cent or zero positions. In these two mentioned positions, it will be noted that the locking finger will entirely clear the flange of the locking sleeve 1708, thereby releasing the counter-shaft for operation.

This locking mechanism also serves the purpose of preventing the ½-cent lever from being shifted from either its zero or ½-cent positions to the intermediate position during the operating cycle of the machine and releases the ½-cent lever for adjustment only when the meter is in its normal rest position.

When it is desired to unlock the printing drum housing door 1682 for the setting of the date type, the machine must be in its normal rest position whereupon the ½-cent selector lever 1375H may be moved from either one of its two positions until it is half way therebetween and when so positioned, the following conditions will be obtained: First, the detent roller 1482 of the ½-cent detent lever 1476 will rest upon the point of the ½-cent index wheel tooth 1712 between detent notches 1385 and 1386 thereby swinging the detent lever 1476 in a clockwise direction, as viewed in Fig. 40, which movement of the detent lever rotates control shaft 1492 by the engagement of the detent lever pin with the control shaft locking plate 1491. The rotation of the control shaft will lock the driving mechanism of the machine against operation and also render the clutch tripping mechanism of the power plant inoperative in the manner described. The second result of placing the ½-cent selector lever half way between its two positions of adjustment will swing the locking segment 1695 until its notch 1699 registers with the locking disc 1693, thus releasing the locking disc for rotation and thereby unlocking the door 1682 for opening. The ½-cent selector mechanism will be locked in its position as soon as the door is opened. This result is obtained by the rotation of the locking disc notch 1697 from alignment with the locking segment 1695 and the rotation of the periphery of the locking disc into the segmental notch 1699, thus positively locking the segment against rotation in either direction. Through this arrangement of the parts, the ½-cent locking mechanism may be released only when the door 1682 is returned to its closed position whereupon the locking disc notch 1694 will again register with the ½-cent locking segment 1695.

The third result of positioning ½-cent lever as above set forth, is the rotation of the locking finger 1706 into locking engagement with the counter-shaft locking sleeve 1708 in the manner above described, which provides an auxiliary safety lock. From the above description, it will be readily appreciated that the machine is fully safeguarded when the printing drum housing door 1682 is unlocked and when opened to set the date wheels in the printing drum and that the machine cannot be returned to its operative condition until door 1682 is returned to its closed position.

TOWN CIRCLE AND DATE WHEEL ASSEMBLY (Figs. 46, 51, 51a, 51b, 51c, 52 and 53)

The printing drum housing door 1682 (Figures 1 and 46) is arranged when opened to expose only the town circle, date and slogan printing dies.

The town circle is carried by a primary frame 1713 (Figures 51b and 51c) which is slidably mounted in the printing drum opening 1312 and the date printing wheels are mounted in a secondary frame 1714 which is slidably mounted within the primary frame 1713. Adjusting means 1715 is provided for moving the secondary frame relative to said primary frame and a second adjusting means 1716 (Figure 46) is provided to position the primary and secondary frames as a unit relative to the printing drum 332 (Fig. 50).

The primary frame 1713 (Figure 51a) includes two U shaped frame members 1717 and 1718 (Figure 51b) maintained in spaced relation by a pair of blocks 1719 and 1720, said blocks being positioned at the lower corners of said U shaped frame members and securely fastened thereto by means of rivets 1721 (Figure 51c), while the upper ends of the two frame members are fastened to the town circle supporting block 1722 by means of screws 1723. This structure forms a more or less rectangular frame in which is slidably mounted the secondary frame 1714. The secondary frame includes two substantially L shaped frame members 1724 and 1725 (Fig. 46). These L shaped frame members are arranged so that their horizontally extending portions are interconnected by means of a tongue 1726 formed on the frame member 1725 and a groove 1727 in the frame member 1724 to thereby form a substantially U shaped frame. The upwardly extending portions of each of said L shaped members 1724 and 1725 are provided with guideways 1728 (Figure 51a) for slidably engaging the vertically extending arms of the U shaped frame members 1717 and 1718. The lower end of the secondary frame is in the form of a substantially rectangular block 1729 (Figure 52) machined to slidably fit into the rectangular opening formed in the lower end of the primary frame between its two side plates and end blocks.

The date printing wheels are mounted between the vertically extending portions 1730 (Figure 46) and 1731 of the secondary frame by means of a flanged shaft 1732. The flange 1733 of said shaft is seated in counterbore 1734 formed in the inner face of the vertical portion 1730 of the secondary frame member and locked against rotation by means of dowel pin 1735 (Figure 51a), while the ends of said shaft are mounted in suitable bores formed in the secondary frame portions 1730 and 1731. The date circle printing wheel supporting shaft 1732 between the secondary frame portions 1730 and 1731 is provided with three eccentric steps of different diameter. The eccentricity of these steps generally follows the circumference of the printing drum.

As may be observed in Fig. 46, the date printing wheel shaft 1732 is mounted within the printing drum considerably above and to one side of its center of rotation and therefore, it is desirable to provide this shaft with three eccentric bearing surfaces of different diameter to permit the use of date printing wheels of more nearly the same overall diameter.

The smaller of the three eccentric bearing surfaces 1736 supports a printing wheel 1737, having the months of the year engraved thereon. Journaled upon the second eccentric bearing surface 1738 are two date printing wheels 1739 and 1740 which may be adjusted to print the days of the month, and journaled upon the third eccentric bearing surface 1741 are two printing wheels 1742 and 1743 (Figure 51) for printing the last two figures of the year.

Each of the printing wheels just referred to is provided with a detent mechanism for yieldingly maintaining its respective wheel in a selected printing position. As the detent mechanism for each of the printing wheels is identical, the detent mechanism for the months of the year printing wheel will be described. By reference to Fig. 51 it may be observed that the months of the year printing wheel 1739 is provided with detent notches 1744, one for each printing face of said wheel. A detent ball 1745 is yieldingly maintained in engagement with one of said notches by compression spring 1746. The spring and ball are mounted within a suitable bore 1747 drilled into shaft 1732 in the manner shown in the above referred to figures and the entrance to the hole is peened over slightly to retain the ball within said bore. The detent will permit the printing wheel to be easily turned from one position to another and yet will maintain the wheel in any one of its selected printing positions, thereby preventing displacement thereof during the printing operation.

A town circle printing die 1748 is securely fastened to the end surface of block 1722 by means of screws 1749. This die is provided with a pair of concentric circles between which the post office location is engraved. The town circle printing die is provided with a suitable opening 1750 through which the peripheral printing faces of the date printing wheels may be positioned to simultaneously print the date along with the printing of the town circle. As may be observed in Figs. 46, 51 and 51c, the printing surface of the town circle die 1748 has a curvature coincidental with the circumference of the printing drum. The type faces of the date printing wheels are of a suitable arcuate contour in a transverse plane so that when turned into printing position, the said arcuate contour will likewise coincide with the periphery of the printing drum.

When the machine is to be operated for treating second and third class mail matter, it is necessary to render the date printing wheels inoperative to print the date within the town circle and for this purpose the printing wheels are mounted within the secondary frame 1714 and may be retracted relative to the primary frame 1713 by any suitable means, as for example, by an eccentric shaft 1751 journaled in bearings 1752 and 1753 carried by the end blocks 1719 and 1720 respectively of the primary frame. The eccentric shaft is maintained against longitudinal displacement by means of an annular groove 1754 and a key pin 1755 as is clearly shown in Fig. 51. The portion of the shaft intermediate the primary frame end blocks is provided with an eccentric portion 1756 which eccentric portion extends through the secondary frame groove 1727. The eccentric portion 1756 closely fits within said groove so that as the shaft is rotated, for example, in a clockwise direction as viewed in Fig. 46, the eccentric portion will engage the lower surface of groove 1727 and as a result will force the secondary frame downwardly with respect to the primary frame. This downward movement of the secondary frame will retract the printing wheels to their non-printing positions.

For convenience in operating the eccentric shaft 1751, it is provided at its forward end with an operating key 1757. Means are provided for yieldingly maintaining the eccentric shaft in either one of its two extreme operating positions, namely, when the date wheels are in position for printing or retracted to their non-printing positions, which detent means may include providing the portion of the eccentric shaft which extends through bearing 1752 with two spaced detent notches 1758 (Figure 52) and yieldingly urging a detent ball 1759 into engagement with one or the other of said notches. The ball and its compression spring 1760 are mounted within a suitable bore 1761 drilled through the side of end block 1719. The ball is prevented from displacement from the bore by peening the inner end of said bore sufficiently to prevent the passage of the ball therefrom, while the spring 1760 is maintained within said bore by engaging the ball at one end and at its opposite end engaging the frame member 1718.

Through the above described mechanism, the date printing wheels may be easily and quickly moved to or from their printing position with relation to the town circle. When the machine is to treat mail matter which is to be registered, the post office department requires the printing of the stamp without either the town circle or date being printed upon said matter, therefore, the primary frame 1713 which carries the town circle is mounted within the printing drum in such a manner that it may be moved into a printing position or readily retracted into a non-printing position and for this purpose each of the end blocks 1719 and 1720 is provided with a guide lug 1762 and 1763 and the town circle supporting block is provided with lugs 1764 and 1765 which are aligned with the guide lugs carried by the two end blocks and these guide lugs are slidably mounted in suitable guideways 1766 and 1767 formed in the printing drum cap 1316 and the main body of the printing drum respectively (Figs. 51 and 52).

Means are provided for moving the primary frame 1713 to position the town circle printing die carried thereby either in printing or non-printing positions, which means may include providing the frame member 1717 with a downwardly extending rack 1768 which rack may be formed as an integral part of said frame, as shown in the drawings, by providing the lower portion of said frame with a channeled extension having rack teeth cut into the flanges thereof. The frame rack 1768 extends down into a suitable opening 1769 formed in said drum and meshes with pinion teeth 1770 cut in the adjusting shaft 1771 (Fig. 19). The adjusting shaft 1771 is journaled in the aligned bores 1772 and 1773 in the cap 1316 (Figure 52) and the printing drum respectively. The forward end of shaft 1771 is provided with a shank 1774 which extends into the cap 1316 and has secured thereto a crank arm 1775. The free end of the crank arm 1775 is provided with bushing 1776, as clearly shown in Fig. 19. A locating pin 1777 extends through said bushing and is provided at the outer end with a knob 1778. A spring 1779 is mounted within a suitable counterbore formed in said bushing and acts between the bushing and a shoulder formed on said pin to yieldingly urge the end of said pin into either one of two positioning holes 1780 drilled into the side face of the drum cap 1316.

When the town circle printing die is to be moved from its printing to its non-printing position, the knob 1778 will be pulled outwardly to free the end of the positioning plunger 1777 from its positioning hole and thereafter swinging said crank arm until its pin engages the other of the two positioning holes 1780. This movement of the crank arm will turn the pinion shaft 1771 and through its engagement with the primary frame rack 1768, will either move the town circle printing die to its printing position or will retract it into its non-printing position.

The town circle frame 1713 may be moved without requiring adjustment of the printing wheel frame 1714 with respect thereto. In other words, these two frames may be moved as a unit whether the date printing mechanism is in its printing or non-printing positions with respect to the town circle printing frame. In this way, if the town circle and date printing device are both in printing position, they may be simultaneously moved to their non-printing position through the town circle adjusting means 1716.

For third class mail, it is necessary to print along with the printing of the stamp the following notation, "Section 562 P. L. & R." and for this purpose, a die 1781 bearing the inscription "Section 562 P. L. and R." (Fig. 49) is mounted within the printing drum opening 1312 (Figure 46) directly in advance of the stamp printing assembly by means of pivot pin 1782. The die block 1781 is provided with a forwardly extending handle 1783 which passes through a suitable slot 1784 formed in the printing drum cap 1316 and is yieldingly urged downwardly as viewed in Figs. 47 and 48 by means of compression spring 1785 which spring is mounted within groove 1786 formed in the front face of cap 1360 and is an extension of slot 1784 and said spring acts between the upper end of the slot and the top surface of the die block handle 1783. The spring 1785 is retained in operative position by means of plate 1787, securely fastened to the front face of the printing drum cap by means of screws 1788. This plate not only confines spring 1785 but extends along the side of slot 1784 to act as a guide for the die block handle 1783 (Fig. 17). A latch bar 1789 slidably extends into the printing drum through slot 1784 and is supported at its forward end by an offset portion of plate 1787 and at its rear end by ledge 1790a formed in the side wall of the drum opening 1312 (Figs. 46 and 47) and is slidably retained on these suporting portions by spaced stop pins 1791 which cooperate with the upper edge of said latch bar. The latch bar is provided with lug 1792 cooperating with the stop pins 1791 to limit the in and out travel of said latch bar. A compression spring 1793 is provided for yieldingly urging said bar to its out position as shown in Fig. 47. The spring is mounted within a suitable bore formed adjacent the cap slot 1784 and acts between the inner end of said bore and a right angled portion 1790 of said latch bar. The innermost end of latch bar 1789 is provided with a supporting finger 1794 which cooperates with a corresponding finger 1795 formed on said die block 1781 to maintain the die block in its printing position. When it is desired to retract die block 1781, the operator need only to push the latch bar 1789 inwardly until its stop finger 1794 rides from under the finger 1795 of the die block, thereby removing the support of the die block whereupon its spring 1785 will act to swing said block from its printing position as shown in Fig. 47 to its non-printing position as shown in Fig. 48. The die block spring 1785 is of sufficient strength to maintain the die block in its non-printing position during the high speed rotation of the printing drum. When the die block is to be returned to its printing position, the operator need only lift the die block handle 1785 to swing the die into its printing position at which point the latch bar 1789 will, under the influence of its spring 1783, return into latching relation with said die block to positively maintain the die in its printing position. This device provides a simple and convenient means by which the P. L. & R. die block may be moved to or from its printing position.

As previously pointed out, an advertising slogan may be printed simultaneously with the printing of any one of the above referred to classes of mail matter. The advertising slogan may be printed just as readily upon mail matter or gummed tape. A stamp indicating such an advertising slogan printed upon a section of gummed tape is illustrated in Fig. 58. The means for printing the advertising slogan may include a die block 1796 (Figs. 46, 54, 55 and 56) to which an appropriately engraved slogan printing plate 1797 may be removably secured by means of screws 1798. In this way plates bearing different advertising slogans may be readily mounted upon block 1796. The die block 1796 is removably mounted in the printing drum by providing along the inner edge of said block two spaced ball headed pins 1799 engaging sockets 1800 suitably carried by the main portion of the printing drum and by providing the outer edge of said die block with two depending lugs 1801 and 1802. Lug 1801 is provided with a locating hole 1803 while lug 1802 is provided with a locating notch 1804 which notch engages the end of locating pin 1805 securely fastened in the cap portion 1316 of the printing drum, while the locating hole 1803 is engaged by the end of locating and locking pin 1806. This pin extends through a suitable hole drilled through the cap portion of the printing drum and said hole is counterbored to receive a compression spring 1807 acting between the end of the counterbore and head 1808 formed upon the inner end of said pin whereby the point of said pin is maintained in locking engagement with the lug hole 1803. The forward end of pin 1806 is provided with knob 1809 by means of which the pin may be withdrawn from engagement with the locating and locking hole 1803 whereupon the die block may be lifted from the printing drum.

To facilitate removal of die block 1796 from the printing drum a spring means is provided to raise the die block upon withdrawal of locking pin 1806 from engagement with the hole 1803 to enable the operator to take hold of the die block and remove same from the printing drum. As shown in Figs. 54, 55 and 56, the die block is provided with a pin 1810 positioned to extend downwardly into a spring bore 1811 drilled into the main portion of the printing drum. A compression spring 1812 is mounted within bore 1811 and is arranged to be compressed by pin 1810 when the die block is positioned on said drum and to swing the plate upwardly on its ball and socket connection 1799—1800 when the locking pin 1806 is actuated to release the plate in the manner previously described.

From the above description, it will be appreciated that all of the adjustments of the printing drum, namely the positioning of the town circle date printing dies, P. L. & R. die and advertising slogan die may be performed without the need of special tools excepting that in order to rotate the date wheels to set the proper date for printing, a simple stylus may be employed. Attention is also directed to the fact that the town circle, date printing wheel, P. L. & R. die and advertising slogan die block releasing or control means are all mounted upon the forward end of the printing drum, and therefore, it is desirable to provide the printing drum housing 980 with a door 1813 (Figs. 1 and 15) having a conventional spring latch to yieldingly maintain the door in its closed position and said door is provided with a knob 1814 by means of which it may be conveniently opened.

In the description of the envelope conveying system above-noted Patent No. 2,302,060 attention is directed to the idler roller 331 (Figure 47), carried by the printing drum. This idler roller is mounted in a suitable cavity 1815 formed mainly in the cap portion 1316 of the drum from which the periphery of the idler roller extends a sufficient distance to cooperate with the ejector roller carried by the platen shaft 326 (Figure 3) to assist in ejecting mail matter after the completion of the printing operation and also to effect ejection of mail matter passing through the machine when the machine is set to seal envelopes only, in which setting the printing drum will remain idle. The idler roller 331 (Figure 47) is journaled upon a tubular shaft 1816 which shaft at its forward end is securely fastened to the cap portion 1316 and at its opposite end extends into a suitable bore 1817 drilled in the main portion of the printing drum.

The printing drum 332 is preferably provided with a tape ejector shoe mechanism for the purpose of advancing the tape following the completion of a tape printing operation until the printed portion of the tape has passed through the tape cutting mechanism, thereby insuring the feeding of the correct length of tape prior to the automatic or manual cutting operation. The tape ejector shoe mechanism may include an arm 1818 nested in a suitable recess 1819 formed in the peripheral surface of the main portion of printing drum 332 (Figs. 46, 47 and 51) and is hinged thereto by means of hinge pin 1820 securely fastened to the drum by means of screws 1821. The free end of arm 1818 is provided with a raised pad 1822 which cooperates with the platen roller 327 to grip the tape therebetween for advancing the tape through the cutting mechanism as pointed out in the above-noted copending application, Serial No. 496,558.

It is desirable to provide means for retracting the raised pad 1822 during the time it passes the inking rollers and for this purpose the free end of arm 1818 is provided with a headed stub shaft 1823 which shaft extends from the side face of the arm a sufficient distance to accommodate a cam roller 1824 (Fig. 51). An arcuate cam rail 1825 is securely fastened to the front face of the meter front plate 1037 by means of screws 1826, as is clearly shown in Fig. 18. The cam rail is so positioned as to hold the tape ejector pad 1822 retracted within the circumference of the printing drum during the time that the pad is passing the ink feeding roller, as shown in the above mentioned figure. A compression spring 1827 acts between the drum and arm to yieldingly urge the arm outwardly into its tape contacting position. Spring 1827 extends into suitable retaining bores formed in these two members. A stop plate 1828 (Fig. 51) is riveted to the printing drum, in the manner shown in Fig. 19, and is provided with a finger portion 1829 for limiting the outward movement of cam roller 1824, and will thereby limit the outward swing of the free end of arm 1818 under the influence of its spring 1827.

The lower portion of the printing drum housing 980 is provided with an opening 1830 partially enclosed by an envelope guide plate 1831 which plate is securely fastened to the housing at opposite sides of its opening by means of rivets 1832 and the plate in turn is provided with a relatively narrow printing aperture 1833 (Figs. 16 and 17) through which aperture the printing surfaces of the drum will act during the rotation of the drum to print upon the matter under treatment.

A pair of leaf springs 1834 are fastened to the outer surface of plate 1831 adjacent the trailing edge of the printing aperture by means of rivets 1835 (Fig. 16). The two leaf springs extend across opposite sides of the printing aperture with their forward ends projecting into the leading edge of the orifice, in the manner clearly shown in Figs. 16 and 17. In between the two springs, the leading edge of the orifice is provided with a tongue 1836 feathered slightly inwardly to assist the two leaf springs in guiding paper clips or the like, contained within the envelopes, past this portion of the printing mechanism and protecting the operating parts of the machine and mail matter from damage or distortion.

The envelope guide plate 1831 is provided with an orifice 1837 through which the lower-most peripheral portion of the printing drum idler roller 331 may extend during such time as the printing drum is in its normal rest position.

As viewed in Fig. 17, the envelope guide plate 1831 is shaped to assist in guiding envelopes or other mail matter through the printing station and it also acts as a protecting shield or cover for the printing drum.

In the description of the envelope conveyor system 153 (Patent No. 2,302,060) it is pointed out that the meter printing drum housing is provided with an idler guide roller 335 (Figures 3 and 16). The guide roller 335 is journaled upon shaft 1840 and mounted upon the printing drum housing 980 which mounting may include providing the housing with two spaced bracket 1838 (Figs. 1, 3, and 16), the outboard ends of which are provided with arcuate recesses 1839 in which the shaft 1840 is securly fastened by means of screws 1841. The position of this roller with relation to the other parts of the envelope conveying system may be clearly observed in Fig. 3 and the roller acts to prevent envelopes from curling as they leave the holddown conveyor and assists in the proper presentation of the envelopes as they travel to and through the printing station.

RESET MECHANISM

Means are provided to enable authorized post office officials to obtain access to the hundreds and thousands of dollars register wheels of the subtractive register for entering into these two register wheels an amount of postage purchased by the user of the machine.

The resetting mechanism includes the slide frame 1296 previously referred to during the description of the subtractive register transfer mechanism. This slide frame 1296 is generally rectangular in form and at one edge slidably extends through a guide groove 1842 formed in bracket 1239 (Fig. 39), while the opposite edge of said frame is guided between lug 1843 and guide pin 1293. The guide lug 1843 is preferably formed as an integral part of the meter frame end plate 1084 and is positioned to the left of slide frame 1296, as shown in Fig. 26, while the guide pin 1293 extends inwardly from the meter end plate 1084 and is positioned to engage the right hand side of the slide frame, as shown in this figure. The upper end of slide frame 1296 is provided with a right angled portion 1844 to which a rectangular closure block 1845 is secured by means of screws 1846. The rectangular block 1845 is arranged to fit snugly into the reset opening 1847 formed in meter housing 1508 when the reset mechanism is in its locked position, as shown in Figs. 26, 31 and 36.

Means are provided for locking the reset mechanism to prevent unauthorized reseting of the meter. This locking means may include a key operated tumbler lock 1848 having a flanged barrel portion 1849 extending through a suitable bore 1850 drilled through the side face of the meter frame plate 1089 and securely fastened within said bore by means of lock nut 1851 screw threaded upon the barrel portion of said lock to clamp the side plate of the meter between the flange of said barrel and said lock nut. A pin 1852 extends radially from the lock barrel adjacent its flange and engages a keyway 1853 to prevent rotation of the lock barrel. A core 1854 is operatively mounted within the lock barrel in the usual manner and is provided with a suitable key slot 1855. Secured to the inner end of the core is a stop plate 1856 having two spaced stop shoulders 1857 and 1858 which cooperate with stop pin 1859 to permit rotation of said core between its locked and unlocked positions. The stop plate is provided with a locking pin 1860 adapted to engage lug 1861 formed in the lower end of slide frame 1296, as shown in Figs. 26 and 31, to lock the slide frame in its closed position.

Means are provided for yieldingly urging the slide frame to move from its closed to its opened position and these means may include providing the frame with an angular bracket 1862 having a guide bore 1863 for slidably engaging guide rod 1864, the lower end of which guide rod is securely fastened in lug 1865 by means of taper pin 1866. As may be observed in the drawings, lug 1865 is preferably formed as an integral part of the meter frame side plate 1089. A compression spring 1867 is mounted upon the guide rod and interposed between said lug and frame bracket 1862.

The reset lock 1848 is protected against tampering by mounting this lock upon the meter frame side plate 1089 within the meter housing 1508 and by providing a key hole 1867 through said housing in line with the key slot of the lock and by providing a shield 1868 for covering the key hole. The shield is pivotally fastened to the meter housing 1508 by means of rivet 1869 and is provided at its opposite end with an upturned lug 1870. The housing is provided with a post 1871 positioned so that when the shield is in the closed position, the lug 1870 will lie adjacent thereto. The post and lug are provided with aligned bores to receive the sealing wire 1872 the ends of which wire may be united by a lead seal 1874 placed thereon by an authorized post office official.

When the meter is taken to the post office for resetting the authorized post office official may break the seal just referred to thereby releasing said shield to permit its opening for access to the resetting lock 1848 and by means of a suitable key 1875 the post office official may actuate the lock to swing its locking pin 1860 clear of the slide frame locking lug 1861 in the manner shown in Figs. 32, 33 and 34.

As soon as the locking pin 1860 disengages the frame locking lug 1861, spring 1867 will lift the slide frame to its raised position thereby opening the reset aperture 1847.

The initial portion of the upward movement of slide frame 1296 swings detent mechanism 1876 from its retracted position as shown in Fig. 31 to its active position as shown in Fig. 32. This detent mechanism 1876 may include a detent pawl 1877 for the hundreds of dollars register wheel transfer gear 1155 and a detent pawl 1878 (Figs. 35 and 39) for the thousands of dollars transfer gear 1161. These two detent pawls are preferably formed as extending arm portions of torsion springs 1879 and 1880 and are provided at their free ends with suitable curved end portions 1881 and 1882 for engaging the space between two adjacent teeth of their respective transfer gears when said pawls are swung into their active position. The torsion springs are mounted upon a spring shaft 1883 carried by the free ends of spaced bracket members 1884 which bracket members may be securely fastened to cross shaft 1588 by means of taper pins 1885. The cross shaft 1588 was described in connection with the description of the zero locking mechanism. The opposite ends 1886 and 1887 of torsion springs 1879 and 1880 maintain said torsion springs in a preloaded tension by engagement with cross shaft 1588.

A detent actuating member 1888 is journaled upon spring shaft 1883 in the manner shown in Figs. 31, 32, 33, 35, 36, 38 and 39 and is provided with a forwardly extending control arm 1889 formed as shown in the above mentioned figures and having guide slots 1890 and 1891 to maintain the pawls 1877 and 1878 in operative alignment with their respective transfer gears and also to engage and retract the pawls when the slide frame 1296 is in its closed position. For this purpose, the control arm is flanged to provide a downwardly extending hooked portion 1892, which projects through a control slot 1893 formed in said plate adjacent one side thereof. The control slot is of such length as to bring the upper end thereof into engagement with the hooked portion 1892 of control member 1888 to swing said control member upon its supporting shaft to its retracted position, as shown in Fig. 31, when the slide frame 1296 is in its closed position and through the engagement of said control member with pawls 1877 and 1878 will retract these pawls from their respective transfer gears in the manner shown in this figure.

During the initial upward movement of slide frame 1296, the control member 1888 will rotate in a counter-clockwise direction as viewed in Fig. 32 until the pawls 1877 and 1878 engage their respective transfer gears in the manner shown in this figure. During the further upward movement of slide frame 1296 the hooked end portion 1892 of said control member will ride freely in the control slot 1893.

As shown in Fig. 32, upon actuation of the detent mechanism to its active position, the curved end portions 1881 and 1882 of the two pawls will engage the tooth space of their respective gears and through this engagement will yieldingly maintain the hundreds and thousands of dollars register wheels in correct register and yet will permit these wheels to be easily rotated by the post office official when entering an additional amount of postage therein.

In order to obtain free rotation of the register wheels, it is necessary to disengage the transfer pinions 1284 from their respective transfer gears. Prior to the disengagement of the transfer pinions, it is desirable to lock the transfer pinions in correct register to insure the proper meshing of these pinions when returned to engagement with their respective transfer gears.

For this purpose a transfer pinion locking mechanism 1894 is provided and is released into transfer pinion locking engagement during the upward movement of slide frame 1296 shortly after the detent mechanism 1876 is swung into its operative position and before the transfer pinions are disengaged from their respective transfer gears. The transfer pinion locking mechanism may include a locking pawl 1895 which may include a pair of spaced right angled lugs 1896 and 1897 which lugs are provided with suitable holes to pivotally mount the pawl upon pivot pin 1291 which in turn is securely fastened in the upper ends of spaced arms 1286 of the swing frame 1287, as has been previously pointed out during the description of the subtractive register transfer mechanism.

The locking pawl lug 1897 includes an operating arm having a finger portion 1898 extending through an upper control slot 1899 formed adjacent the side of slide plate 1296 preferably in line with the control slot 1893 and is arranged to be engaged by the upper end of control slot 1894 when the slide frame is in its closed position to maintain the pawl in retracted position as shown in Figs. 31 and 32 whereby its two spaced depending locking lugs 1900 will be maintained clear of their respective transfer pinions 1284. A tension spring 1901 is mounted upon pivot pin 1291 having one end extending through a suitable opening formed in the pawl and hooked to engage the outer surface of said pawl as at 1902. The opposite end of said spring extends downwardly and engages an annular groove formed in a loose collar 1903 carried by transfer pinion shaft 1285. The tension spring 1901 acts to yieldingly urge rotation of pawl 1895 in a clockwise direction as viewed in Figs. 31, 32 and 33.

The upward movement of slide frame 1296 through its engagement with finger 1898 will permit the pawl to rotate in a clockwise direction as viewed in the above referred to figures and will release the pawl into locking engagement with the transfer pinions to lock these pinions in correct register prior to the release of said pinions from their respective transfer gears. In Fig. 32 the pawl is shown as it would appear at the time the detent mechanism 1876 has been moved into its operative position and shortly following this movement, the detent pawl will lock the transfer pinions.

After the transfer pinions have been locked in the manner above described, further upward movement of slide frame 1296 will lift its cam block 1295 clear of cam roller 1294 carried by link 1290 whereupon the compression spring 1300 will move the link to the right from its position, as shown in Figs. 31 and 32, to its position, as shown in Fig. 33, wherein the cam roller 1294 has lifted the cam block and now engages the face of slide frame 1296. The movement of link to the right as above pointed out operates to swing the transfer pinion frame 1287 to disengage the transfer pinions from their respective transfer gears as shown in Fig. 33.

The resetting mechanism has now operated to lift the detent mechanism into engagement with the transfer gears, has locked the transfer pinions and removed the transfer pinions from engagement with their respective transfer gears. However, to facilitate adjustment of the two register wheels, it is necessary to relieve the tension of the locking spring 1603 in order to release the pressure of the control wheels 1583 and 1584 from their respective control discs 1158 and 1163, and if the subtractive register portion of the locking system has actuated to lock the machine, this portion of the locking system will be returned from its locked to its unlocked position simultaneously with the releasing of the pressure of the control wheels with respect to their control discs.

The resetting mechanism is provided with means for returning the subtractive register locking mechanism from its locked to its unlocked condition in those cases in which the subtractive register has locked the machine prior to the resetting operation and for this purpose the slide frame 1296 is provided with a right angled lug 1904 for engaging pin 1905 carried by the free end of head 1906 fastened to the upper end of gear rack 1601 by means of taper pin 1907. If the subtractive register locking mechanism has actuated to lock the machine prior to the resetting operation, the gear rack 1601 will be lifted from its lower-most or locking position, as shown in Fig. 38, to its elevated or unlocking position, as shown in Figs. 34 and 36, by a lifting engagement of the sliding frame lug 1904 with pin 1905 during the upward movement of said frame. The hundreds and thousands of dollars register wheels may now be turned to indicate the amount of postage purchased. The post office official setting the register may turn these two register wheels by means of any suitable form of stylus which may be operated through the reset opening 1847.

The subtractive and additive registers are provided with shield plates 1908 and 1908A each having a series of openings 1909 through which the figures of the numeral wheels may be read as is clearly shown in Fig. 21. These plates are fastened to the intermediate and end walls 1884 and 1888 of the register frame, in the manner shown in the above mentioned figure. Each plate is provided with line 1910 to indicate the cents register wheels from the dollar register wheels.

In setting the register the post office official will turn either or both of the hundreds and thousands of dollars register wheels until the amount of postage purchased may be read through the openings 1909.

The range of amounts which may be entered in the register extends from $100.00 to $9,900.00 in units of $100.00 each. The balance contained in the subtractive register when taken to the post office for resetting will remain therein when the amount of additional postage purchased is entered in the subtractive register so that the total amount readable in the register, after the setting operation has been completed, will equal the balance left in said register plus the amount purchased.

It is not necessary to wait until the subtractive register has locked the meter before taking the meter to the post office for resetting as the meter may be reset at any time prior to the locking thereof.

In order to enable the reading of the two registers, the meter housing 1508 is provided with a subtractive register window 1911 and an additive register window 1912 (Figs. 1 and 25), each of which windows include a glass plate 1913 securely fastened to the housing by suitable clip means 1914.

After the amount of postage has been entered in the subtractive register, the resetting mechanism may be closed and locked to return the hundreds and thousands of dollars register wheels to their normal operative conditions. The return of the resetting mechanism is accomplished by returning the sliding frame 1296 to its closed position and locking said frame in such position by means of the key lock 1848 thereby returning the locking pin 1860 in locking engagement with the slide frame lug 1861.

In returning the slide frame to its closed position the post office official need only press downwardly upon the slide frame block 1845 until this block returns into closing engagement with the reset opening 1847 and while holding the slide frame in its closed position, may actuate the lock in the manner described to complete the locking of this mechanism. After the resetting mechanism has been closed and locked, the key 1875 may be withdrawn from the lock and the key hole covered by returning the shield 1868 to its closed position whereupon the sealing wire 1873 may be threaded through the holes formed in the shield and adjacent post and finally securing the two ends of the wire by means of an official post office seal 1874. The meter is now ready to be returned to the user and for mounting upon the power plant portion of the machine and to be used until an additional amount of postage is to be purchased and entered in the subtractive register in the manner previously described.

Means are provided for preventing operation of the power plant meter driving mechanism during such time as the meter is being mounted upon the power plant or removed therefrom in order to prevent possible injury to either the power plant, meter, or both, and for this purpose the meter positioning and locking lever 997 is provided with an arm 1915 having an upturned finger portion 1916, the upper end of which is inclined to provide a cam surface 1917 (Fig. 5). The cam surface 1917 is arranged to cooperate with a similarly inclined cam surface 1918 formed upon the forward end of lever 1564 to lift the forward end of said lever in the manner shown in Fig. 5 when the meter positioning and locking lever 997 is moved to its meter releasing position, as shown in this figure and also in Fig. 13. The lifting of the forward end of lever 1564 will effect rotation of said lever in a clockwise direction, as viewed in Figs. 6 and 37, to render the clutch tripping mechanism 591 inoperative.

Rotation of the meter positioning and locking lever 997 operates to position and lock the meter in correct operating alignment with the power plant and upon completion of this operation, the inclined cam surface 1917 carried by said lever will move to permit rotation of lever 1564 in a clockwise direction, as viewed in Figs. 6 and 35, thereby returning the clutch operating mechanism 591 to an operative condition, in the manner previously described.

In the description of the envelope conveyor system the final sealing and ejecting device 310 (Figure 3) is described, and it is pointed out during this description the manner in which the bracket 354 of the device, which bracket carries the creasing and the pressure rollers 346 and 347 (Figure 1), is latched in its operative position and the manner in which the bracket is automatically unlatched during the lifting of the tape feeding mechanism into printing position to permit said bracket to swing from its operative to its inoperative position. The bracket 354 of the final sealing and ejecting device should be in its operative position (Fig. 1) when printing stamps on envelopes and/or sealing of said envelopes.

Figure 4:
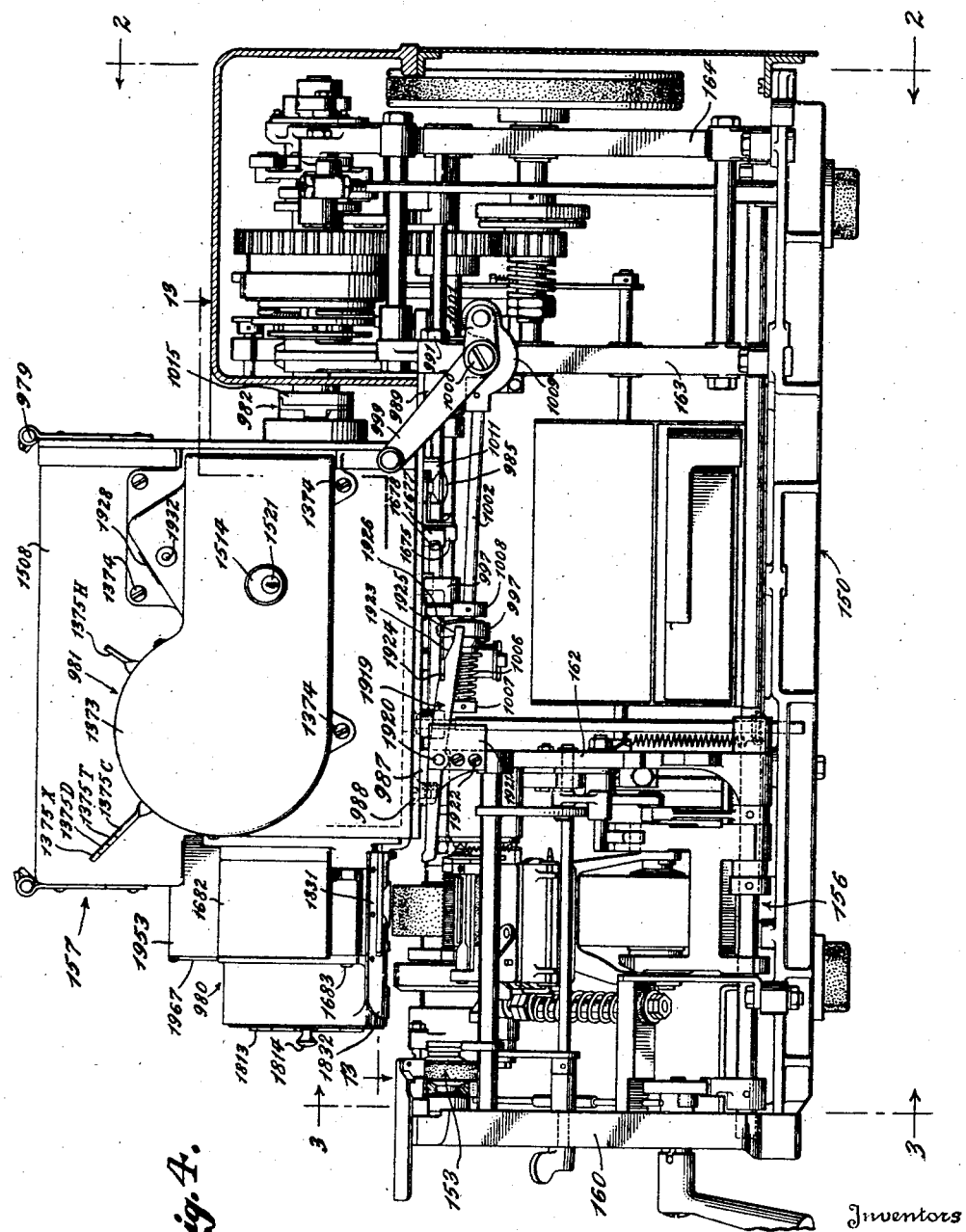
Figure 4 is a sectional view taken substantially in the plane of line 4—4 in Fig. 3 to show the right hand end of the machine from which the end cover plate has been removed.

The meter positioning and locking mechanism is provided with means for automatically unlatching bracket 354 to permit said bracket to swing from its operative to its inoperative position when releasing the meter for removal from the power plant. This means may include a trip lever 1919 (Figs. 4, 13 and 14) pivotally mounted intermediate its ends by means of pin 1920 to bracket 1921 secured to the meter supporting frame 162 by means of screws 1922 and having at its rear end an inclined cam surface 1923 intermediate two stop surfaces 1924 and 1925 for cooperating with cam plate 1926 which cam plate is secured to the positioning and locking lever 997 by means of screws 1927 (Figs. 4 and 14). As shown in Fig. 4 the trip lever stop surface 1925 will engage the positioning lever cam plate 1926 when the meter is locked in its operative position. With the trip lever so positioned, the forward end of said lever will directly underlie the latch member of the sealing and ejecting device 310, as is shown and described in said Patent No. 2,302,060 when the bracket 354 is in its operative position.

Rearward movement of crank handle 999 to unlock the meter from the power plant through the mechanism previously described will rotate lever 997 in a clockwise direction as viewed in Fig. 14 whereupon its cam plate 1926 will engage the inclined cam surface 1923 of the trip lever causing said lever to rotate in a clockwise direction as viewed in Fig. 4. This movement will lift the forward end of trip lever 1919 and as a result will lift the bracket latch 336 thereby releasing the bracket for movement to its retracted position. When the crank handle 999 has been moved to its rear-most position to unlock the meter for removal, the locking lever 997 will carry its cam plate 1926 into engagement with the trip lever stop surface 1924 and will thereby maintain the trip lever in its tripping position to prevent relatching of the sealing and ejecting bracket 354 in its operative position. This mechanism automatically removes the bracket 354 of the final sealing and ejecting mechanism out of the way to prevent possible damage to said mechanism, while removing or mounting the meter on the power plant.

PIECE COUNTER 1928

*(Figs. 1, 15, 20 and 26)*

The meter is provided with a standard form of piece counter 1928 for counting the number of pieces of mail matter passed through the machine. The counter is of standard commercial form bought on the open market and as it does not form a part of this invention, will not be described in detail.

The counter is fastened to bracket member 1526 by means of screws 1929 and the bracket in turn is fastened to selector housing 1373 by means of screws 1527. The counter is generally rectangular in form and its upper end is provided with a window 1930 through which the dials of the register may be read. This end of the register extends through a suitable opening 1931 formed in said housing, as is clearly shown in Figs. 15 and 26. The register is provided with a resetting knob 1932 by means of which the counter may be set to zero before each run of mail matter.

The piece counter is operated once for each operating cycle of the machine and for this purpose the idler gear 1049 is provided with a crank pin 1933 arranged to operatively engage slot 1934 formed in the free end of crank arm 1935, the opposite end of which crank arm is provided with a hub 1936 pivotally mounted upon stub shaft 1937 extending inwardly from the meter end plate 1026 and is retained in operative position thereon between collar 1938 and washer 1939 by means of cotter pin 1940. An actuating finger 1941 is screw threaded into hub 1936 and locked thereto by means of lock nut 1942 (Figs. 20 and 26). The free end of actuating finger 1941 overlies the free end of the counter actuating lever 1943, as shown in Fig. 26, whereby during the operating cycle of the machine the actuating finger 1941 will be swung in a clockwise direction, as viewed in the above mentioned figure, until it engages and actuates the counter lever 1943 and returns to its rest position at the end of the operating cycle, as shown in this figure. It will be understood that the actuation of finger 1941 is brought about by the pin and slot connection formed between idler gear 1049 and crank arm 1935. The counter actuating lever 1943 is securely fastened to the inner end of the counter actuating shaft 1944 by means of screw 1945. The counter contains spring means for returning its actuating lever to its rest position upon the completion of each operation thereof.

Through the arrangement of the mechanism just described, the counter may be set to zero before each run of mail matter to be counted and for each operating cycle of the machine, the counter will actuate once and at the end of the run of mail matter, and total number of pieces treated can be read from the counter and thereafter the counter reset to zero for a succeeding run, thus providing a simple and effective means for counting the number of pieces or impressions printed by the machine during any selected period of operation. It will be understood that the counter will count the number of stamps printed upon gummed tape as well as the number of stamps printed upon envelopes or other mail matter.

INK FEEDING DEVICE 158

(Figures 17 and 18)

The ink feeding device of this invention may be divided into two portions, namely, the portion containing the ink distributing and type inking roller assembly carried by the meter 157 and the second portion which includes the ink supply roller and operating mechanism therefor.

The first portion of the ink feeding device may include an inking roller 1946 removably mounted upon spindle 1947 carried by lever arm 1948. The inking roller is operatively maintained upon spindle 1947 by retaining blade 1949 which blade adjacent its upper end is pivotally connected to the free end of spindle 1947 by pin 1950. The blade is arranged to be swung in axial alignment with said spindle and is of slightly less width than the diameter of said spindle so that the inking roller may be readily removed from the machine or replaced thereon. The peripheral portion of the inking roller 1946 is provided with a felt band 1951 for inking the type faces of the printing drum during each cycle of operation.

This inking roller is maintained in spaced relation with respect to all portions of the drum excepting the type faces thereof by providing a stop screw 1952 screw threaded into the side wall of the ink roller housing 1953 which housing may be formed as an integral portion of the meter housing 1508, as is clearly shown in the drawings. The free end of lever 1948 is provided with a stop pad 1954 for engaging the inner end of stop screw 1952 thereby adjustably positioning the inking roller with relation to the peripheral surface of the printing drum and as above pointed out is preferably positioned to maintain the roller so that it will be engaged by the printing surfaces of the drum and yet will be maintained clear of the remaining portions thereof.

In order to lock the stop screw 1952 in its adjusted position, a locking screw 1955 (Fig. 17) is screw threaded in the front face of said housing to thrust a suitable soft metal disc (not shown) against the threads of said stop screw to thereby lock said stop screw in its adjusted position.

A tension spring 1956 is provided to yieldingly maintain the inking roller in its adjusted position and to permit the roller to retract slightly during the engagement of the printing type therewith. The tension spring may be interposed between suitable pins carried by crank arm 1948 and the ink roll housing 1953, as is clearly shown in Fig. 18.

The lower end of crank arm 1948 is pivotally mounted upon stub shaft 1957 extending outwardly from the meter housing 1508 and said arm is maintained in longitudinal alignment thereon by providing the stub shaft with an annular groove 1958 and the hub portion of said arm with a screw 1959 having a pointed end for engaging the stub shaft groove, in the manner shown in Fig. 18.

A felt covered distributing roller 1960 yieldingly engages the felt surface of the ink feeding roller 1946 to transmit a supply of ink thereto which it receives from an ink supply roller carried by the power plant portion of the machine, later to be described. The distributing roller 1960 not only supplies the inking roller with ink, but also acts to evenly distribute the ink around the entire felt inking band 1951 of said roller.

The ink supply and distributing roller 1960 is journaled upon spindle 1961 of substantially the same type of construction as employed for supporting the ink feeding roller and said spindle is carried by the free end of lever 1962. The opposite end of lever 1962 is pivotally mounted upon stub shaft 1963 extending from the side face of lever arm 1948 and the lever is maintained in longitudinal alignment with said stub shaft by providing said stub shaft with an annular groove 1964 and the hub portion of said lever with screw 1965 having a pointed end for engaging said annular groove. As is clearly shown in Figs. 17 and 18, the left hand side wall of the ink roll housing is provided with an opening 1966 through which the periphery of the ink feeding and distributing roller 1960 projects in order that it may be contacted by means for supplying ink thereto.

The forward end of the ink roller housing 1953 is preferably provided with a door 1967 hinged thereto in a conventional manner and is provided with a knob 1968 for opening and closing said door. The door is preferably provided with any standard or conventional form of spring latch (not shown) by means of which the door will be yieldingly maintained in its closed position.

The second portion of the ink feeding device 158 is carried by the power plant and includes an ink well and feeding mechanism 1969 which is removably mounted upon the front face of the intermediate frame plate 161, as is clearly shown in Figs. 1, 2, 3, 5, 7-9 and 17. The ink well includes a frame 1970 generally in the form of an open box like receptacle provided with two spaced mounting lugs 1971 and 1972 which are preferably formed integral with said frame. The mounting lugs are provided with aligned horizontally extending supporting pins 1973 and 1974 (Figs. 2, 7-9) which pins are arranged to enter suitable bores formed in standards 1975 and 1976 preferably formed as an integral part of bracket 1977 securely fastened to the top edge of the intermediate frame plate 161 by means of screws 1978.

The ink receptacle frame 1970 is provided along its lower edge with a guide flange 1979 which flange is arranged to cooperate with the front face of frame plate 161 to maintain the receptacle in correct operative alignment.

The ink well and feeding mechanism 1969 is mounted upon the power plant in the manner above described to permit a limited amount of movement to advance or retract the ink supply drum 1980 thereof into or from feeding engagement with the ink distributing roller 1960. For this purpose the positioning pin 1974 is provided with a series of ratchet teeth 1981 and the standard 1976 is bored to receive ratchet plunger 1982 (Fig. 7) yieldingly maintained in engagement with the ratchet teeth 1981 by compression spring 1983 interposed between the head of said plunger and the bottom of a suitable counterbore formed in said standard. The upper end of said plunger is provided with a knob 1984 by means of which the ratchet plunger 1982 may be disengaged from the ratchet teeth 1981.

The ratchet plunger may be maintained in alignment with ratchet teeth 1981 by providing the upper end of standard 1976 with a transverse slot 1985 into which a suitable tongue portion 1986 carried by the plunger knob 1984 may extend. Tongue portion 1986 of knob 1984 may be used to maintain the ratchet plunger in its disengaged position by lifting said plunger until the tongue clears its slot and then turning the knob until the tongue engages the upper surface of said standard.

Mounted within the ink well frame 1970 is means for metering the supply of ink to the ink distributing roller 1960 which means may include the ink supply drum 1980 and means for actuating said drum to feed a predetermined amount of ink from a well formed within said frame to the ink distributing roller 1960 during each operating cycle of the machine.

Figure 12:
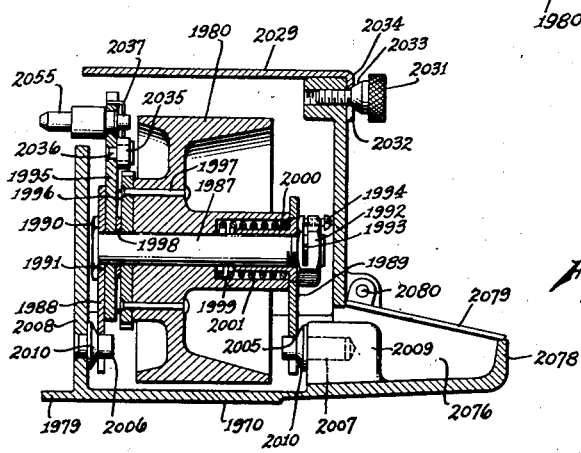
Figure 12 is a sectional view taken substantially in the plane of line 12—12 of Fig. 10.

The ink supply drum 1980 is journaled upon shaft 1987 (Fig. 12) between the side plates 1988 and 1989. The shaft extends through and is supported by the two said side plates and is maintained in longitudinal alignment by providing the inner end of said shaft with a head 1990 for engaging the outer surface of said plate 1988 and keyed against rotation by providing the head with pin 1991 extending into a suitable opening formed in said side plate, as shown in Fig. 12. The opposite end of shaft 198. is threaded to receive an adjusting nut 1992 which adjusting nut is slotted as at 1993 and provided with a locking screw 1994 for locking the nut in its adjusted position. The adjusting nut engages the outer face of side plate 1989 and acts to prevent displacement of shaft 1987.

An actuating lever 1995 is journaled upon shaft 1987 directly adjacent and in frictional engagement with the inner face of side plate 1988. A ratchet wheel 1996 is securely fastened to the hub portion of drum 1980 by rivets 1997. A thrust washer 1998 is interposed between the adjacent side faces of the actuating lever and ratchet wheel. The means for yieldingly thrusting the actuating lever into frictional engagement with side plate 1988 may include providing the hub portion of said drum with a suitable counterbore 1999 and the shaft 1987 with a flanged bushing 2000 and interposing between the flange of said bushing and the bottom of said counterbore, a compression spring 2001, as shown in Fig. 12.

Figure 10:
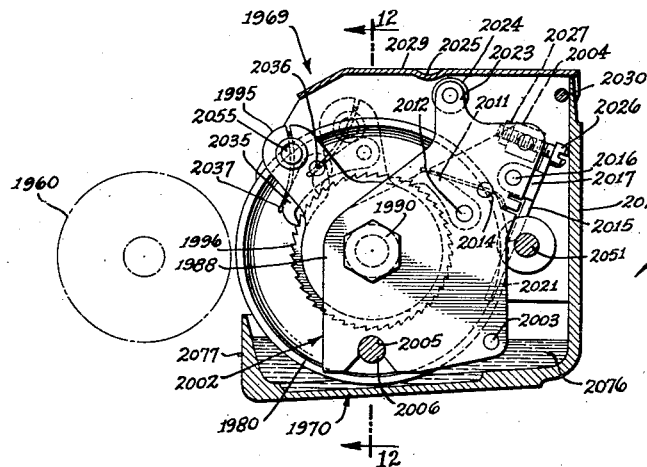
Figures 10 and 11 are enlarged sectional views taken substantially in the plane of line 10—10 of Fig. 5 and these figures show the ink feeding roller in two different positions during its operation.
Figure 11:
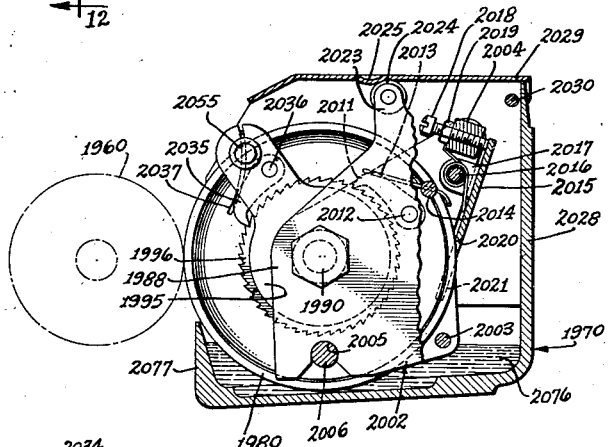

The two side frames 1988 and 1989 form what may be called a rocker frame 2002. The two rocker frame side plates 1988 and 1999 are interconnected at their lower right hand end, as shown in Figs. 10 and 11, by a suitable tie bar 2003 and at their upper right hand end by a spacer block 2004. A semi-circular notch 2005 is provided in each of the rocker frame side plates 1988 and 1989 adjacent their lower left hand end portions which notches respectively engage pivot pins 2006 and 2007. The pivot pin 2006 extends inwardly from and is fastened to the side wall 2008 of said ink well frame 1970 while the pivot pin 2007 is carried by lug 2009 preferably formed as an integral portion of frame 1970, as shown in Fig. 12. Each of the pivot pins are provided with an inwardly tapered flange 2010 for centralizing the rocker frame therebetween.

A pawl 2011 is pivotally mounted upon the inner face of rocker frame side plate 1988 by pin 2012 and is maintained in operative engagement with the teeth of ratchet wheel 1996 by a suitable spring 2013 acting between the free end of said pawl and a spring supporting post 2014, while the rear end of said spring is projected through a suitable opening formed in side plate 1988, as shown in Fig. 10.

The rocker frame 2002 is provided with means for uniformly removing all excess ink from the transferring surface of the ink supply drum 1980. This means may include a scraper blade 2015. The blade is pivotally mounted upon cross shaft 2016 by means of lugs 2017, while said cross shaft is carried by the rocker frame side plates. As may be observed in Fig. 11, the cross shaft 2016 is positioned directly below spacer block 2004 and the blade is adjusted to its operative position by means of screw 2018 screw threaded through the spacer block 2004 and locked in its adjusted position by means of lock nut 2019. By means of adjusting screw 2018 the feather edge 2020 of the blade may be accurately positioned with respect to the periphery of the ink supply drum 1980 to regulate the amount of ink adhering to the periphery of said drum and thereby controlling the amount of ink which will be transferred to the distributing roller 1960. The scraper blade 2015 is provided with depending arms 2021 for scraping the surplus ink from the side edges of said drum.

A torsion spring 2022 is carried by cross shaft 2016 and acts between the scraper blade 2015 and spacer block 2004 to yieldingly maintain the blade in engagement with its adjusting screw 2018.

The rocker frame 2002 is swung from its retracted position, as shown in Fig. 10, to its ink delivering position, as shown in Fig. 11, during each operating cycle of the machine to present the peripheral portion of the ink supply drum 1980 to the ink distributing roller 1960. The swing of rocker frame to bring the ink feeding drum into engagement with the distributing roller 1960 is limited by providing the upper end of rocker frame side plate 1988 with an upwardly extending arm 2023 and pivotally securing to the upper end of said arm a stop roller 2024 which roller will engage a stop projection 2025 when the frame has moved to its operative position, as shown in Fig. 11. The rearward swing of rocker frame 2002 is limited by means of stop screw 2026 which screw is screw threaded through the spacer block 2004, in the manner shown in Fig. 10, and is provided with a lock nut 2027 for retaining said screw in its adjusted position and the head of said screw will engage the end wall 2028 of frame 1970 when the rocker frame has been swung to its retracted position, as shown in the above mentioned figure.

The stop projection 2025 is formed in the ink well frame cover 2029 which cover is hinged to the upper end of the ink well by means of hinge pin 2030. The cover is normally locked in its closed position by means of thumb screw 2031 engaging slot 2032 having formed at its inner end a conical seat for receiving the tapered portion 2033 of said thumb screw. Slot 2032 is formed in the flanged portion 2034 of the ink well cover 2029.

The means for simultaneously rocking the rocker frame 2002 and rotating the ink supply drum 1980 may include providing the actuating lever 1995 with a driving pawl 2035 which pawl is pivotally mounted upon said lever by means of pivot pin 2036 and the free end of said pawl is yieldingly maintained in driving engagement with the teeth of ratchet wheel 1996 by means of spring 2037 which spring acts between the free end of said pawl and the actuating lever. The free end of lever 1995 is connected to the driving mechanism of the machine through suitable means for imparting an oscillatory movement to said actuating lever for each operating cycle of the machine. The oscillating mechanism 2038 includes cam 2039 mounted upon hub 561 of the driven portion of the meter driving clutch 526 and is secured to the flange portion of said hub by means of pins 614 (Fig. 7). The actuating cam 2039 is adapted to engage cam roller 2040 mounted upon one end of connecting link 2041. The connecting link comprises two side plates spaced apart by spacer block 2042 and are securely fastened together by means of rivets 2043. The cam roller 2040 is interposed between the two side plates and is supported therebetween by means of bearing pin 2044. The opposite end of link 2041 is pivotally connected to lever 2045 by means of pivot pin 2046. The intermediate portion of link 2041 is slidably supported between axle 528 and stud pin 2047 and maintained in operative alignment by annular guide grooves 2048 and 2049 formed in said axle and pin respectively.

The link is yieldingly urged to move to the left, as shown in Figs. 7, 8 and 9, by means of tension spring 2050 interposed between the free end of lever 2045 and stub pin 2049. The lever 2045 is securely fastened to rocker shaft 2051 by means of taper pin 2052. The rocker shaft 2051 is journaled in frame plates 163 and 161 (Fig. 5). The forward end of rocker shaft 2051 extends through front plate 161 and has securely mounted thereon an actuating lever 2053. The upper end of said lever is provided with a bayonet slot 2054 for operatively engaging driving pin 2055 which driving pin extends from the side face of the ink supply drum actuating lever 1995, as shown in Figs. 7-9 inclusive. The enlarged inner portion 2056 of bayonet slot 2054 facilitates making the driving connection between levers 2053 and 1995, while mounting the ink well upon the intermediate plate 161 of the power plant.

Means are provided for controlling the amplitude of the oscillatory movement of the rocker shaft and to thereby control the amount of ink fed during each operating cycle of the machine which means may include securely fastening to the rocker shaft adjacent the rear face of the intermediate frame wall 161 a lever arm 2057 and pivotally connecting to the free end thereof, by pivot pin 2058, a control link 2059. The opposite end of control link 2059 is provided with a slot 2060 slidably engaging a headed pin 2061 carried by stop segment 2062 which segment, as shown in Fig. 5, is keyed to the inner end of shaft 2063 which shaft extends through and is journaled in the intermediate frame plate 161. On the forward end of shaft 2063 a control handle 2064 is securely fastened by means of taper pin 2065. As may be observed in Figs. 7-9, the stop quadrant 2062 is provided with a series of detent notches 2066 which are adapted to be engaged by a detent ball 2067 yieldingly urged against said quadrant by means of compression spring 2068. The detent ball and its compression spring are mounted within a suitable bore 2069 formed in bracket 2070 which bracket is securely fastened to the rear face of plate 161 by means of screws 2071. A screw plug 2072 is screw threaded into the lower end of bracket bore 2069 to adjustably maintain said spring within said bore. Each end of the stop quadrant is provided with a stop shoulder 2073 and 2074 for engaging the bracket 2070 when the quadrant is swung to either one of its extreme positions of adjustment.

By means of control handle 2064 the operator may rotate quadrant 2062 in a counter-clockwise direction, as viewed in Fig. 8, until its stop shoulder 2073 engages the side face of bracket 2070. During this counter-clockwise rotation the headed pin will engage the end of link slot 2060 and will thereby, through lever 2057, rotate the rocker shaft 2051 in a counter-clockwise direction pulling the cam roller 2040 away from the actuating cam a sufficient distance to prevent actuation of the inking mechanism by said cam. The control lever will be positioned in this manner when it is desired to discontinue the supply of ink during the operation of the machine. The extent of rotation of the ink feeding drum 1980 may be progressively controlled by swinging handle 2064 to progressively bring the detent notches of quadrant 2062 into engagement with the detent ball 2067. As the control handle 2064 is swung in a clockwise direction the cam roller will be moved closer to the low portion of actuating cam 2039 and as a result a greater oscillatory movement will be given to the ink feed actuating mechanism thereby delivering a greater amount of ink to the distributing roller during each operating cycle of the machine. When control handle 2064 is rotated in a clockwise direction until its stop shoulder 2074 engages the side face of bracket 2070 the cam roller 2040 will be permitted to engage the low portion of cam 2039 resulting in the ink feeding roller 1980 receiving its maximum rotation for each operating cycle of the machine.

In Figs. 7, 8 and 9, the control handle 2064 is set to supply a sufficient amount of ink to the distributing and inking rolls for an average run of mail matter. In Fig. 7 the parts are shown as they would appear when the machine is in its normal rest position in which position the type surfaces of the printing drum, generally indicated by the reference number of 2075, are about to engage the ink feeding roller 1946. In this figure the cam roller 2040 is shown engaging the intermediate lift portion of the cam 2039 and attention is directed to the clearance between the ink supply drum 1980 and the ink distributing roller 1960. During the initial portion of the operating cycle of the machine the printing type surface 2075 will turn under the inking roller 1946 to receive therefrom ink for printing an impression upon a piece of mail matter passing through the machine.

In Fig. 8, the printing drum 332 has rotated until its printing type surface 2075 is about to leave the ink feeding roller 1946. This figure also shows the manner in which the cam roller 2040 will be prevented from following down the cam surface to its lower-most position due to the setting of the control mechanism 2004. However, during the rotation of the actuating cam 2039 from its position, as shown in Fig. 7, to that of Fig. 8, the cam roller will follow down the inclined surface of the cam until the end of control slot 2060 engages the headed pin 2061, in the manner previously described. This movement of the cam roller toward the axis of shaft 522 permits the connecting link to move under the influence of its spring 2050, to the left as viewed in these figures. This movement will rotate rocker shaft 2051 in a clockwise direction which rotation will continue until the control slot 2060 engages the pin in the manner described and during the rotation of rocker shaft 2051, its actuating lever 2053 will swing the inking mechanism actuating lever 1995 in a clockwise direction, as viewed in Fig. 10, from its full line to its broken line position.

During this movement of lever 1995, its ratchet 2035 will ride over the ratchet teeth of ratchet wheel 1996. Clockwise rotation of ratchet wheel 1996 will be prevented by pawl 2011 in the manner well understood, by those skilled in this art.

During the rotation of the printing drum from its position as shown in Fig. 8 to that of Fig. 9, the lift portion of cam 2039 will engage cam roller 2024 causing the connecting link 2041 to move to the right, as viewed in this figure, which movement will result in a counter-clockwise rotation of rocker shaft 2051 and, through the mechanism previously described, a corresponding counter-clockwise rotation of the printing drum actuating lever 1995. The initial portion of the counter-clockwise movement of lever 1995 will swing the rocker frame 2002 in a counter-clockwise direction from its retracted position, as shown in Fig. 10, to its active position, as shown in Fig. 11, until its stop roller 2024 engages the stop projection 2025. This movement of the rocker frame during the initial operation of actuating lever 1995 is obtained by the frictional engagement maintained between the actuating lever 1995 and rocker frame side plate 1988 by means of the compression spring 2001 in the manner previously described.

The movement of the rocker frame 2002 into its active position, as shown in Fig. 11, brings the periphery of the ink supply roller 1980 into engagement with the ink distributing roller 1960 at a time when the inking roller 1964 is no longer in engagement with the printing type surface of the printing drum and as a result the ink distributing and feeding rollers 1960 and 1946 will be free to rotate during the rotation of the ink feeding drum 1980. The further counter-clockwise movement of actuating lever 1995 will rotate the ink supply drum 1980 through its pawl and ratchet engagement with said drum to transfer to the distributing roller 1960 the thin film of ink adhering to the surface of said drum as the drum is rotated in contact with the distributing roller 1960 (Fig. 9).

As previously pointed out the thickness of the ink film adhering to the supply drum 1980 may be regulated by the adjustment of the scraper blade 2015 in the manner previously described.

When the printing drum 332 reaches its position, as shown in Fig. 9, the high point of actuating cam 2039 will have turned into engagement with the cam roller 2040 and the ink feeding drum will have reached the end of its feeding operation. From this point until the drum returns to its normal rest position of Fig. 7, the drop of the cam will be turned sufficiently to permit the ink supply drum actuating mechanism to swing the actuating lever 1995 in a clockwise direction to return the rocker frame 2002 to its inactive position, as shown in Fig. 10. The rocker frame 2002 will swing to its retracted position during the initial clockwise movement of said actuating lever 1995 due to the frictional connection between this lever and the side of the rocker frame. The swing of rocker frame 2002 to its inactive position of Fig. 10 will move the peripheral surface of the ink supply drum 1980 out of engagement with the ink distributing roller 1960 and thereby freeing the distributing roller and its associated inking roller 1946 for rotation during the initial portion of the succeeding operating cycle of the machine when the printing type surface 2075 of the drum engages the inking roller 1946.

From the foregoing description of the type inking apparatus and its control means, it will be understood that by the simple manipulation of control lever 2064 the amount of ink transferred from the inking drum to the distributing roller 1960 and then through the inking roller 1946 to the type faces 2075 may be regulated according to the amount of ink required for the character of mail matter under treatment. This adjustment enables the device to be set to feed more ink when printing on envelopes formed of a material which readily absorbs ink or to supply less ink when treating envelopes which do not readily absorb the ink and as a result the quality of the impression may be governed to suit the ink absorbing character of the envelopes. This adjustment is also necessary to enable the metering of the ink in proportion to the area of type surfaces used, as for example, less ink will be required when printing only the stamp, that is when the town circle, date printing wheels and advertising slogan are removed from printing position and conversely a greater amount of ink will be required to print the stamp, town circle, date and advertising slogan.

As may be observed in Figs. 10, 11 and 12, the lower portion of the ink well frame 1970 is formed to provide an ink reservoir 2076 into which the lower portion of the ink supply drum 1980 is immersed to pick up ink from the reservoir.

The side wall 2077 of the ink well frame extends upwardly only a sufficient distance to confine the ink within said reservoir, as shown in Figs. 10 and 11, in order to permit the ink supply drum 1980 to be projected from said frame into engagement with the ink distributing roller.

The front portion of the ink well frame 1970 is provided with a forwardly extending trough 2078 by means of which ink may be supplied to the reservoir 2076 (Fig. 1). The filling trough 2078 is preferably closed by means of a cover 2079 hinged to the frame by hinge pin 2080, as shown in Fig. 12.

The ink well and feeding mechanism 1969 may be easily and quickly removed from the power plant and disconnected from its driving mechanism when it becomes necessary to clean or adjust the ink reservoir and its feeding mechanism. The disengagement of this device from the machine is accomplished by lifting the plunger knob 1984 until it releases the ratchet teeth 1981 formed along the supporting pin 1973 and thereafter bodily moving the device until its supporting pins are free from the supporting bracket standards 1975 and 1976. Following this operation, the ink drum actuating lever pin 2056 may be removed from slot 2054 formed in lever 2053 thus completely freeing the device from the power plant.

The rocker frame 2002 which carries the ink feeding roller 1980 and the operating mechanism therefor may be readily removed from the ink well frame 1970 by opening the ink well cover 2029 after the thumb screw 2031 has been sufficiently unscrewed to free the cover, whereupon the rocker frame and the mechanism carried thereby may be bodily lifted from the ink well frame 1970 and in this way rendering the cleaning and servicing of this portion of the mechanism simple and effective.

OPERATION

Before the machine may be placed in operation, an amount of postage will, of necessity, have to be purchased and entered into the subtractive register of the meter by an authorized post office official. The manner in which the meter may be removed from the power plant and the entry of an amount of postage therein and the replacing of the meter in operative position on the power plant has already been described and, therefore, need not be repeated.

Before running the mail matter through the machine, the envelopes should be segregated under the various postage rates to be printed thereon and into groups representing the various sizes of envelopes to be treated. If other than first class mail matter is to be treated, such other classes should be segregated separately in order to adjust the printing drum of the meter to print the impressions upon these classes of mail matter in accordance with the post office requirements, as for example, for second class matter the date printing wheels should be retracted out of printing register. For third class mail, the P. L. & R. printing die should be moved into printing position and for registered mail, the P. L. & R. printing die and the town circle die should be retracted. The retraction of the town circle die will simultaneously retract the date printing wheels in the manner previously described so that for this class of mail, only the usual postage indicia of appropriate value will be printed upon such registered mail. In order to simplify the description of the operation of the machine, it will be assumed that envelopes of a normal size are to be treated and a 3-cent postage impression is to be printed thereon. Having segregated these normal sized envelopes upon which the 3-cent postage is to be printed, the operator, after inspecting to see that the water bottle 438 of the sealing mechanism contains a sufficient supply of water, the machine may be placed in operation by means of the control handle 463 in the manner previously described, whereby the moistening device will be automatically primed and the driving motor placed in operation. The operator should next actuate the cents selector lever 1375C until the numeral three appears in the window 1491A formed in the front face of the selector housing 1373 and to check at the same time to see that all of the other selector levers are in their proper zero positions. This may be readily determined by glancing at the figures appearing in the windows located in this portion of the selector housing. Before placing the envelopes in the feed hopper, the operator should check to see that the stripper mechanism 152 and the holddown portion 252 of the envelope conveyor system 153 are in their proper operative positions for operating upon the thickness of the envelopes to be treated. The operator should also check to see that the final sealing and ejector rollers are positioned for operation. If the envelopes are relatively short, the metering unit 222 of the conveyor system may be connected for high speed operation, as shown and described in said Patent No. 2,302,060. On the other hand if the envelopes are relatively long, the driving mechanism for the envelope metering unit 222 should be adjusted for its slow speed operation. The machine is now conditioned for operation and requires only the adjustment of the several parts of the envelope feed hopper 151 to suit the size of envelope which adjustment should be carried out in the manner previously described. The envelopes may now be stacked into the feeding hopper and the stack replenished as envelopes are fed therefrom by the metering and conveying device.

If the envelopes are to be sealed during their passage through the machine, the flaps of the envelopes should be opened and nested so as to hang down over the envelope supporting and conveyor plate 165 in order to present the flaps of the envelopes to the sealing device during their passage through the machine as described in said Patent No. 2,302,060.

If, however, the envelopes have been previously sealed or do not require sealing, they may be stacked in the feed hopper with the flap of each envelope folded against its body portion. It is not necessary to segregate the envelopes which have been sealed from those requiring sealing as sealed and unsealed envelopes may be placed indiscriminately within the feed hopper just as long as the flaps of these envelopes which are to be sealed hang down in nested fashion.

The envelopes will be metered from the feed hopper, conveyed through the sealing mechanism and finally through the printing station. Each envelope prior to its arrival at the printing station will engage and actuate the trigger mechanism, providing each of said envelopes is in correct printing register. The trigger mechanism will actuate the meter driving clutch tripping mechanism to drive the meter through one complete operating cycle for each envelope and is timed to print the postage impression adjacent the leading edge of the envelope, in the manner shown in Fig. 1. After leaving the printing station, the envelopes pass through the final sealing and creasing rollers 310 and are ejected thereby into the receiving hopper 377.

The operation of the machine may be continuous and may be carried on at relatively high speed so that a large number of envelopes may be treated in a relatively short space of time. Once the machine has been placed in operation, it requires no further attention excepting to supply the machine with the necessary water for sealing, ink for printing and maintaining a supply of envelopes in the feed hopper.

After all of the 3-cent mail matter has been treated, the machine may be adjusted and operated, in the manner above described, for treating all of the other classes of mail matter.

When the machine is to be operated for sealing envelopes without printing postage thereon, the envelope trip mechanism will be adjusted as described in said copending application, Serial No. 435,488. The envelopes may now be placed in the feed hopper with their flaps nested, in the manner described, and will be carried through the sealing mechanism and discharged into the receiving hopper by the envelope conveyor system. As the postage printing meter is not operated when employing the machine for sealing envelopes only, the envelopes may be fed through the machine at a higher rate of speed and for this purpose the envelope metering device may be lifted and maintained in its lifted position through the actuation of handle 236c, in the manner described in said copending application Serial No. 462,262, whereby the envelopes will be fed in a continuous stream from the feed hopper, thereby greatly increasing the number of envelopes which may be passed through the sealing device in a given period of time.

To condition the machine for printing on gummed tape, the tape feeding device 156 may be elevated to its feeding position by manipulating the tape feeding device positioning handle 656, in the manner described in said copending application Serial No. 496,558, and thereafter a stamp of any selected value or classification may be printed upon a section of tape for each actuation of the manual tripping lever 857.

The tape may be moistened or left unmoistened or may be cut at the end of each operating cycle or left uncut at the election of the operator.

If the hundreds and thousands of dollars register wheels should turn to zero during the running of mail matter through the machine, the zero locking portion of the meter locking mechanism will act, to not only lock the meter against further operation, but also to disengage the power plant clutch tripping mechanism whereby those envelopes remaining in feed hopper will be conveyed through the machine and as they cannot trip the meter driving clutch into operation will pass through the machine unstamped. After the meter has locked it will have to be removed from the power plant and taken to the post office for entering an additional purchase of postage therein in order to reestablish the operating condition of the machine.

It is not necessary to wait until the meter locks before taking it to the post office for entering an additional amount of postage therein since the meter may be taken to the post office for resetting at any time prior to the locking thereof.

In the present embodiment of the invention, the meter is provided with a selective printing range of from ½-cent to $99.99½ by steps of ½-cent each. It will be understood, however, that the printing capacity of the machine may be increased or decreased by merely adding or removing the necessary selector actuator mechanisms and value printing wheels, as will be readily understood by those skilled in this art.

It will also be understood that for such machines as may be provided with a higher or lower range of printing values, the zero locking mechanism of the subtractive register may correspondingly include such higher or lower orders.

During its inoperative periods the machine may be locked through the key operated lock 1514, in the manner previously described, to prevent unauthorized use.

As has been previously pointed out, the machine is capable of sealing a wide range of envelope sizes and thicknesses having a correspondingly wide range of types and styles of envelope flaps, and to print upon such mail matter the full range of postage values, within the capacity of the machine, for all of the different postal classifications.

We claim:

1. In a value printing machine, a printing drum, a value printing wheel carried by said drum, selector means for setting said wheel to print a selected value, a housing for said drum, an opening through said housing to admit access to said drum, a door closing said opening, means for locking said door in its closed position, and means operable by said selector means for releasing said door locking means when said selector means is moved to a predetermined setting.

2. In a value printing machine, a support, a shaft rotatably mounted in said support, a printing drum secured to said shaft so as to rotate therewith, a frame having an opening mounted within said printing drum, a type wheel having a plurality of type values rotatably mounted in said frame, a member mounted on said shaft and movable longitudinally thereof for rotating said type wheel to selectively position one of its type in printing position, and means for moving said frame within said drum for positioning said type wheel in proper printing registry.

3. In a value printing machine, a printing drum, a value printing wheel carried by said drum, selector means for setting said wheel to a position to print a selected value upon actuation of said drum, said selector means having a zero position and at least one denomination position, a housing for said drum, an opening through said housing to permit access to said drum, a door hinged to said housing for closing said opening, means for locking said door in its closed position, and means operable by said selector means when said selector means is in a position midway between two of its value positions for releasing said door locking means.

4. In a value printing machine, in combination, a casing, a main shaft rotatably mounted in said casing with one of its ends extending through one of the sides thereof, a bearing in said last mentioned casing side for supporting the end of said shaft, a printing drum carried by said last-mentioned end of said shaft exteriorly of the casing, a value printing wheel operatively mounted within said drum, said shaft having a slot formed therein, an elongated member slidably disposed in said slot and extending through said bearing and into said printing drum so as to be rotatable with both said shaft and said drum, means forming a driving connection between one end of said slidable member and said value printing wheel, a semi-circular rack fastened to one end of said member and disposed within said casing, a manually operable selector element rotatably mounted on said casing, and gear means including a gear forming a driving connection between said selector element and said rack, said gear means being constantly in mesh with said rack regardless of the operative condition of the rack.

5. In a value printing machine, in combination, a casing, a main shaft rotatably mounted in said casing with one of its ends extending through one of the sides thereof, a bearing in said last mentioned casing side for supporting the end of said shaft, a printing drum carried by said last-mentioned end of said shaft exteriorly of the casing, a value printing wheel operatively mounted within said drum, said shaft having a slot formed therein, an elongated member slidably disposed in said slot and extending through said bearing and into said printing drum so as to be rotatable with both said shaft and said drum, means forming a driving connection between one end of said slidable member and said value printing wheel, a semi-circular rack fastened to one end of said member and disposed within said casing, a manually operable selector element rotatably mounted on said casing, gear means including a gear forming a driving connection between said selector element and said rack, said gear means being constantly in mesh with said rack regardless of the operative condition of the rack, and means for locking said shaft against rotation when said value printing wheel is out of printing register.

6. In a value printing machine, in combination, a casing, a main shaft rotatably mounted in said casing with one of its ends extending through one of the sides thereof, a bearing in said last mentioned casing side for supporting the end of said shaft, a printing drum carried by said last-mentioned end of said shaft exteriorly of the casing, a value printing wheel operatively mounted within said drum, said shaft having a slot formed therein, an elongated member slidably disposed in said slot and extending through said bearing and into said printing drum so as to be rotatable with both said shaft and said drum, means forming a driving connection between one end of said slidable member and said value printing wheel, a semi-circular rack fastened to one end of said member and disposed within said casing, a manually operable selector element rotatably mounted on said casing, gear means including a gear forming a driving connection between said selector element and said rack, said gear means being constantly in mesh with said rack regardless of the operative condition of the rack, a second shaft rotatably mounted in said casing, means forming a driving connection between said shafts, and means operated by said selector element for locking said second shaft and accordingly said first shaft and said drum during movement of said element from one selective position to another.

7. In a value printing machine, in combination, a casing, a main shaft rotatably mounted in said casing, a printing drum secured to one end of said shaft and disposed exteriorly of said casing, a value printing wheel operatively mounted within said drum, means carried by said shaft and extending into said drum for selectively actuating said wheel to position any one of its value type in printing position, a selector device, means forming an operative connection between said selector device and said selectively actuating means whereby said printing wheel may be selectively actuated, a second shaft rotatably mounted in said casing, means forming a geared connection between said shafts, and means operated by said selector device for locking said second shaft against rotation when said selector device is moved from one selective position to another.

8. In a value printing machine, in combination, a casing, a main shaft rotatably mounted in said casing, a printing drum secured to one end of said shaft and disposed exteriorly of said casing, a value printing wheel operatively mounted within said drum, means carried by said shaft and extending into said drum for selectively actuating said wheel to position any one of its value type in printing position, a selector device, means forming an operative connection between said selector device and said selectively actuating means whereby said printing wheel may be selectively actuated, a second shaft rotatably mounted in said casing, means forming a geared connection between said shafts, and means operated by said selector device for locking said second shaft against rotation when said selector device is moved from one selective position to another, said last-mentioned means also adapted to lock said selector device against movement during rotation of said shafts.

9. In a value printing machine, in combination, a casing, a main shaft mounted in said casing, a printing drum carried by said shaft exteriorly of said casing, a value printing wheel operatively mounted within said drum, means carried by said shaft and extending into said drum for selectively actuating said wheel to position any one of its value type in printing position, manually operable selector means, means operatively connecting said selector means and said printing wheel actuating means, a second shaft rotatably mounted in said casing, gear means connecting said shafts, a notched disc on said second shaft and rotatable therewith, ratchet means connected to said selector means and operable thereby into and out of the notch in said disc when said selector means is moved from one selected position to another whereby said second shaft is locked against rotation during setting operation of said selector means, a housing fastened to said casing and enclosing said drum, said housing having an opening formed therein, a door for said opening, means for locking said door in closed position, and means operated by movement of said selector means from one selected position to another for unlocking said door whereby said door may be opened only when said shafts are locked against rotation.

10. In a value printing machine, in combination, a casing, a housing secured to said casing and having an opening therein, a door for said opening, a shaft rotatably mounted in said casing, a printing drum secured to one end of said shaft and disposed in said housing, a type wheel operatively mounted within said drum, means carried by said shaft and rotatable therewith for setting said wheel, selector means on said casing for actuating said wheel setting means, means operated by said selector means for locking said shaft against rotation during movement of said selector means from one selective position to another, means for locking said door in closed position, and means operated by said selector means during movement thereof to an intermediate position between selective positions for releasing said door locking means.

11. A value printing machine adapted to be mounted on and driven by a power unit having a clutch mechanism which when engaged causes actuation of said value printing machine, in combination, a casing, a housing secured to said casing having an opening therein, a door for said opening, a shaft rotatably mounted in said casing, a printing drum secured to one end of said shaft and disposed in said housing, a type wheel operatively mounted within said drum, means carried by said shaft and extending into said drum for operating said type wheel, selector means on said casing for operating said type wheel operating means, means operated by said selector means during its movement from one selective position to another for locking said shaft against rotation, means for locking said door in closed position, means operated by said selector means during movement thereof to a position intermediate two of its selective positions for releasing said door locking means, and means operated by said selector means during its movement from one selective position to another for preventing operation of said clutch to actuate the printing machine.

12. In a value printing machine, in combination, a casing, a main shaft rotatably mounted in said casing and having an end extending through one side thereof, a printing drum carried by said last-mentioned shaft end, a plurality of type wheels rotatably mounted within said drum, a plurality of elongated members slidably mounted in said shaft and extending into said printing drum so as to be rotatable with both the shaft and drum, means forming a driving connection between each of said slidable members and one of said type wheels, a semi-circular rack secured to each of said members and slidably secured to said shaft, an actuating gear for each of said racks, and manually operable selector means connected to said actuating gears and operable to slide said racks and accordingly said members longitudinally of said shaft to set said type wheels, said actuating gears and racks being so arranged that during the rotation of said shaft from its rest position when one rack turns out of mesh with its respective actuating gear it will turn into mesh with another of said actuating gears, thereby maintaining control of said racks during the complete cycle of rotation of said shaft.

13. Apparatus as described in claim 12 wherein there are provided means connected to and operated by said selector means for locking said shaft against rotation during setting operation of said selector means.

14. Apparatus as set forth in claim 12 wherein there is provided means effective upon rotation of said shaft for preventing movement of said selector means from an adjusted position, thereby to prevent jamming of said gears and said racks by movement of the selector means during the rotation of the shaft.

15. Apparatus according to claim 12 wherein the actuating gears are mounted on a plurality of shafts disposed on opposite sides of said first-mentioned shaft so that as the first shaft rotates from its rest position when one rack turns out of mesh with its respective actuating gear it will turn into mesh with another actuating gear.

16. In a value printing machine, in combination, a casing, a main shaft rotatably mounted in said casing, a printing drum on one end of said shaft, a type wheel rotatably mounted in said drum, means associated with said shaft and said drum for selectively rotating said type wheel, a manually operable selector device for actuating said type wheel operating means, a second shaft rotatably mounted to said casing and geared to said main shaft, a rock shaft rockably mounted in said casing, locking means associated with said second shaft and said rock shaft, and means operated by said selector means during movement thereof to a position between two selective positions for rocking said rock shaft to effect locking operation of said locking means.

17. Apparatus according to claim 16 wherein said locking means comprises complementary pawl and ratchet members mounted respectively on said rock shaft and said second shaft in such relation that the pawl enters the ratchet when the rock shaft is rocked by movement of the selector to a position intermediate adjacent selective positions.

18. Apparatus according to claim 16 wherein there are provided means associated with said second shaft and said rock shaft for preventing movement of the rock shaft and accordingly of the selector means during rotation of said second shaft.

19. In a value printing machine, in combination, a framework, a main shaft rotatably mounted in said framework and having an end extending through one side thereof, a printing drum carried by said last-mentioned shaft end, a plurality of type wheels rotatably mounted within said drum, a plurality of elongated members mounted on said shaft, said members rotating with said shaft and drum and being slidable longitudinally with respect to said shaft, means forming a driving connection between each of said slidable members and one of said type wheels, a semi-circular rack secured to each of said members, said racks being disposed on opposite sides of said shaft, an actuating gear for each of said racks, and manually operable selector means connected to said actuating gears and operable to move said racks and accordingly said members longitudinally of said shaft to set said type wheels, said actuating gears and racks being so arranged that during the rotation of said shaft from its rest position when one rack turns out of mesh with its respective actuating gear it will turn into mesh with another of said actuating gears, thereby maintaining control of said racks during the complete cycle of rotation of said shaft.

20. In a value printing machine, in combination, a framework, a main shaft rotatably mounted in said framework and having an end extending through one side thereof, a printing drum carried by said last-mentioned shaft end, a plurality of type wheels rotatably mounted within said drum, a plurality of elongated members mounted on said shaft, said members rotating with said shaft and drum and being slidable longitudinally with respect to said shaft, means forming a driving connection between each of said slidable members and one of said type wheels, a semi-circular rack secured to each of said members, said racks being disposed on opposite sides of said shaft, an actuating gear for each of said racks, manually operable selector means connected to said actuating gears and operable to move said racks and accordingly said members longitudinally of said shaft to set said type wheels, said actuating gears and racks being so arranged that during the rotation of said shaft from its rest position when one rack turns out of mesh with its respective actuating gear it will turn into mesh with another of said actuating gears, thereby maintaining control of said racks during the complete cycle of rotation of said shaft, and locking means to prevent rotation of said shaft when the teeth of said racks and actuating gears are not aligned with respect to each other.

21. In a value printing machine, in combination, a framework, a main shaft rotatably mounted in said framework and having an end extending through one side thereof, a printing drum carried by said last-mentioned shaft end, a plurality of type wheels rotatably mounted within said drum, a plurality of elongated members mounted on said shaft, said members rotating with said shaft and drum and being slidable longitudinally with respect to said shaft, means forming a driving connection between each of said slidable members and one of said type wheels, a semicircular rack secured to each of said members, said racks being disposed on opposite sides of said shaft, an actuating gear for each of said racks, manually operable selector means connected to said actuating gears and operable to move said racks and accordingly said members longitudinally of said shaft to set said type wheels, said actuating gears and racks being so arranged that during the rotation of said shaft from its rest position when one rack turns out of mesh with its respective actuating gear it will turn into mesh with another of said actuating gears thereby maintaining control of said racks during the complete cycle of rotation of said shaft, and means to align the teeth of the racks and gears so that aligned sets of teeth are positioned in planes passing through said shaft at right angles to the axis thereof.

22. In a value printing machine, in combination, a framework, a main shaft rotatably mounted for cyclical operation in said framework and having an end extending through one side thereof, a printing drum carried by said last-mentioned shaft end, a plurality of type wheels rotatably mounted within said drum, a plurality of elongated members mounted on said shaft, said members rotating with said shaft and drum and being slidable longitudinally with respect to said shaft, means forming a driving connection between each of said slidable members and one of said type wheels, a semi-circular rack secured to each of said members, said racks being disposed on opposite sides of said shaft, an actuating gear for each of said racks, manually operable selector means connected to said actuating gears and operable to move said racks and accordingly said members longitudinally of said shaft to set said type wheels, said actuating gears and racks being so arranged that during the rotation of said shaft from its rest position when one rack turns out of mesh with its respective actuating gear it will turn into mesh with another of said actuating gears, thereby maintaining control of said racks during the complete cycle of rotation of said shaft, and means to prevent manual movement of said selector means during the cycle of operation, said last-mentioned means also ensuring the maintenance of the aligned relationship of the teeth of said actuating gears and racks during the cycle of operation.

23. In a value printing machine, a framework, a shaft rotatably mounted for cyclical operation on said framework, a printing drum mounted on said shaft, value printing wheel means mounted on said drum, selector means for setting said printing wheel means to print a selected value during the cyclical operation of said drum, a housing for said drum, an opening through said housing to permit access to said drum, a door closing said opening, means for locking said door in its closed position, and means operable by said selector means for releasing said door locking means when and only when said selector means is moved to a predetermined setting.

24. In a value printing machine, in combination, a framework, movable printing means mounted on said framework, value printing wheel means mounted on said printing means, selector means for setting said printing wheel means to print a selected value during the operation of said printing means, a housing for said printing means, an opening through said housing to permit access to said printing means, a door closing said opening, means for locking said door in its closed position, and means operable by said selector means for releasing said door locking means when and only when said selector means is moved to a predetermined setting.

25. In a value printing machine, movable printing means, value printing wheel means mounted on said printing means, selector means for setting said wheel to print a selected value, said selector means having a zero position and at least one denomination position, a housing for said printing means, an opening through said housing to permit access to said printing means, a door for closing said opening, means for locking said door in its closed position, and means operable by said selector means when said selector means is in a position midway between two of its value positions for releasing said door locking means.

26. In a value printing machine, in combination, a framework, movable printing means mounted on said framework, value printing wheel means mounted on said printing means, selector means for setting said printing wheel means to print a selected value during the operation of said printing means, a housing for said printing means, an opening through said housing to permit access to said printing means, a door closing said opening, means for locking said door in its closed position, means operable by said selector means for releasing said door locking means when and only when said selector means is moved to a predetermined setting, and means operated by said selector means during the period of its movement from one selective position to another for preventing operation of said printing machine.

27. In a value printing machine, in combination, a casing, a main shaft rotatably mounted for cyclical operation in said casing, a printing drum secured to one end of said shaft and disposed exteriorly of said casing, a value printing wheel operatively mounted within said drum, means carried by said shaft and extending into said drum for selective actuating said wheel to position any one of its value type in printing position, a selector device, means forming an operative connection between said selector device and said selectively actuating means whereby said printing wheel may be selectively actuated, a second shaft rotatably mounted in said casing, means forming a geared connection between said shafts, and locking means operatively associated with said second shaft, said locking means also being operatively associated with said selector device, said locking means during cyclical operation of said shaft preventing manual movement of said selector device.

28. In a value printing machine, in combination, a framework, a main shaft rotatably mounted on said framework, a printing drum secured to said shaft, a value printing wheel operatively mounted on said drum, means mounted on said shaft for actuating said wheel to position any one of its value type in printing position, a selector device, means forming an operative connection between said selector device and said printing wheel actuating means whereby said printing wheel may be selectively actuated, a second shaft rotatably mounted in said framework, means forming a geared connection between said shafts, and means for locking said second shaft against rotation when said selector device is moved from one selective position to another.

29. In a value printing machine, in combination, a casing, a main shaft mounted in said casing, a printing drum carried by said shaft exteriorly of said casing, a value printing wheel operatively mounted within said drum, means carried by said shaft and extending into said drum for selectively actuating said wheel to position any one of its value type in printing position, manually operable selector means operatively connected to said printing wheel actuating means, a second shaft rotatably mounted in said casing, gear means connecting said shafts, a notched disc on said second shaft and rotatable therewith, and ratchet means connected to said selector means and operable thereby into and out of the notch in said disc when said selector means is moved from one selected position to another whereby said second shaft is locked against rotation during setting operation of said selector means.

30. In a value printing machine, in combination, a main shaft journaled for rotation, a printing drum carried by said shaft, a plurality of value printing wheels operatively mounted within said drum, a segment of a circular rack for each of said wheels slidably mounted upon said shaft, an actuating gear for each of said segments, said segments and actuating gears being so arranged as to remain in controlling mesh during the rotation of said shaft, means operatively interconnecting said segments and value printing wheels, and means for selectively actuating said gears for setting the said printing wheels to print a selected value.

31. In a value printing machine, in combination, a main shaft journaled for rotation, means normally maintaining said shaft in its rest position, a printing drum carried by said shaft, a pair of value printing wheels operatively mounted within said drum, a pair of segments of circular racks, one for each of said wheels slidably mounted upon said shaft in opposed relation, a pair of actuating gears, one for each of said segments and said gears being mounted upon opposite sides of said shaft and each arranged to engage its respective segment when said shaft is in its rest position, means for actuating said actuating gears, and means operatively connecting each of said segments with its related value printing wheel.

32. In a value printing machine, in combination, a main shaft journaled for rotation, means normally maintaining said shaft in its rest position, a printing drum carried by said shaft, a pair of value printing wheels operatively mounted within said drum, a pair of segments of circular racks, one for each of said wheels slidably mounted upon said shaft in opposed relation, a pair of actuating gears, one for each of said segments and said gears being mounted upon opposite sides of said shaft and each arranged to engage its respective segment when said shaft is in its rest position, and said actuating gears and segments being so arranged that during the rotation of said shaft from its rest position when one segment turns out of mesh with its respective actuating gear, it will turn into mesh with the other of said actuating gears, thereby maintaining control of said segments during the complete cycle of rotation of said shaft, means operatively connecting each of said segments with its related value printing wheel, and means for actuating said actuating gears.

33. In a value printing machine, in combination, a main shaft journaled for rotation, means normally maintaining said shaft in a rest position, a printing drum carried by said shaft, a pair of value printing wheels operatively mounted within said drum, a pair of segments of circular racks, one for each wheel slidably mounted upon said shaft, a pair of actuating gears, one for each of said segments positioned on opposite sides of said shaft, means operatively interconnecting each of said segments with its respective printing wheel, a pair of manually operable selectors, one for each of the gears for advancing said segments a predetermined distance for rotating said wheels to present a selected value for printing, whereby during the rotation of said shaft from its rest position, the arcuate gear segments will be positioned in meshing alignment with the two actuating gears so that as these segments turn out of mesh with their respective actuating gears, they will turn into mesh with the other of said actuating gears.

34. In a value printing machine, in combination, a frame, a shaft rotatably mounted in said frame, a printing drum secured to said shaft and rotatable therewith, selective printing means in said printing drum, selector means including a manually operable member for setting said printing means at a desired value, a second shaft geared to said first shaft and rotatable upon operation thereof, and means forming an interlock between said second shaft and said manually operable member for locking said printing means in its set position during the operating cycle of said printing drum.

35. In a value printing machine, in combination, a support, a shaft rotatably mounted in said support for cyclical operation, a printing drum mounted on said shaft to rotate therewith, a type wheel rotatably mounted in said printing drum and having a plurality of type values thereon adapted to be selectively set to predetermined printing positions, a member longitudinally slidable with respect to, mounted on, and rotatable with said shaft for setting said type wheel, a cylindrically shaped rack member mounted on said shaft connected to said member, a gear in constant mesh with said rack, and an individually operable selector device connected to said gear for operating said slidable member to set said type wheel, whereby all the parts of the gear train leading from said selector device to said type wheel is in mesh throughout the cyclical operation of said machine.

36. In a value printing machine, in combination, a support, a shaft rotatably mounted in said support, a printing drum secured to said shaft so as to rotate therewith, a frame having an opening therein mounted on said printing drum, said frame being movable longitudinally with respect to said shaft and drum, a type wheel having a plurality of type values rotatably mounted in said frame, a member mounted on said shaft and movable longitudinally thereof for rotating said type wheel to selectively position one of its type in printing position, and manually operable means for moving said frame longitudinally with respect to said drum for positioning said type wheel in proper printing registry.

37. In a value printing machine, in combination, a framework, a main shaft rotatably mounted on said framework, a printing drum mounted on said shaft, a plurality of type wheels rotatably mounted within said drum, a plurality of elongated members slidably mounted in said shaft for longitudinal movement with respect thereto, said members extending into said printing drum and being rotatable with both said shaft and said drum, means forming a driving connection between each of said slidable members and one of said type wheels, a circular rack secured to one of said members and slidably mounted on said shaft, an actuating gear for said circular rack, a pair of semi-circular racks disposed on opposite sides of said shaft and each connected to a slidable member, an actuating gear for each of said semi-circular racks, said actuating gears and semi-circular racks being so arranged that during the rotation of said shaft when one semi-circular rack turns out of mesh with its respective actuating gear it will turn into mesh with the actuating gear of said other semi-circular rack, thereby maintaining control of said semi-circular racks during the complete cycle of rotation of said shaft, manually operable selector means connected to each of said actuating gears and operable to slide said racks and accordingly said members longitudinally of said shaft to set said type wheels, said circular rack having portions spaced from said shaft to permit portions of said semi-circular racks to enter it during relative sliding movement of said racks as said selector means is operated.

38. In a value printing machine, in combination, a support, a shaft rotatably mounted in said support for cyclical operation, a printing drum mounted on said shaft to rotate therewith, a plurality of type wheels rotatably mounted in said printing drum and each having a plurality of type values thereon adapted to be selectively set to predetermined printing positions, a plurality of members longitudinally slidable with respect to, mounted on, and rotatable with said shaft for respectively setting said type wheels, a plurality of cylindrically shaped rack members mounted on said shaft, said rack members being of different diameter, one of said racks having portions spaced from the shaft so that upon relative sliding movement of adjacent racks on said shaft one rack may enter within another, each rack being connected to one of said members, a plurality of gears in constant mesh with said racks, and a plurality of individually operable selector devices respectively connected to said gears for operating said slidable members to set said type wheels, whereby all the parts of each gear train leading from each of said selector devices to each of said type wheels are in mesh throughout the cyclical operation of said machine.

FRANK P. SAGER.
ERNEST R. BERGMARK.
COMMODORE D. RYAN.
HERSCHEL L. ATHERTON.

Certificate of Correction

Patent No. 2,371,070.

March 6, 1945.

FRANK P. SAGER ET AL.

It is hereby certified that errors appear in the printed specification of the above numbered patent requiring correction as follows: Page 5, first column, line 10, for for the word "though" read *through*; page 11, second column, line 67, for the numeral "90" read *23*; page 22, second column, line 57, for "is", second occurrence, read *it*; page 30, first column, line 75, after "system" insert *(Patent No. 2,302,060)*; page 31, first column, line 46, for "and total" read *the total*; and that the said Letters Patent should be read with these corrections therein that the same may conform to the record of the case in the Patent Office.

Signed and sealed this 22nd day of June, A. D. 1948.

[SEAL]

THOMAS F. MURPHY,
*Assistant Commissioner of Patents.*